United States Patent
Suzuki et al.

(10) Patent No.: US 9,849,752 B2
(45) Date of Patent: Dec. 26, 2017

(54) VEHICLE AIR CONDITIONING APPARATUS

(71) Applicant: SANDEN HOLDINGS CORPORATION, Gunma (JP)

(72) Inventors: Kenichi Suzuki, Isesaki (JP); Atsuo Inoue, Isesaki (JP); Hidenori Takei, Isesaki (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 0 days.

(21) Appl. No.: 15/197,042

(22) Filed: Jun. 29, 2016

(65) Prior Publication Data
US 2016/0375743 A1 Dec. 29, 2016

Related U.S. Application Data

(62) Division of application No. 14/002,643, filed as application No. PCT/JP2012/055441 on Mar. 2, 2012, now Pat. No. 9,517,680.

(30) Foreign Application Priority Data

Mar. 3, 2011 (JP) ................................. 2011-046512
Jun. 17, 2011 (JP) ................................. 2011-135014
(Continued)

(51) Int. Cl.
*B60H 1/00* (2006.01)
*B60H 1/04* (2006.01)
(Continued)

(52) U.S. Cl.
CPC ..... *B60H 1/00921* (2013.01); *B60H 1/00007* (2013.01); *B60H 1/00064* (2013.01);
(Continued)

(58) Field of Classification Search
CPC ............ B60H 1/00007; B60H 1/00064; B60H 1/00335; B60H 1/00392; B60H 1/00457;
(Continued)

(56) References Cited

U.S. PATENT DOCUMENTS 5,598,887 A 2/1997 Ikeda et al.
5,701,753 A 12/1997 Iritani
(Continued)

FOREIGN PATENT DOCUMENTS

CN 1818518 8/2006
DE 10343818 4/2004
(Continued)

OTHER PUBLICATIONS

Office Action dated Dec. 8, 2016 which issued in the corresponding German Patent Application No. 11 2012 001 074.4.
(Continued)

*Primary Examiner* — Marc Norman
(74) *Attorney, Agent, or Firm* — Cozen O'Connor

(57) ABSTRACT

A vehicle air conditioning apparatus is provided that can prevent temperature variations of the air after the heat exchange in a radiator to reliably control the temperature of the air supplied to the vehicle interior. During the heating operation and the heating and dehumidifying operation, target degree of supercooling SCt when target air-blowing temperature TAO is a predetermined temperature or higher is set to SCt1 that is greater than SCt2 when the target air-blowing temperature TAO is lower than the predetermined temperature. When amount of air Ga supplied from indoor fan 12 is lower than a predetermined value, the target degree of supercooling SCt is corrected, which is set such that the degree of supercooling is lower than target degree of supercooling corrected when the amount of air Ga supplied from the indoor fan 12 is a predetermined value or higher.

4 Claims, 63 Drawing Sheets

(30) Foreign Application Priority Data

| Jun. 22, 2011 | (JP) | 2011-138181 |
|---|---|---|
| Aug. 8, 2011 | (JP) | 2011-172940 |
| Jan. 18, 2012 | (WO) | PCT/JP2012/050991 |

(51) Int. Cl.

| *F25B 49/02* | (2006.01) |
|---|---|
| *B60H 1/32* | (2006.01) |
| *B60H 3/02* | (2006.01) |
| *F25B 41/04* | (2006.01) |

(52) U.S. Cl.
CPC ....... *B60H 1/0075* (2013.01); *B60H 1/00335* (2013.01); *B60H 1/00392* (2013.01); *B60H 1/00457* (2013.01); *B60H 1/00485* (2013.01); *B60H 1/00807* (2013.01); *B60H 1/00864* (2013.01); *B60H 1/00892* (2013.01); *B60H 1/00899* (2013.01); *B60H 1/00978* (2013.01); *B60H 1/04* (2013.01); *B60H 1/3207* (2013.01); *B60H 1/3227* (2013.01); *B60H 3/024* (2013.01); *F25B 41/043* (2013.01); *F25B 49/027* (2013.01); *B60H 2001/00957* (2013.01); *B60H 2001/326* (2013.01); *B60H 2001/3251* (2013.01); *B60H 2001/3252* (2013.01); *B60H 2001/3263* (2013.01); *F25B 41/04* (2013.01); *F25B 2341/063* (2013.01); *F25B 2500/19* (2013.01); *F25B 2600/21* (2013.01); *F25B 2600/2513* (2013.01); *F25B 2700/04* (2013.01); *F25B 2700/195* (2013.01); *F25B 2700/197* (2013.01); *F25B 2700/2102* (2013.01); *F25B 2700/21163* (2013.01); *F25B 2700/21175* (2013.01)

(58) Field of Classification Search
CPC .............. B60H 1/00485; B60H 1/0075; B60H 1/00807; B60H 1/00864; B60H 1/00892; B60H 1/00899; B60H 1/00921; B60H 1/00978; B60H 1/04; B60H 1/3207; B60H 1/3227; B60H 3/024; B60H 2001/00957; B60H 2001/3251; B60H 2001/3252; B60H 2001/326; B60H 2001/3263; F25B 49/027

See application file for complete search history.

(56) References Cited

U.S. PATENT DOCUMENTS

| 6,237,351 | B1 | 5/2001 | Itoh et al. | |
| 2005/0229615 | A1* | 10/2005 | Nakamura | B60H 1/00792 |
| | | | | 62/186 |
| 2013/0284415 | A1* | 10/2013 | Katoh | F25B 39/04 |
| | | | | 165/175 |
| 2015/0159933 | A1* | 6/2015 | Itoh | F24F 3/1405 |
| | | | | 62/226 |
| 2015/0260439 | A1* | 9/2015 | Ohta | F25B 5/00 |
| | | | | 62/196.1 |

FOREIGN PATENT DOCUMENTS

| EP | 0989003 | 3/2000 |
|---|---|---|
| JP | 05-106921 | 4/1993 |
| JP | 7-132729 | 5/1995 |
| JP | 8-254376 | 10/1996 |
| JP | 09-14779 | 1/1997 |
| JP | 9-14780 | 1/1997 |
| JP | 9-286225 | 11/1997 |
| JP | 10-232076 | 9/1998 |
| JP | 2000-161809 | 6/2000 |
| JP | 2001-246930 | 9/2001 |
| JP | 2001-248920 | 9/2001 |
| JP | 2001-324237 | 11/2001 |
| JP | 2006-316913 | 11/2006 |
| JP | 40-13717 | 9/2007 |
| JP | 2009-264661 | 11/2009 |
| JP | 2010-058587 | 3/2010 |

OTHER PUBLICATIONS

Office Action dated Oct. 10, 2016 which issued in the corresponding Chinese Patent Application No. 201510377004.6.
Office Action dated Dec. 28, 2016 which issued in the corresponding Chinese Patent Application No. 201510377096.8.
Office Action dated Feb. 4, 2017 which issued in the corresponding Chinese Patent Application No. 201510377036.6.

* cited by examiner

FIG. 16A
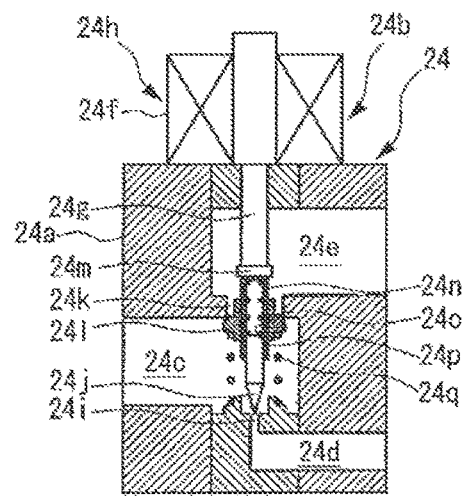
FIG. 16B
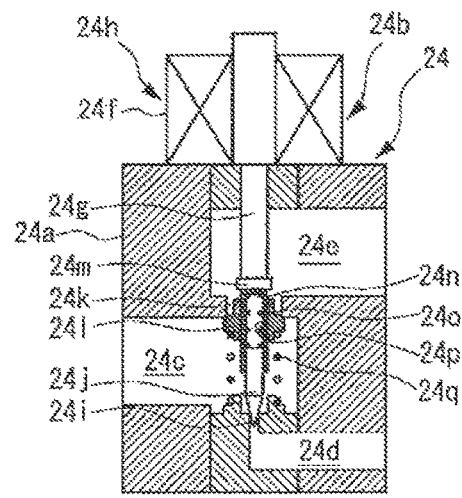
FIG. 16C
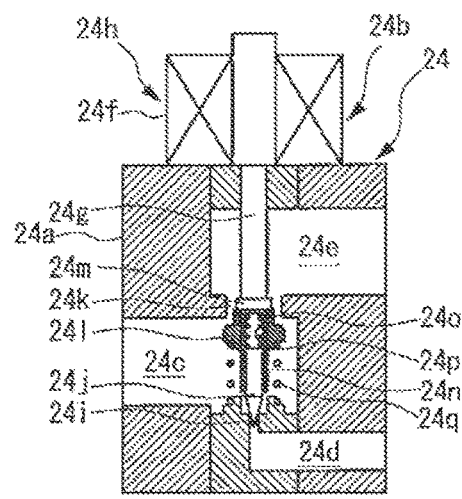
*FIG. 16*

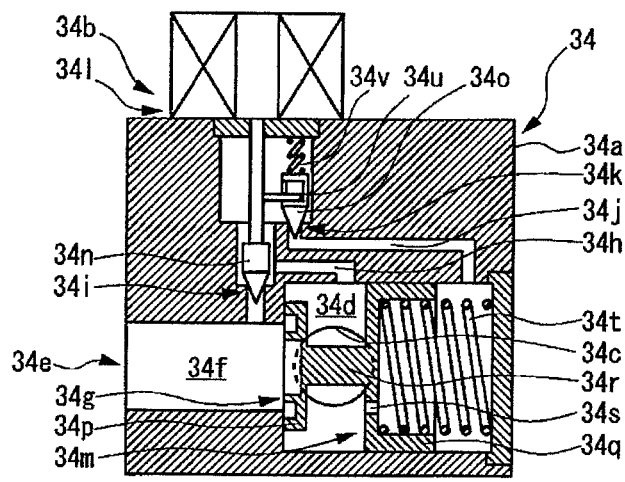
FIG. 34A
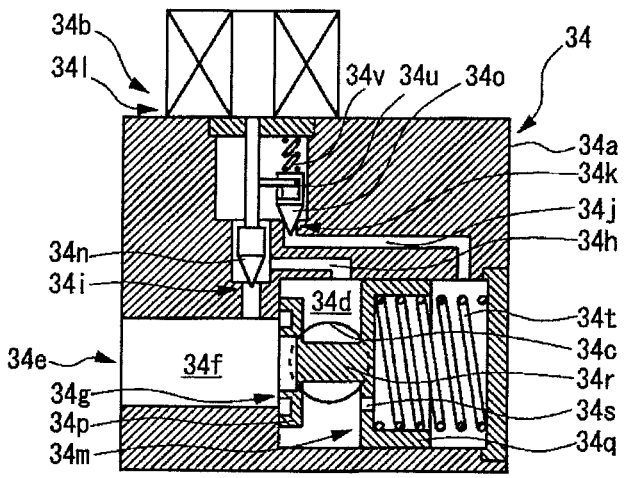
FIG. 34B
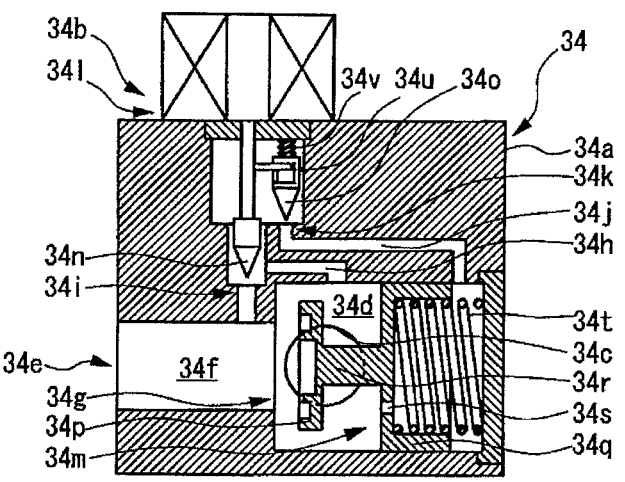
FIG. 34C
*FIG.34*

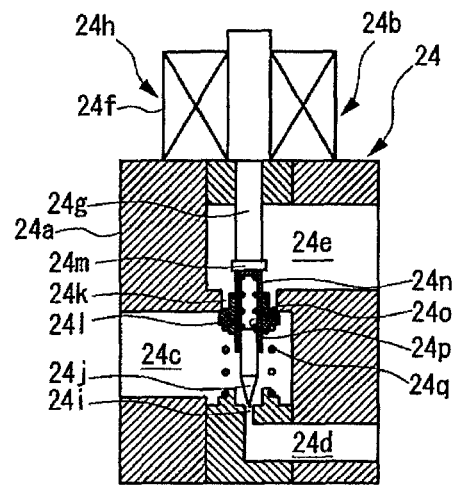
FIG. 36A
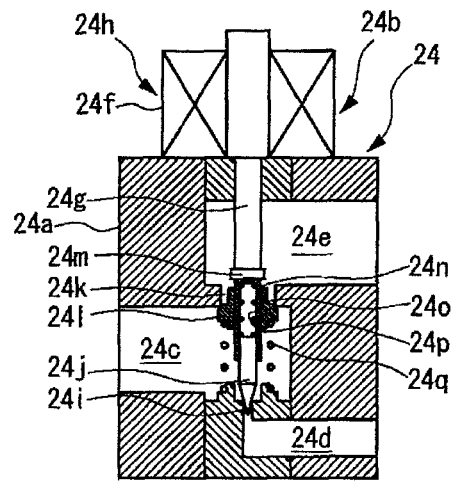
FIG. 36B
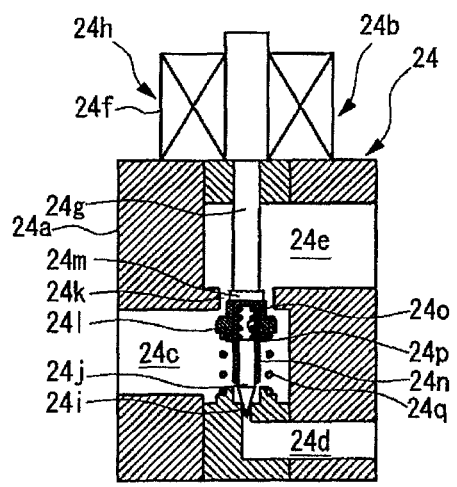
FIG. 36C
*FIG.36*

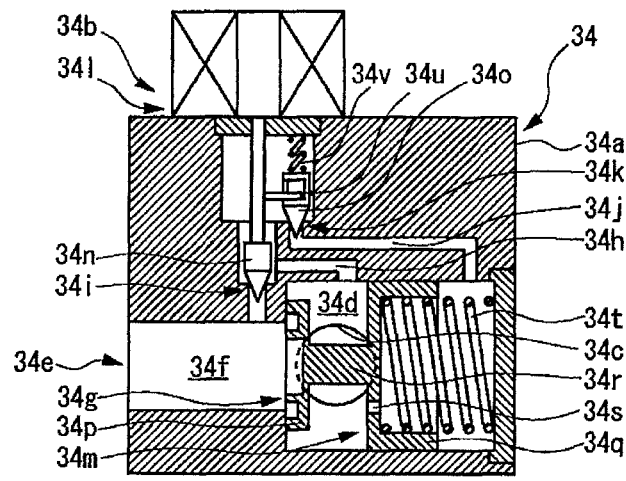
FIG. 50A
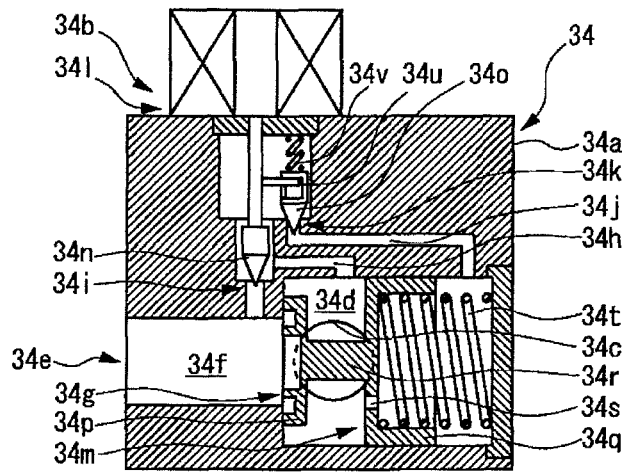
FIG. 50B
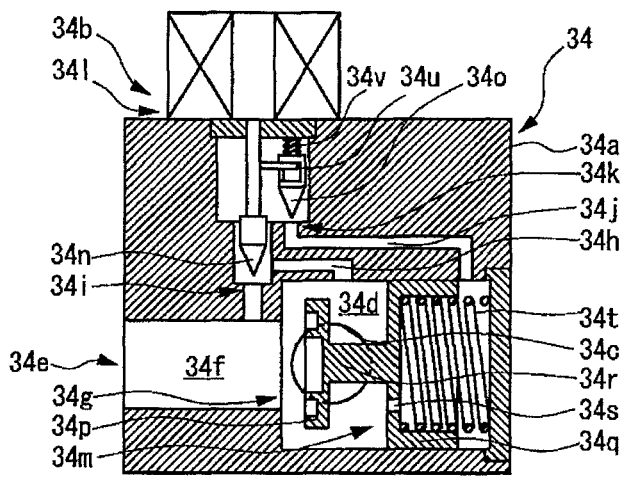
FIG. 50C
*FIG.50*

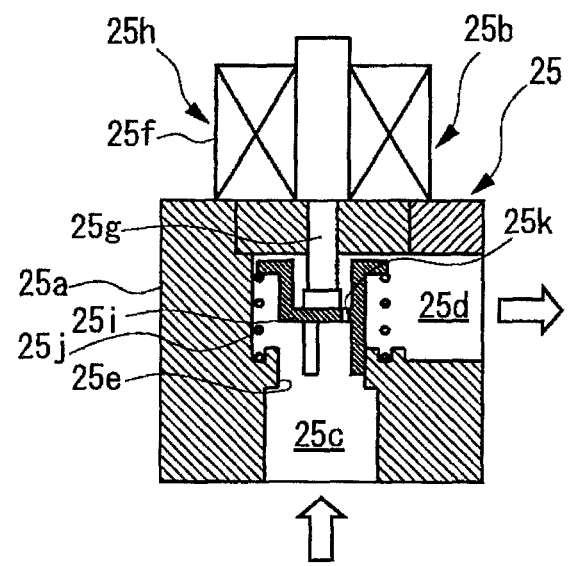
FIG. 52A
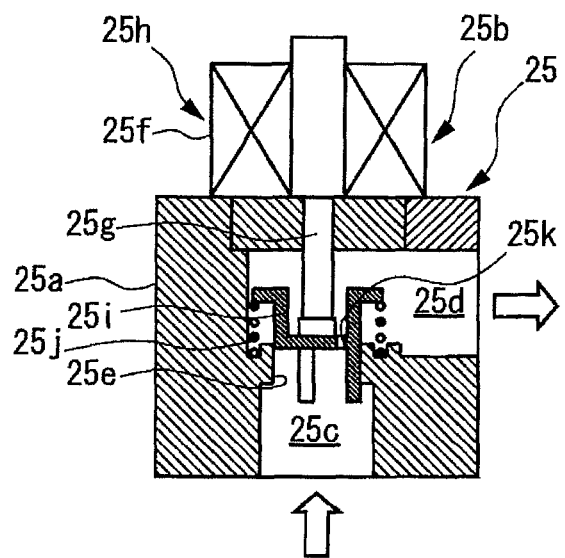
FIG. 52B
*FIG.52*

VEHICLE AIR CONDITIONING APPARATUS

RELATED APPLICATIONS

This application is a divisional of U.S. patent application Ser. No. 14/002,643 filed Oct. 18, 2013 which is a National Stage under 35 U.S.C. 371 of International application No. PCT/JP2012/055441 filed Mar. 2, 2012. Priority is also claimed of Japanese application nos. 2011-046512 filed Mar. 3, 2011, 2011-135014 filed Jun. 17, 2011, 2011-138181 filed Jun. 22, 2011, 2011-172940 filed Aug. 8, 2011 and PCT/JP2012/050991 filed Jan. 18, 2012, the entire contents of all of which are hereby incorporated by reference.

TECHNICAL FIELD

The present invention relates to a vehicle air conditioning apparatus applicable to, for example, electric cars.

BACKGROUND ART

Conventionally, this sort of vehicle air conditioning apparatus includes: a compressor driven by an engine as a power source of a vehicle; a radiator provided outside the vehicle interior; and a heat exchanger provided in the vehicle interior. With this vehicle air conditioning apparatus, a cooling operation is performed by: releasing the heat from the refrigerant discharged from the compressor in the radiator; absorbing the heat into the refrigerant in the heat exchanger; and supplying the air subjected to a heat exchange with the refrigerant in the heat exchanger to the vehicle interior. In addition, such a conventional vehicle air conditioning apparatus includes a heater core and perform a heating operation by: releasing the exhaust heat from the cooling water used to cool the engine in the heater core; and blowing the air subjected to a heat exchange with the cooling water in the heater core to the vehicle interior. Moreover, such a conventional vehicle air conditioning apparatus performs a heating and dehumidifying operation by: cooling the air to be supplied to the vehicle interior to a required absolute humidity in the heat exchanger for dehumidification; heating the cooled and dehumidified air in the heat exchanger to a desired temperature in the heater core; and blowing the heated air to the vehicle interior.

The above-mentioned vehicle air conditioning apparatus uses the exhaust heat from the engine as a heat source to heat the air for a heating operation, or a heating and dehumidifying operation. Generally, an electric car uses an electric motor as a power source, and it is difficult to acquire the exhaust heat that can heat the air by using the electric motor without an engine. Therefore, the above-mentioned vehicle air conditioning apparatus is not applicable to electric cars.

To address this issue, there has been known a vehicle air conditioning apparatus which is applicable to electric cars. The vehicle air conditioning apparatus includes: a compressor configured to compress and discharge a refrigerant; a radiator provided in the vehicle interior and configured to release the heat from a refrigerant; a heat exchanger provided in the vehicle interior and configured to absorb the heat into the refrigerant; and an outdoor heat exchanger provided outside the vehicle interior and configured to release the heat from or absorb the heat into the refrigerant. This vehicle air conditioning apparatus performs a heating operation by releasing the heat from the refrigerant discharged from the compressor in the radiator and absorbing the heat into the refrigerant in the outdoor heat exchanger; a heating and dehumidifying operation by releasing the heat from the refrigerant discharged from the compressor in the radiator and absorbing the heat into the refrigerant in the heat exchanger and the outdoor heat exchanger, or at least in the heat exchanger; a cooling operation by releasing the heat from the refrigerant discharged from the compressor in the outdoor heat exchanger and absorbing the heat into the refrigerant in the heat exchanger; and a cooling and dehumidifying operation by releasing the heat from the refrigerant discharged from the compressor in the radiator and the outdoor heat exchanger and absorbing the heat into the refrigerant in the heat exchanger (see, for example, Patent Literature 1).

In addition, there has been known a vehicle air conditioning apparatus which is applicable to electric cars. The vehicle air conditioning apparatus includes: a compressor configured to compress and discharge a refrigerant; a radiator configured to release the heat from the refrigerant; a heat exchanger configured to absorb the heat into the refrigerant; an outdoor heat exchanger configured to release the heat from or absorb the heat into the refrigerant; a heating operation refrigerant circuit configured to allow the refrigerant discharged from the compressor to flow into the radiator, to allow the refrigerant having passed through the radiator to flow into the outdoor heat exchanger via the expansion part, and to allow the refrigerant having passed through the outdoor heat exchanger to flow into the compressor; a heating and dehumidifying refrigerant circuit configured to allow the refrigerant discharged from the compressor to flow into the radiator, to allow part of the refrigerant having passed through the radiator to flow into the heat exchanger via the expansion part, to allow the remaining refrigerant to flow into the outdoor heat exchanger via the expansion part, and to allow the refrigerant having passed through the heat exchanger and the refrigerant having passed through the outdoor heat exchanger to be sucked into the compressor; and a cooling and dehumidifying refrigerant circuit configured to allow the refrigerant discharged from the compressor to flow into the radiator, to allow the refrigerant having passed through the radiator to flow into the outdoor heat exchanger, to allow the refrigerant having passed through the outdoor heat exchanger to flow into the heat exchanger via the expansion part, and to allow the refrigerant having passed through the heat exchanger to be sucked into the compressor (see, for example, Patent Literature 1).

Moreover, there has been known a vehicle air conditioning apparatus which is applicable to electric cars. The vehicle air conditioning apparatus includes: a compressor configured to compress and discharge a refrigerant; a radiator provided in the vehicle interior and configured to release the heat from a refrigerant; a heat exchanger provided in the vehicle interior and configured to absorb the heat into the refrigerant; and an outdoor heat exchanger provided outside the vehicle interior and configured to release the heat from or absorb the heat into the refrigerant. This vehicle air conditioning apparatus performs: a heating operation by releasing the heat from the refrigerant discharged from the compressor in the radiator and absorbing the heat into the refrigerant in the outdoor heat exchanger; and a cooling and dehumidifying operation to release the heat from the refrigerant discharged from the compressor in the radiator and also the outdoor heat exchanger, and to absorb the heat into the refrigerant in the heat exchanger (see, for example, Patent Literature 1).

Furthermore, there has been known a vehicle air conditioning apparatus which is applicable to electric cars. The vehicle air conditioning apparatus includes: a compressor configured to compress and discharge a refrigerant; a radiator provided in the vehicle interior and configured to release the heat from a refrigerant; a heat exchanger provided in the vehicle interior and configured to absorb the heat into the refrigerant; and an outdoor heat exchanger provided outside the vehicle interior and configured to release the heat from or absorb the heat into the refrigerant. The vehicle air conditioning apparatus performs a heating and dehumidifying operation to release the heat from the refrigerant discharged from the compressor in the radiator, to decompress part of the refrigerant by an expansion valve and absorb the heat into the refrigerant in the heat exchanger while decompressing the remaining refrigerant by the expansion valve and absorbing the heat into the refrigerant in the outdoor heat exchanger (see, for example, Patent Literature 2).

CITATION LIST

Patent Literature

PTL1: Japanese Patent Application Laid-Open No. 2001-324237
PTL2: Japanese Patent Application Laid-Open No. 2009-264661

SUMMARY OF INVENTION

Technical Problem

With such an electric car, during the heating operation and the heating and dehumidifying operation, in order to improve the radiation performance of the radiator, the degree of supercooling of the refrigerant flowing out of the radiator is increased by controlling the opening of an expansion valve to increase the difference in enthalpy between the refrigerant flowing into the radiator and the refrigerant flowing out of the radiator. It is possible to improve the radiation performance of the radiator by increasing the degree of supercooling of the refrigerant flowing out of the radiator. However, the difference in temperature increases between the refrigerant flowing from upstream of the radiator and the refrigerant flowing from downstream of the radiator in the refrigerant flow direction. By this means, the temperature of the air after the heat exchange in the radiator varies between the upstream and downstream of the refrigerant flow direction, and, when the amount of air supplied from the fan is reduced, the difference in temperature increases. This may make it difficult to control the temperature of the air blowing to the vehicle interior.

It is therefore, an object of the present invention to provide a vehicle air conditioning apparatus that can prevent temperature variations of the air after a heat exchange in the radiator to reliably control the temperature of the air supplied to the vehicle interior.

In addition, with the electric car, the radiator and the outdoor exchanger are connected in series, and therefore, during the cooling and dehumidifying operation, the refrigerant discharged from the compressor flows through the radiator and then flows through the outdoor heat exchanger. The refrigerant discharged from the compressor releases the heat both in the radiator and the outdoor heat exchanger. Here, the quantity of heat release in each of the radiator and the outdoor heat exchanger varies depending on the quantity of the air subjected to a heat exchange with the flowing refrigerant. Therefore, when, for example, the vehicle is running, and therefore the quantity of air increases, which is subjected to a heat exchange with the refrigerant flowing through the outdoor heat exchanger provided outside the vehicle interior, the quantity of heat release in the outdoor heat exchanger increases while the quantity of heat release in the radiator reduces. When the quantity of heat release is reduced during the cooling and dehumidifying operation, the dehumidified air obtained by cooling the air in the heat exchanger cannot be heated to a target temperature in the radiator. This makes it difficult to set the temperature of the vehicle interior to a preset temperature.

It is therefore, an object of the present invention to provide a vehicle air conditioning apparatus that can reliably set the temperature of the air supplied to the vehicle interior to a preset temperature by securing the quantity of heat release required in the radiator during the cooling and dehumidifying operation.

In addition, with the electric car, the radiator and the outdoor exchanger are connected in series, and therefore, during the cooling and dehumidifying operation, the refrigerant discharged from the compressor flows through the radiator and then flows through the outdoor heat exchanger. The refrigerant discharged from the compressor releases the heat both in the radiator and the outdoor heat exchanger. Here, the quantity of heat release in each of the radiator and the outdoor heat exchanger varies depending on the quantity of the air subjected to a heat exchange with the flowing refrigerant. Therefore, when, for example, the vehicle is running, and therefore the quantity of air increases, which is subjected to a heat exchange with the refrigerant flowing through the outdoor heat exchanger provided outside the vehicle interior, the quantity of heat release in the outdoor heat exchanger increases while the quantity of heat release in the radiator reduces. When the quantity of heat release is reduced during the cooling and dehumidifying operation, the dehumidified air obtained by cooling the air in the heat exchanger cannot be heated to a target temperature in the radiator. This makes it difficult to set the temperature of the vehicle interior to a preset temperature.

It is therefore, an object of the present invention to provide a vehicle air conditioning apparatus that can reliably set the temperature of the air supplied to the vehicle interior to a preset temperature by securing the quantity of heat release required in the radiator during the cooling and dehumidifying operation.

Moreover, with the electric car, temperature expansion valves are provided, as expansion valves, which one is provided upstream of the direction to flow the refrigerant into the radiator and the other is provided upstream of the direction to flow the refrigerant into the outdoor heat exchanger, in order to keep the evaporating temperature of the refrigerant constant in each of the heat exchanger and the outdoor heat exchanger during the heating and dehumidifying operation. In this case, it is not possible to control the heat absorbing performance in the heat exchanger and the outdoor heat exchanger individually. Therefore, if the outdoor temperature is low, the evaporating temperature of the refrigerant in the outdoor heat exchanger is reduced, and consequently a frost is likely to be formed on the heat exchanger. If a frost is formed on the heat exchanger, the quantity of heat absorbed into the refrigerant in the heat exchanger is reduced, so that the heat radiation performance of the radiator deteriorates. This makes it difficult to control the temperature and the humidity of the vehicle interior to a preset temperature and a setting humidity.

It is therefore, an object of the present invention to provide a vehicle air conditioning apparatus that can secure the required quantity of heat absorbed into the refrigerant in the heat exchanger during the heating and dehumidifying operation, regardless of environmental conditions, for example, even if the outdoor temperature is low.

Solution to Problem

To achieve the above-described objects, the vehicle air conditioning apparatus according to the present invention includes: a compressor configured to compress and discharge a refrigerant; a radiator provided in a vehicle interior and configured to release heat from the refrigerant; a heat exchanger provided in the vehicle interior and configured to absorb the heat into the refrigerant; and an outdoor heat exchanger provided outside the vehicle interior and configured to release the heat from or absorb the heat into the refrigerant, the vehicle air conditioning apparatus performing: a heating operation to release the heat from the refrigerant discharged from the compressor in the radiator, to decompress the refrigerant by an expansion valve, and to absorb the heat into the refrigerant in the outdoor heat exchanger; and a heating and dehumidifying operation to release the heat from the refrigerant discharged from the compressor in the radiator, to decompress the refrigerant by the expansion valve and to absorb the heat into the refrigerant in the heat exchanger and the outdoor heat exchanger, or at least in the heat exchanger, the vehicle air conditioning apparatus further including: an indoor fan configured to allow air to flow, the air being subjected to a heat exchange with the refrigerant flowing through both or one of the radiator and the heat exchanger and then blowing to the vehicle interior; a target supercooling setting part configured to set a target degree of supercooling of the refrigerant such that the target degree of supercooling of the refrigerant flowing out of the radiator when a target air temperature of the air having been heated in the radiator is higher than a predetermined temperature is higher than the target degree of supercooling that is set when the target air temperature is lower than the predetermined temperature; and a valve opening control part configured to control an opening of the expansion valve such that a degree of supercooling of the refrigerant flowing out of the radiator is the target degree of supercooling set by the target supercooling setting part, wherein: the target supercooling setting part includes a first correction part configured to correct the set target degree of supercooling according to an amount of the air supplied from the indoor fan; and the target supercooling setting part corrects the target degree of supercooling such that when the amount of the air supplied from the indoor fan is smaller than a predetermined value, the degree of supercooling is lower than the target degree of supercooling that is corrected when the amount of the air supplied from the indoor fan is the predetermined value or greater.

By this means, it is possible to reduce the degree of supercooling of the refrigerant when the amount of air supplied from the indoor fan, and therefore to reduce the difference in temperature between the refrigerant flowing from upstream of the radiator and the refrigerant flowing from downstream of the radiator in the refrigerant flow direction.

To achieve the above-described objects, the vehicle air conditioning apparatus according to the present invention includes: a compressor configured to compress and discharge a refrigerant; a radiator configured to release heat from the refrigerant; a heat exchanger configured to absorb the heat into the refrigerant; an outdoor heat exchanger configured to release the heat from or absorb the heat into the refrigerant; a heating refrigerant circuit configured to allow the refrigerant discharged from the compressor to flow into the radiator, to allow the refrigerant to flow into the outdoor heat exchanger via an expansion part, and allow the refrigerant to be sucked into the compressor; a heating and dehumidifying refrigerant circuit configured to allow the refrigerant discharged from the compressor to flow into the radiator, to allow part of the refrigerant to flow into the heat exchanger via the expansion part while allowing a remaining refrigerant to flow into the outdoor heat exchanger via the expansion part, and to allow the refrigerant to be sucked into the compressor; a cooling/cooling and dehumidifying refrigerant circuit configured to allow the refrigerant discharged from the compressor to flow into the radiator, to allow the refrigerant to flow into the outdoor heat exchanger, to allow the refrigerant to flow into the heat exchanger via the expansion part and to allow the refrigerant to be sucked into the compressor; and a high-pressure refrigerant flow regulating valve provided in a refrigerant flow passage between the radiator and the outdoor heat exchanger in the cooling/cooling and dehumidifying refrigerant circuit, the high-pressure refrigerant flow regulating valve being able to regulate an amount of the refrigerant flowing out of the radiator and into the outdoor heat exchanger.

By this means, the condensing pressure of the refrigerant flowing out of the radiator in the cooling and dehumidifying refrigerant circuit is regulated by the high-pressure refrigerant flow regulating valve. Therefore, the quantity of heat release in the radiator is controlled during the cooling and dehumidifying operation, and consequently it is possible to secure the amount of heating to heat the air blowing to the vehicle interior.

To achieve the above-described objects, the vehicle air conditioning apparatus according to the present invention includes: a compressor configured to compress and discharge a refrigerant; a radiator provided in a vehicle interior and configured to release heat from the refrigerant; a heat exchanger provided in the vehicle interior and configured to absorb the heat into the refrigerant; and an outdoor heat exchanger provided outside the vehicle interior and configured to release the heat from or absorb the heat into the refrigerant, the vehicle air conditioning apparatus performing: a heating operation to release the heat from the refrigerant discharged from the compressor in the radiator, and to absorb the heat into the refrigerant in the outdoor heat exchanger; and a cooling and dehumidifying operation to release the heat from the refrigerant discharged from the compressor in the radiator, and additionally to release the heat from the refrigerant in the outdoor heat exchanger, and then to absorb the heat into the refrigerant in the heat exchanger, the vehicle air conditioning apparatus further including: an expansion valve provided in a refrigerant flow passage between the radiator and the outdoor heat exchanger during the heating operation, the expansion valve having an adjustable opening and configured to decompress the refrigerant flowing through the refrigerant flow passage; a condensing pressure regulating valve provided in a refrigerant flow passage parallel to the refrigerant flow passage in which the expansion valve is provided, the condensing pressure regulating valve configured to regulate an amount of the refrigerant flowing out of the radiator and into the outdoor heat exchanger to regulate a condensing pressure of the refrigerant in the radiator during the cooling and dehumidifying operation; and a valve opening control part configured to close a refrigerant flow channel to the condensing pressure regulating valve to control the opening of the expansion valve during the heating operation, and configured to close a refrigerant flow channel to the expansion valve to control an opening of the condensing pressure regulating valve during the cooling and dehumidifying operation.

By this means, it is possible to regulate the condensing pressure of the refrigerant in the radiator by the condensing pressure regulating valve during the cooling and dehumidifying operation. Therefore, it is possible to secure the amount of heating to heat the air blowing to the vehicle interior during the cooling and dehumidifying operation.

To achieve the above-described objects, the vehicle air conditioning apparatus according to the present invention includes: a compressor configured to compress and discharge a refrigerant; a radiator provided in a vehicle interior and configured to release heat from the refrigerant; a heat exchanger provided in the vehicle interior and configured to absorb the heat into the refrigerant; and an outdoor heat exchanger provided outside the vehicle interior and configured to release the heat from or absorb the heat into the refrigerant, the vehicle air conditioning apparatus performing: a heating operation to release the heat from the refrigerant discharged from the compressor in the radiator, and to absorb the heat into the refrigerant in the outdoor heat exchanger; and a cooling and dehumidifying operation to release the heat from the refrigerant discharged from the compressor in the radiator, and additionally to release the heat from the refrigerant in the outdoor heat exchanger, and then to absorb the heat into the refrigerant in the heat exchanger, the vehicle air conditioning apparatus further including: a flow regulating valve provided in a refrigerant flow passage that allows the refrigerant flowing out of the radiator to flow into the outdoor heat exchanger, an opening of the flow regulating valve being regulated within following two ranges: a decompression range that allows the refrigerant flowing through the refrigerant flow passage to be decompressed during the heating operation; and a condensing pressure regulating range that allows an opening area of the flow regulating valve to be a same as an opening area of an upstream or downstream refrigerant flow channel when the opening of the flow regulating valve is maximized, and that can regulate the condensing pressure of the refrigerant in the radiator by regulating an amount of the refrigerant flowing through the refrigerant flow channel during the cooling and dehumidifying operation; and a valve opening control part configured to control the opening of the flow regulating valve within the decompression range during the heating operation, and to control the opening of the flow regulating valve within the condensing pressure regulating range during the cooling and dehumidifying operation.

By this means, during the cooling and dehumidifying operation, it is possible to regulate the condensing pressure of the refrigerant in the radiator by adjusting the opening of the expansion valve in the condensing pressure regulating range. Therefore, it is possible to secure the amount of heating to heat the air blowing to the vehicle interior during cooling and dehumidifying operation.

In addition, to achieve the above-described objects, the vehicle air conditioning apparatus according to the present invention includes: a compressor configured to compress and discharge a refrigerant; a radiator provided in a vehicle interior and configured to release heat from the refrigerant; a heat exchanger provided in the vehicle interior and configured to absorb the heat into the refrigerant; and an outdoor heat exchanger provided outside the vehicle interior and configured to release the heat from or absorb the heat into the refrigerant, the vehicle air conditioning apparatus performing: a heating and dehumidifying operation to release the heat from the refrigerant discharged from the compressor in the radiator, to decompress part of the refrigerant by an expansion valve, and to absorb the heat into the refrigerant in the heat exchanger while decompressing a remaining refrigerant by the expansion valve and then absorbing the heat into the refrigerant in the outdoor heat exchanger, the vehicle air conditioning apparatus further including: an evaporating temperature regulating valve provided in a refrigerant flow passage to an output side of the heat exchanger from which the refrigerant is discharged and configured to regulate an evaporating temperature of the refrigerant in the heat exchanger by regulating an amount of the refrigerant flowing through the refrigerant flow passage; and a valve opening control part configured to control an opening of the evaporating temperature regulating valve during the heating and dehumidifying operation, wherein the opening of the evaporating temperature regulating valve can be set to two different openings, and the valve opening control part sets the opening to one of the two different openings.

Moreover, to achieve the above-described objects, the vehicle air conditioning apparatus according to the present invention includes: a compressor configured to compress and discharge a refrigerant; a radiator provided in a vehicle interior and configured to release heat from the refrigerant; a heat exchanger provided in the vehicle interior and configured to absorb the heat into the refrigerant; and an outdoor heat exchanger provided outside the vehicle interior and configured to release the heat from or absorb the heat into the refrigerant, the vehicle air conditioning apparatus performing: a heating and dehumidifying operation to release the heat from the refrigerant discharged from the compressor in the radiator, to decompress part of the refrigerant by an expansion valve, and to absorb the heat into the refrigerant in the heat exchanger while decompressing a remaining refrigerant by the expansion valve and then absorbing the heat into the refrigerant in the outdoor heat exchanger, the vehicle air conditioning apparatus further including: an evaporating temperature regulating valve provided in a refrigerant flow passage to an output side of the heat exchanger from which the refrigerant is discharged and configured to regulate an evaporating temperature of the refrigerant in the heat exchanger by regulating an amount of the refrigerant flowing through the refrigerant flow passage; and a valve opening control part configured to control an opening of the evaporating temperature regulating valve during the heating and dehumidifying operation, wherein the opening of the evaporating temperature regulating valve can be optionally set by the valve opening control part.

By this means, it is possible to control the opening of the evaporating temperature regulating valve during the heating and dehumidifying operation. Therefore, it is possible to prevent the evaporating temperature of the refrigerant from dropping in the radiator during the heating and dehumidifying operation.

Effect of the Invention

According to the present invention, it is possible to reduce the difference in temperature between the refrigerant flowing from upstream of the radiator and the refrigerant flowing from downstream of the radiator in the refrigerant flow direction. By this means, it is possible to prevent temperature variations of the air after a heat exchange in the radiator, and therefore to reliably control the temperature of the air supplied to the vehicle interior.

In addition, according to the present invention, during the cooling and dehumidifying operation, it is possible to secure the amount of heating to heat the air blowing to the vehicle interior by regulating the quantity of heat release in the radiator. Therefore, it is possible to ensure that the temperature of the air supplied to the vehicle interior is a preset temperature.

Moreover, according to the present invention, during the cooling and dehumidifying operation, it is possible to secure the amount of heating to heat the air blowing to the vehicle interior, and therefore to reliably control the temperature of the air supplied to the vehicle interior to a preset temperature.

Furthermore, according to the present invention, during the heating and dehumidifying operation, it is possible to prevent the evaporating temperature of the refrigerant from dropping in the heat exchanger. This prevents a frost from being formed even if the outdoor temperature is low, and therefore it is possible to secure the quantity of heat to be absorbed into the refrigerant in the heat exchanger.

BRIEF DESCRIPTION OF DRAWINGS

FIGS. 16A, 16B and 16C are schematic cross-sectional views showing a first control valve;

FIGS. 34A, 34B and 34C are schematic cross-sectional views showing a third control valve;

FIGS. 36A, 36B and 36C are schematic cross-sectional views showing the first control valve;

FIGS. 50A, 50B and 50C are schematic views showing the third control valve;

FIG. 52A is a cross-sectional view showing a state in which a communicating hole of a second control valve is open;

FIG. 52B is a cross-sectional view showing a state in which the communicating hole of the second control valve is closed;

DESCRIPTION OF EMBODIMENTS

FIG. 1 to FIG. 10 show Embodiment 1 of the present invention.

Figure 1:
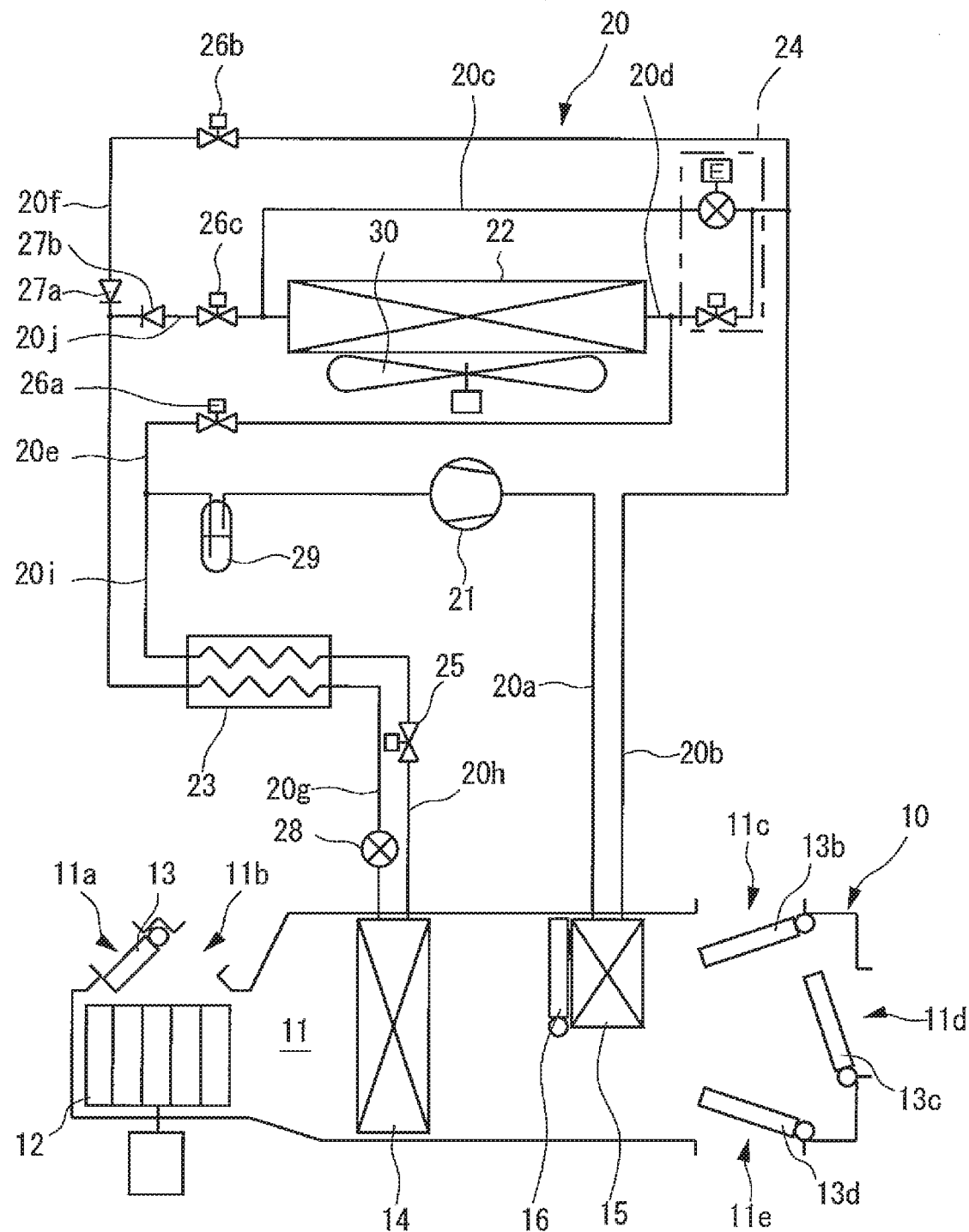
FIG. 1 is a schematic view showing a vehicle air conditioning apparatus according to Embodiment 1 of the present invention.

As shown in FIG. 1, the vehicle air conditioning apparatus according to the present invention includes an air conditioning unit 10 provided in the vehicle interior, and a refrigerant circuit 20 formed across the vehicle interior and the outdoor.

The air conditioning unit 10 includes an air flow passage 11 that allows the air to be supplied to the vehicle interior to pass through. An outdoor air inlet 11a and an indoor air inlet 11b are provided in the first end side of the air flow passage 11. The outdoor air inlet 11a is configured to allow the outdoor air to flow into the air flow passage 11, and the indoor air inlet 11b is configured to allow the indoor air to flow into the air flow passage 11. Meanwhile, a foot outlet 11c, a vent outlet 11d and a defroster outlet 11e are provided in the second end side of the air flow passage 11. The foot outlet 11c is configured to allow the air flowing through the air flow passage 11 to blow to the feet of the passengers in the vehicle. The vent outlet 11d is configured to allow the air flowing through the air flow passage 11 to blow to the upper bodies of the passengers in the vehicle. The defroster outlet 11e is configured to allow the air flowing through the air flow passage 11 to blow to the interior surface of the front window.

An indoor fan 12 such as a sirocco fan configured to allow the air to flow through the air flow passage 11 from end to end is provided in the first end side of the air flow passage 11. This indoor fan 12 is driven by the electric motor 12a.

Also, in the first end side of the air flow passage 11, an inlet switching damper 13 configured to open one of the outdoor air inlet 11a and the indoor air inlet 11b and to close the other. This inlet switching damper 13 is driven by the electric motor 13a. When the inlet switching damper 13 closes the indoor air inlet 11b and opens the outdoor air inlet 11a, the mode is switched to an outdoor air supply mode in which the air flows from the outdoor air inlet 11a into the air flow passage 11. Meanwhile, when the inlet switching damper 13 closes the outdoor air inlet 11a and opens the indoor air inlet 11b, the mode is switched to an indoor air circulation mode in which the air flows from the indoor air inlet 11b into the air flow passage 11. Moreover, when the inlet switching damper 13 is placed between the outdoor air inlet 11a and the indoor air inlet 11b and the outdoor air inlet 11a and the indoor air inlet 11b open, the mode is switched to a two-way mode in which the air flows from both the outdoor air inlet 11a and the indoor air inlet 11b into the air flow passage 11 according to the opening ratio of the outdoor air inlet 11a and the indoor air inlet 11b.

Outlet switching dampers 13b, 13c and 13d configured to open and close the foot outlet 11c, the vent outlet 11d and the defroster outlet 11e are provided in the foot outlet 11c, the vent outlet 11d and the defroster outlet 11e, respectively, in the second side of the air flow passage 11. These outlet switching dampers 13b, 13c and 13d are configured to move together by a linkage (not shown) and are opened and closed by the electric motor 13e. Here, when the outlet switching dampers 13b, 13c and 13d open the foot outlet 1c, close the vent outlet 11d and slightly open the defroster outlet 11e, most of the air flowing through the air flow passage 11 blows out of the foot outlet 11c and the remaining air blows out of the defroster outlet 11e. This mode is referred to as "foot mode." Meanwhile, when the outlet switching dampers 13b, 13c and 13d close the foot outlet 11c and the defroster outlet 11e, and open the vent outlet 11d, all the air flowing through the air flow passage 11 blows out of the vent outlet 11d. This mode is referred to as "vent mode." In addition, when the outlet switching dampers 13b, 13c and 13d open the foot outlet 11c and the vent outlet 11d, and close the defroster outlet 11e, the air flowing through the air flow passage 11 blows out of the foot outlet 11c and the vent outlet 11d. This mode is referred to as "bi-level mode." Moreover, when the outlet switching dampers 13b, 13c and 13d close the foot outlet 11c and the vent outlet 11d, and open the defroster outlet 11e, the air flowing through the air flow passage 11 blows out of the defroster outlet 11e. This mode is referred to as "defroster mode." Furthermore, when the outlet switching dampers 13b, 13c and 13d close the vent outlet 11d and open the foot outlet 11c and the defroster outlet 11e, the air flowing through the air flow passage 11 blows out of the foot outlet 11c and the defroster outlet 11e. This mode is referred to as "defroster-foot mode." Here, in the bi-level mode, the air flow passage 11, the foot outlet 11c, the vent outlet 11d, and a heat exchanger and a radiator which will be described later, are arranged and configured such that the temperature of the air blowing out of the foot outlet 11c is higher than the temperature of the air blowing out of the vent outlet 11d.

A heat exchanger 14 is provided in the air flow passage 11 in the downstream of the air flow from the indoor fan 12. The heat exchanger 14 is configured to cool and dehumidify the air flowing through the air flow passage 11. In addition, a radiator 15 is provided in the air flow passage 11 in the downstream of the air flow from the heat exchanger 14. The radiator 15 is configured to heat the air flowing through the air flow passage 11. The heat exchanger 14 and the radiator 15 are heat exchangers, each of which is constituted by fins and tubes and which is configured to perform a heat exchange between the refrigerant flowing therethrough and the air flowing through the air flow passage 11.

An air mix damper 16 is provided between the heat exchanger 14 and the radiator 15 in the air flow passage 11 and is configured to control the percentage of the air to be heated, which is flowing through the air flow passage 11. The air mix damper 16 is driven by the electric motor 16a. When the air mix damper 16 is disposed in the air flow passage 11 in the upstream of the radiator 15, the percentage of the air subjected to a heat exchange in the radiator 15 is reduced. Meanwhile, when the air mix damper 16 is moved to a position other than the radiator 15 in the air flow passage 11, the percentage of the air subjected to a heat exchange is increased. In the air flow passage 11, when the air mix damper 16 closes the upstream side of the radiator 15 and opens the portion other than the radiator 15, the opening is 0%, and, on the other hand, when the air mix damper 16 opens the upstream side of the radiator 15 and closes the portion other than the radiator 15, the opening is 100%.

The refrigerant circuit 20 includes: the heat exchanger 14; the radiator 15; a compressor 21 configured to compress a refrigerant; an outdoor heat exchanger 22 configured to perform a heat exchange between the refrigerant and the outdoor air; an indoor heat exchanger 23 configured to perform a heat exchange between the refrigerant flowing out of the heat exchanger 14 and the refrigerant flowing out of the radiator 15 and the outdoor heat exchanger 22, or at least of the radiator 15; a first control valve 24 including an expansion part configured to decompress the refrigerant flowing into the outdoor heat exchanger 22 during the heating operation, and a condensing pressure regulating part configured to regulate the condensing pressure of the refrigerant in the radiator during the cooling and dehumidifying operation; a second control valve 25 having a function as an evaporating pressure regulating part to regulate the evaporating pressure of the refrigerant in the heat exchanger 14; first to third solenoid valves 26a, 26b and 26c; first and second check valves 27a and 27b, an expansion valve 28; and an accumulator 29 configured to separate refrigerant liquid from refrigerant vapor to prevent the refrigerant liquid from being sucked into the compressor 21. These components are connected to each other by a copper pipe or an aluminum pipe.

To be more specific, input side of the radiator 15 into which the refrigerant flows is connected to the delivery side of the compressor 21 from which the refrigerant is discharged to form the refrigerant flow passage 20a. In addition, the input side of the first control valve 24 into which the refrigerant flows is connected to the output side of the radiator 15 from which the refrigerant is discharged, thereby to form the refrigerant flow passage 20b. The first end side of the outdoor heat exchanger 22 is connected to the output side of the expansion part of first control valve 24 from which the refrigerant is discharged, thereby to form the refrigerant flow passage 20c. Meanwhile, the second end side of the outdoor heat exchanger 22 is connected to the output side of the condensing pressure regulating part of the first control valve 24 from which the refrigerant discharged, thereby to form the refrigerant flow passage 20d. The suction side of the compressor 21 into which the refrigerant is sucked is connected to the second end side of the outdoor heat exchanger 22, in parallel with the refrigerant flow passage 20d, thereby to form the refrigerant flow passage 20e. The first solenoid valve 26a and the accumulator 29 are provided in the refrigerant flow passage 20e in the order from the upstream of the flow of the refrigerant. The input side of the indoor heat exchanger 23 into which a high-pressure refrigerant flows is connected to the refrigerant flow passage 20b, thereby to form the refrigerant flow passage 20f. In the refrigerant flow passage 20f, the second solenoid valve 26b and the first check valve 27a are provided in the order from the upstream of the refrigerant flow direction. The input side of the heat exchanger 14 into which the refrigerant flows is connected to the output side of the indoor heat exchanger 23 from which the high-pressure refrigerant is discharged, thereby to form the refrigerant flow passage 20g. The expansion valve 28 is provided in the refrigerant flow passage 20g. The input side of the indoor heat exchanger 23 into which a low-pressure refrigerant flows is connected to the output side of the heat exchanger 14 from which the refrigerant is discharged, thereby to form the refrigerant flow passage 20h. The second control valve 25 is provided in the refrigerant flow passage 20h. The part of the refrigerant flow passage 20e between the first solenoid valve 26a and the accumulator 29 is connected to the output side of the indoor heat exchanger 23 from which the low-pressure refrigerant is discharged, thereby to form the refrigerant flow passage 20i. Part of the refrigerant flow passage 20f located downstream from the first check valve 27a in the refrigerant flow direction is connected to the first end side of the outdoor heat exchanger 22, in parallel with the refrigerant flow passage 20c, thereby to form the refrigerant flow passage 20j. The third solenoid valve 26c and the second check valve 27b are provided in the refrigerant flow passage 20j in the order from the upstream of the refrigerant flow direction.

The compressor 21 and the outdoor heat exchanger 22 are disposed outside the vehicle interior. The compressor 21 is driven by the electric motor 21a. The outdoor heat exchanger 22 includes an outdoor fan 30 configured to perform a heat exchange between the outdoor air and the refrigerant while the vehicle stops. The outdoor fan 30 is driven by the electric motor 30a.

In the first control valve 24, a refrigerant flow channel to the expansion part and a refrigerant flow channel to the condensing pressure regulating part are formed. The refrigerant flow channels to the expansion part and the condensing pressure regulating part can be completely closed by valves that regulate the openings of the refrigerant flow channels, respectively.

Moreover, the vehicle air conditioning apparatus also includes a controller 40 that controls the temperature and the humidity of the vehicle interior to be the preset temperature and humidity.

The controller 40 includes a CPU, a ROM and a RAM. In the controller, upon receiving an input signal from a device connected to the input side, the CPU reads the program stored in the ROM according to the input signal, stores the state detected by the input signal on the RAM and transmits an output signal to a device connected to the output side.

Figure 2:
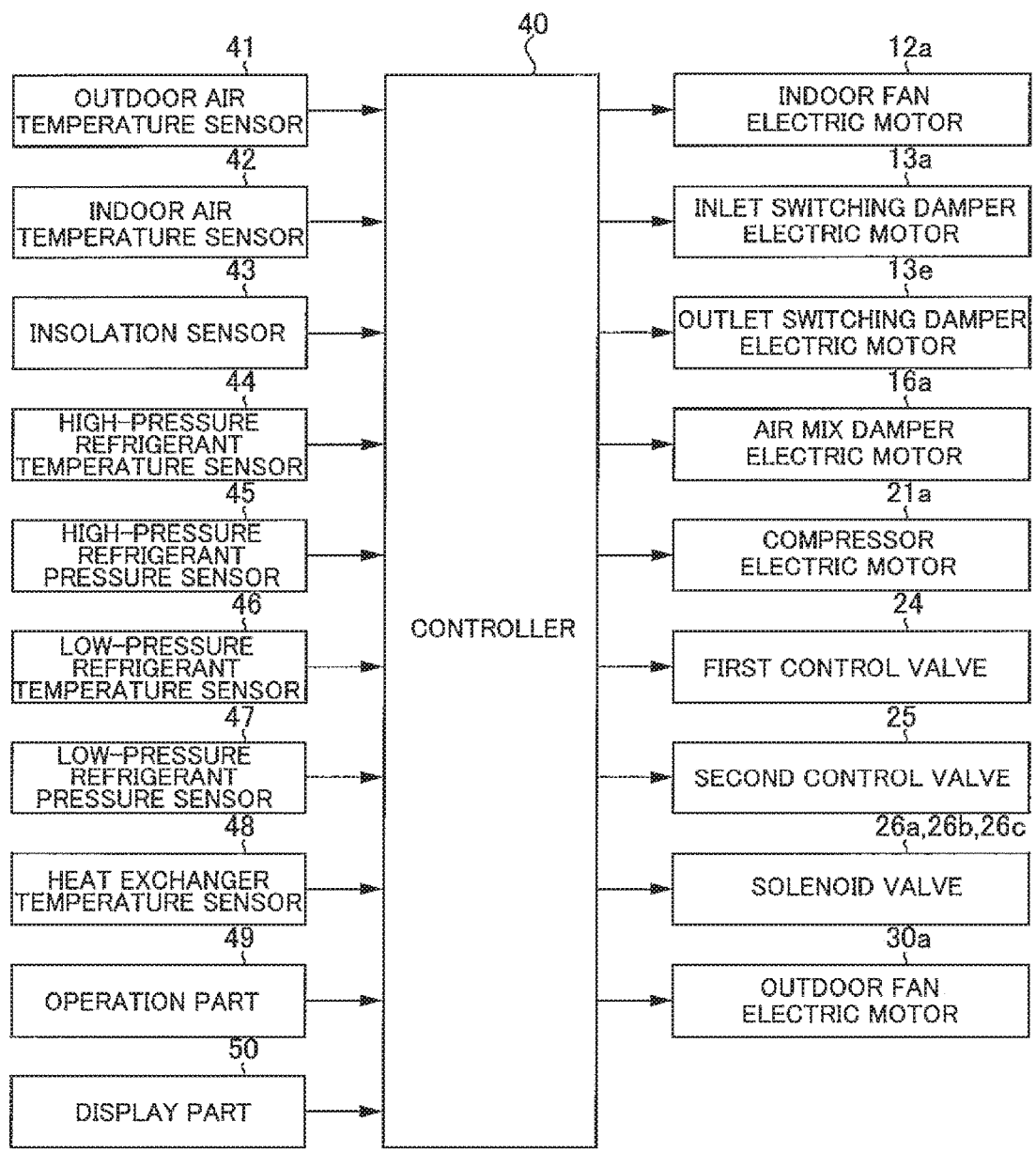
FIG. 2 is a block diagram showing a control system.

As shown in FIG. 2, an electric motor 12a for driving the indoor fan 12; an electric motor 13a for driving the inlet switching damper 13; an electric motor 13e for driving the outlet switching dampers 13b, 13c and 13d; an electric motor 16a for driving the air mix damper 16; an electric motor 21a for driving the compressor 21; the first control valve 24; the second control valve 25; the first to third solenoid valves 26a, 26b and 26c and an electric motor 30a for driving the outdoor fan 30 are connected to the output side of the controller 40.

As shown in FIG. 2, an outdoor air temperature sensor 41 configured to detect temperature Tam outside the vehicle interior; an indoor air temperature sensor 42 configured to detect indoor air temperature Tr; an insolation sensor 43 such as a photo sensor configured to detect amount of insolation Ts;
a high-pressure refrigerant temperature sensor 44 configured to detect temperature Thp of a high-pressure refrigerant flowing through the refrigerant flow passage 20b; a high-pressure refrigerant pressure sensor 45 configured to detect pressure Php of the high-pressure refrigerant flowing through the refrigerant flow passage 20b; a low-pressure refrigerant temperature sensor 46 configured to detect temperature Tlp of the low-pressure refrigerant that flows through the refrigerant flow passage 20e and is sucked into the compressor 21; a low-pressure refrigerant pressure sensor 47 configured to detect pressure Plp of the refrigerant that flows through the refrigerant flow passage 20e and is sucked into the compressor 21; a heat exchanger temperature sensor 48 configured to detect evaporating temperature Te of the refrigerant in the heat exchanger 14; an operation part 49 configured to set modes regarding to target preset temperature Tset and the switching of the operation; and a display part 50 configured to display the indoor air temperature Tr and operation states, are connected to the output side of the controller 40.

The vehicle air conditioning apparatus having the above-described configuration performs cooling operation, cooling and dehumidifying operation, heating operation, first heating and dehumidifying operation, and second heating and dehumidifying operation. Now, each operation will be explained.

Figure 3:
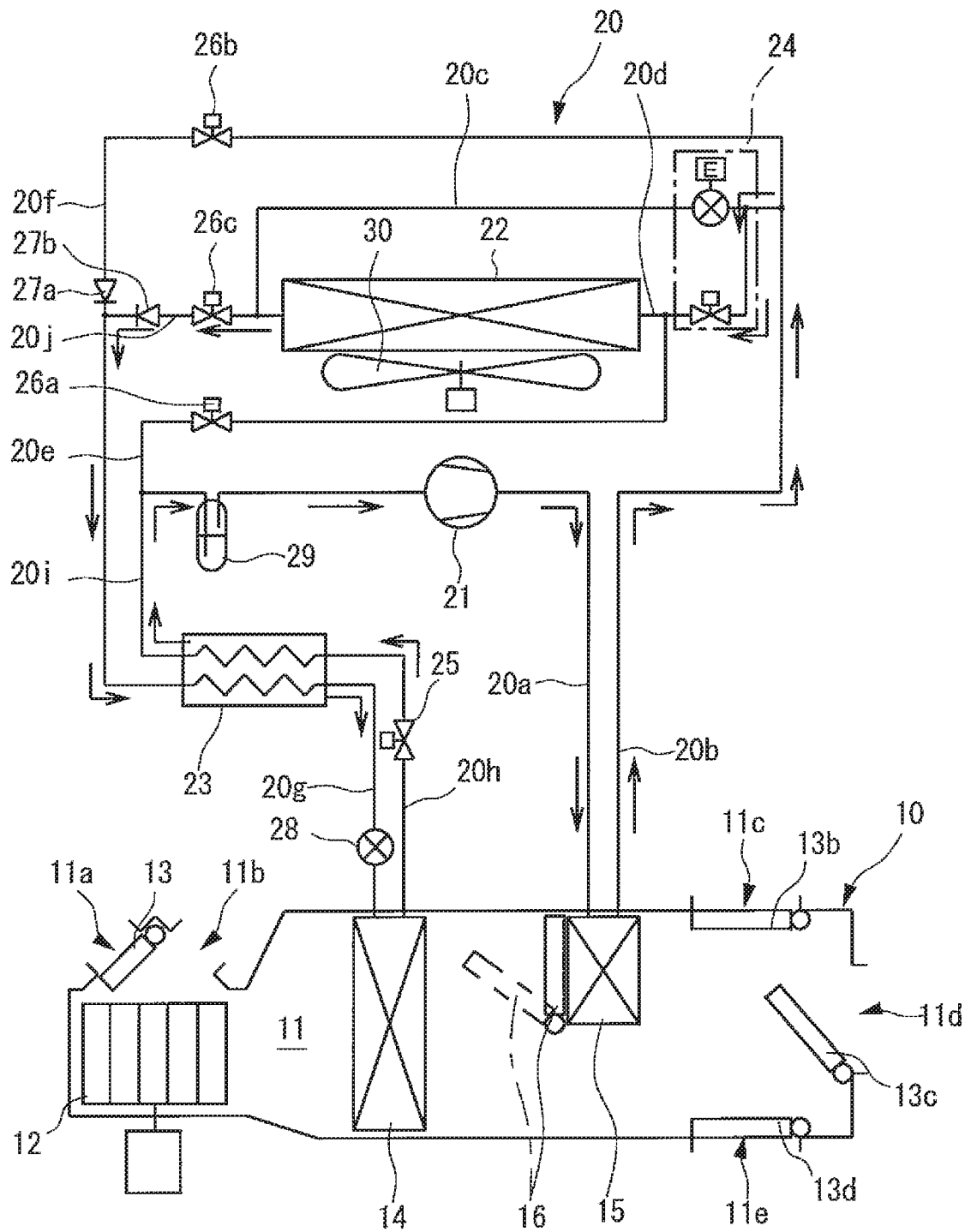
FIG. 3 is a schematic view showing the vehicle air conditioning apparatus performing a cooling operation and a cooling and dehumidifying operation.

During the cooling and dehumidifying operation, in the refrigerant circuit 20, the refrigerant flow channel to the expansion part is closed while the refrigerant flow channel to the condensing pressure regulating part is opened in the first control valve 24; the third solenoid valve 26c is opened; the first and second solenoid valves 26a and 26b are closed; and compressor 21 is operated. By this means, as shown in FIG. 3, the refrigerant discharged from the compressor 21 flows through in this order: the refrigerant flow passage 20a; the radiator 15; the refrigerant flow passages 20b and 20d; the outdoor heat exchanger 22, the refrigerant flow passages 20j and 20f; the high-pressure side of the indoor heat exchanger 23; the refrigerant flow passage 20g; the heat exchanger 14; the refrigerant flow passage 20h; the low-pressure side of the indoor heat exchanger 23; and the refrigerant flow passages 20i and 20e, and is sucked into the compressor 21. During the cooling operation, the refrigerant flowing through the refrigerant circuit 20 releases the heat in the outdoor heat exchanger 22 and absorbs the heat in the heat exchanger 14. During the cooling and dehumidifying operation, when the air mix damper 16 is opened as shown by the dashed-dotted line of FIG. 3, the refrigerant flowing through the refrigerant circuit 20 releases the heat also in the radiator 15.

In this case, in the air conditioning unit 10 during the cooling operation, the indoor fan 12 is operated to flow the air through the air flow passage 11, and the air is subjected to a heat exchange with the refrigerant in the heat exchanger 14 and cooled. The temperature of the cooled air becomes target air-blowing temperature TAO of the air to blow out of the outlets 11c, 11d and 11e to the vehicle interior in order to set the temperature of the vehicle interior to the target preset temperature Tset. The target air-blowing temperature TAO is calculated based on the preset temperature Tset, and environmental conditions including the outdoor air temperature Tam, the indoor air temperature Tr, and an amount of insolation Ts, which are detected by the outdoor air temperature sensor 41, the indoor air temperature sensor 42, and the insolation sensor 48, respectively.

Meanwhile, in the air conditioning unit 10 during the cooling and dehumidifying operation, the indoor fan 12 is operated to flow the air through the air flow passage 11, and the air is subjected to a heat exchange with the refrigerant which absorbs the heat in the heat exchanger 14, and therefore is cooled and dehumidified. The air having been dehumidified in the heat exchanger 14 is subjected to a heat exchange with the refrigerant which releases the heat in the radiator 15, and therefore heated. As a result, the air at the target air-blowing temperature TAO blows to the vehicle interior.

Figure 4:
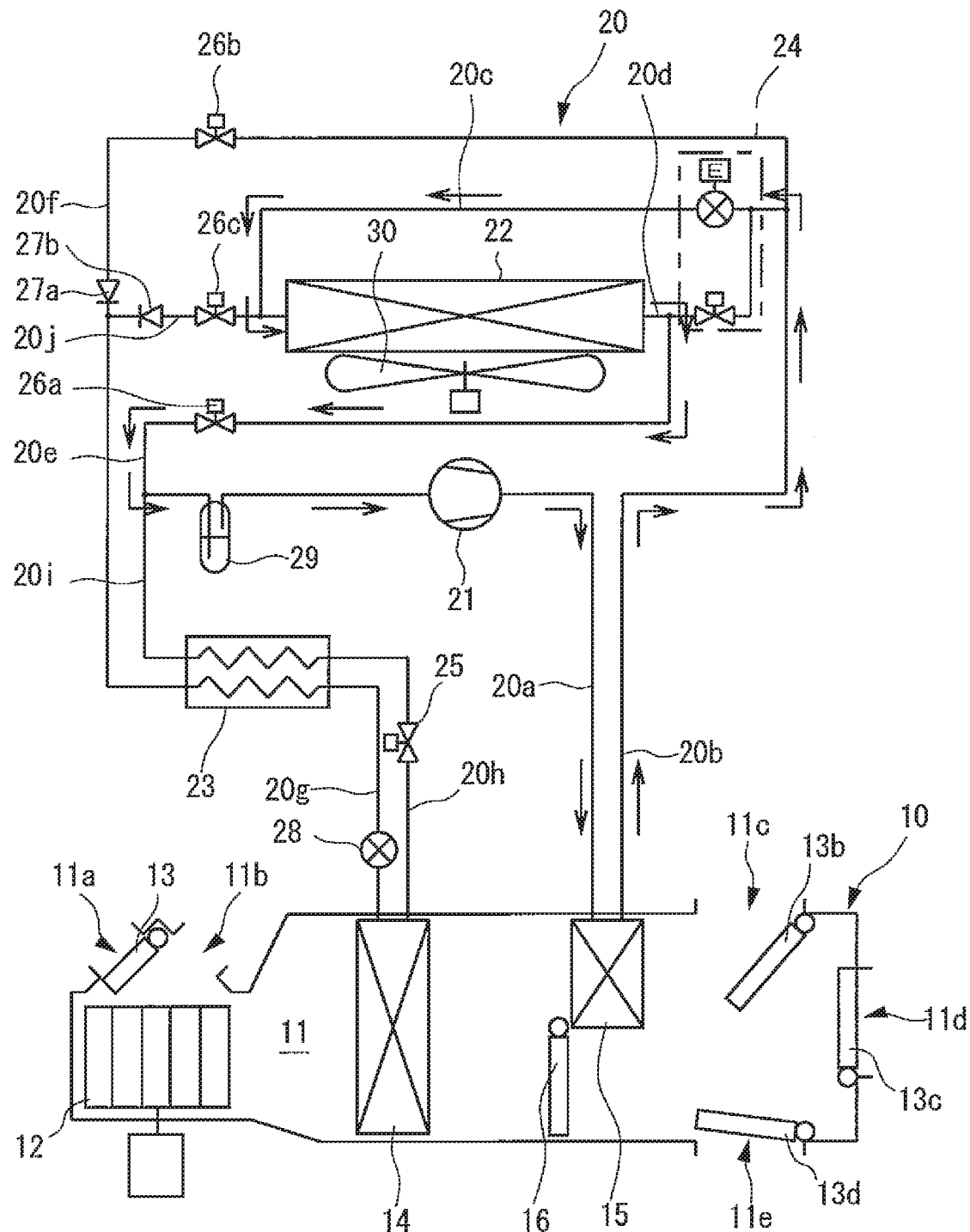
FIG. 4 is a schematic view showing the vehicle air conditioning apparatus performing a heating operation.

During the heating operation, in the refrigerant circuit 20, the refrigerant flow channel to the expansion part is opened while the refrigerant flow channel to the condensing pressure regulating part is closed in the first control valve 24; the first solenoid valve 26a is opened; the second and third solenoid valves 26b and 26c are closed; and the compressor 21 is operated. By this means, as shown in FIG. 4, the refrigerant discharged from the compressor 21 flows through in this order: the refrigerant flow passage 20a; the radiator 15; the refrigerant flow passages 20b and 20c; the outdoor heat exchanger 22; and the refrigerant flow passage 22e, and is sucked into the compressor 21. The refrigerant flowing through the refrigerant circuit 20 releases the heat in the radiator 15 and absorbs the heat in the outdoor heat exchanger 22.

In this case, in the air conditioning unit 10, the indoor fan 12 is operated to flow the air through the air flow passage 11, and the flowing air is not subjected to a heat exchange with the refrigerant in the heat exchanger 14, but is subjected to a heat exchange with the refrigerant in the radiator 15 and therefore is heated. As a result, the air at the target air-blowing temperature TAO blows to the vehicle interior.

Figure 5:
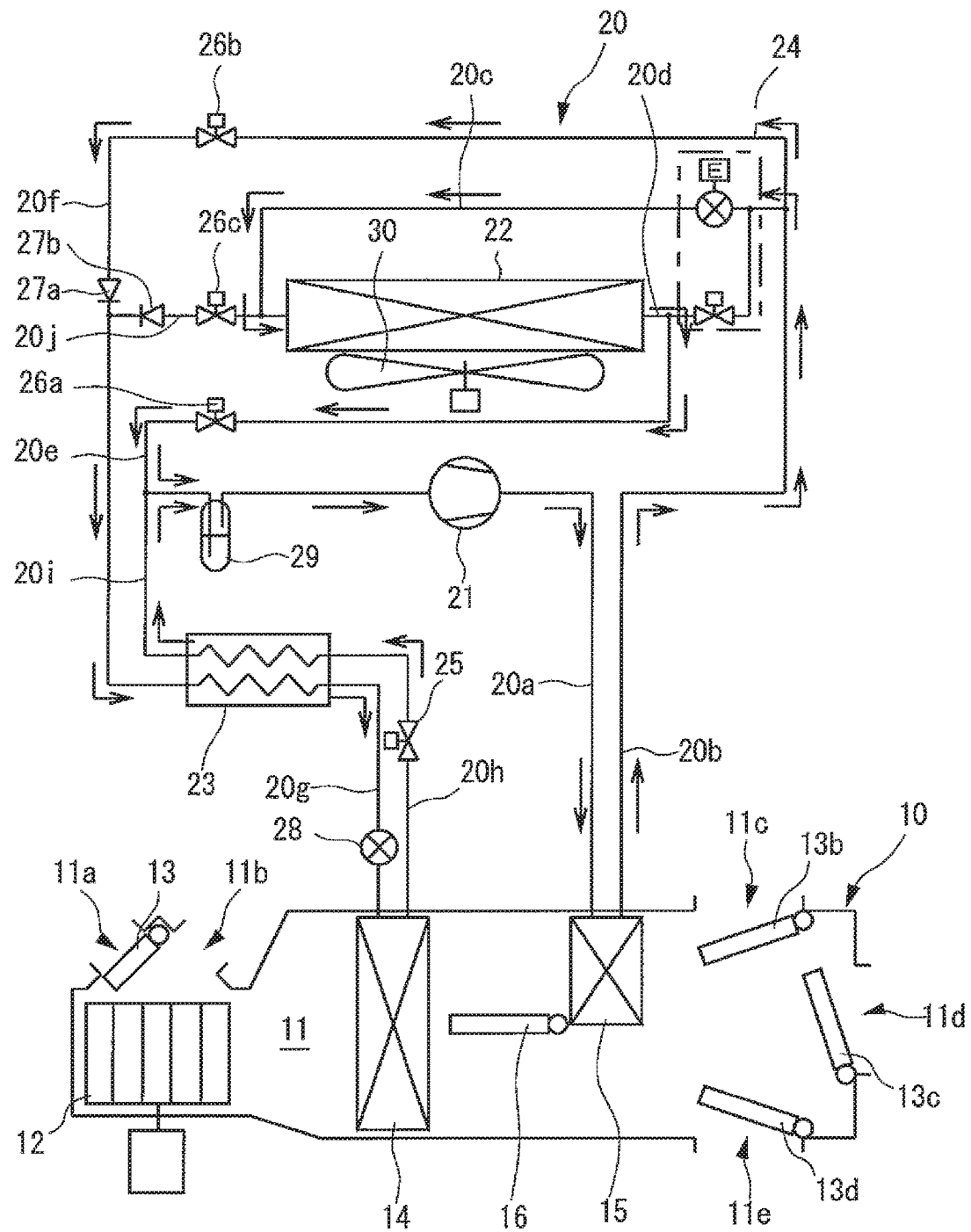
FIG. 5 is a schematic view showing the vehicle air conditioning apparatus performing a first heating and dehumidifying operation.

During the first heating and dehumidifying operation, in the refrigerant circuit 20, the refrigerant flow channel to the expansion part is opened while the refrigerant flow channel to the condensing pressure regulating part is closed in the first control valve 24; the first and second solenoid valves 26a and 26b are opened; the third solenoid valve 26c is closed; and the compressor 21 is operated. By this means, as shown in FIG. 5, the refrigerant discharged from the compressor 21 flows through in this order: the refrigerant flow passage 20a; the radiator 15; and the refrigerant flow passage 20b. Part of the refrigerant having passed through the refrigerant flow passage 20b flows through in this order: the first control valve 24; the refrigerant flow passage 20c; the outdoor heat exchanger 22; and the refrigerant flow passage 20e, and is sucked into the compressor 21. Meanwhile, the remaining refrigerant having passed through the refrigerant flow passage 20*b* flows through in this order: the refrigerant flow passage 20*f*; the high-pressure side of the indoor heat exchanger 23; the refrigerant flow passage 20*g*; the heat exchanger 14; the refrigerant flow passage 20*h*; the low-pressure side of the indoor heat exchanger 23; and the refrigerant flow passages 20*i* and 20*e*, and is sucked into the compressor 21. The refrigerant flowing through the refrigerant circuit 20 releases the heat in the radiator 15 and absorbs the heat in the heat exchanger 14 and the outdoor heat exchanger 22.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified. Part of the air having been dehumidified in the heat exchanger 14 is subjected to a heat exchange with the refrigerant in the radiator 15 and heated. As a result, the air at the target air-blowing temperature TAO blows into the vehicle interior.

Figure 6:
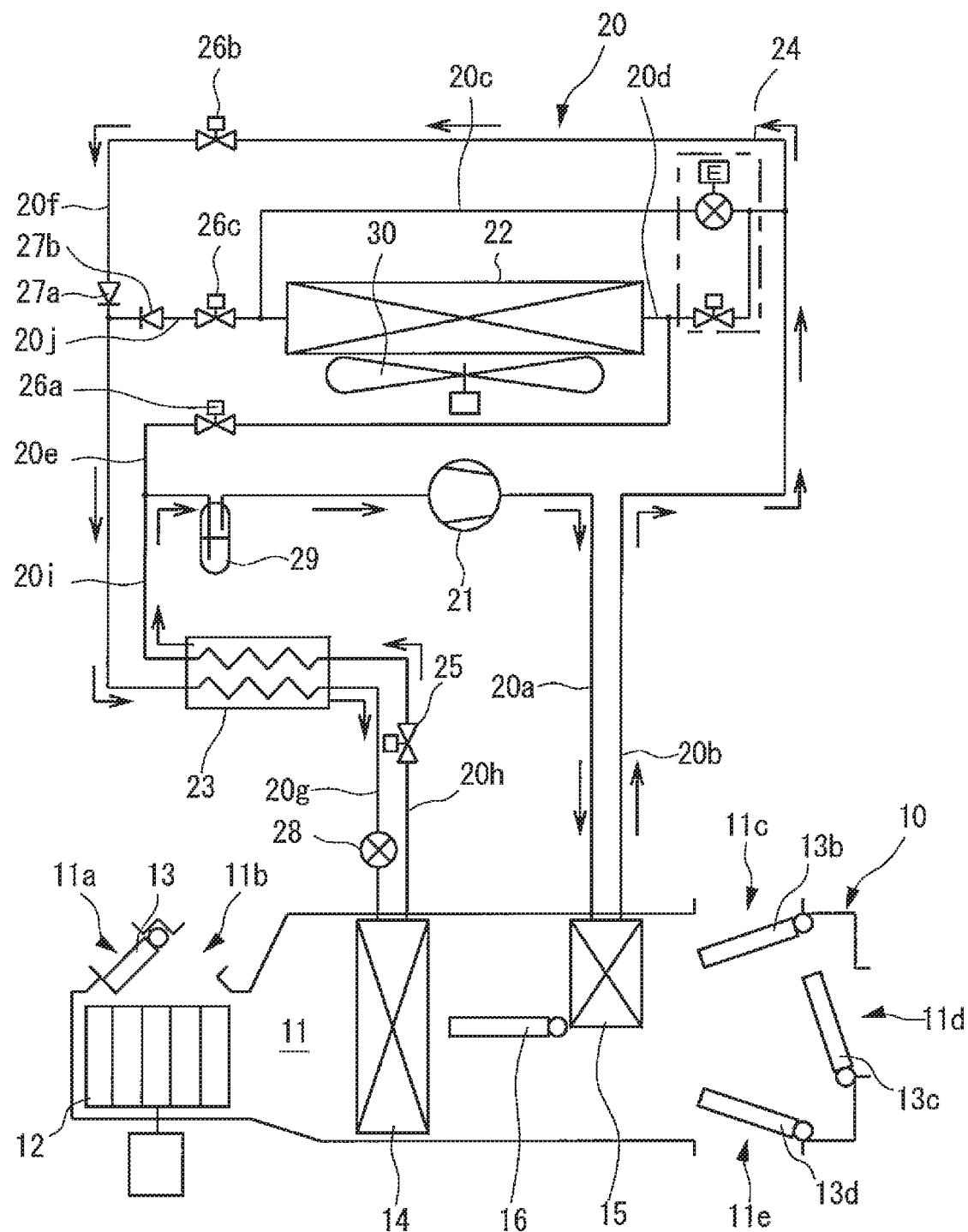
FIG. 6 is a schematic view showing the vehicle air conditioning apparatus performing a second heating and dehumidifying operation.
Figure 7:
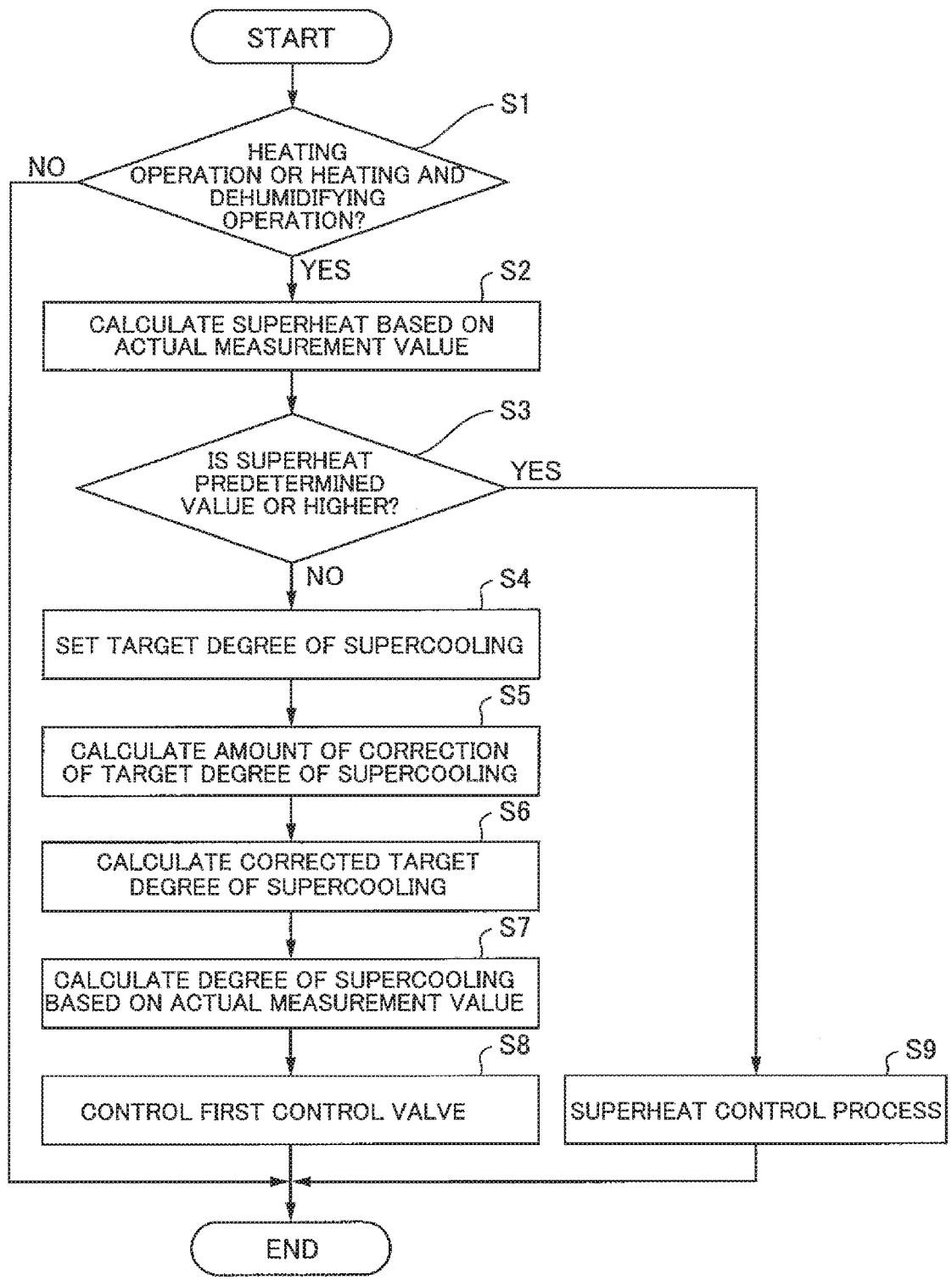
FIG. 7 is a flowchart showing an expansion part control process.
Figure 8:
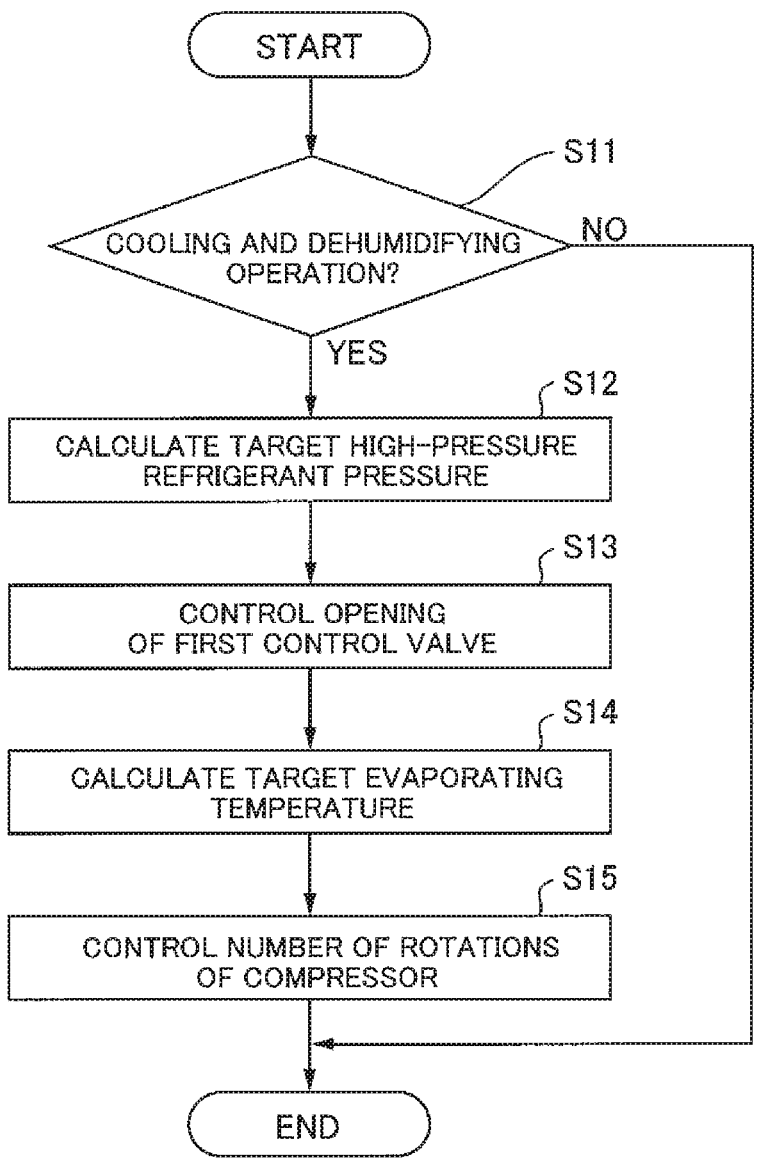
FIG. 8 is a flowchart showing a cooling and dehumidifying performance control process.
Figure 9:
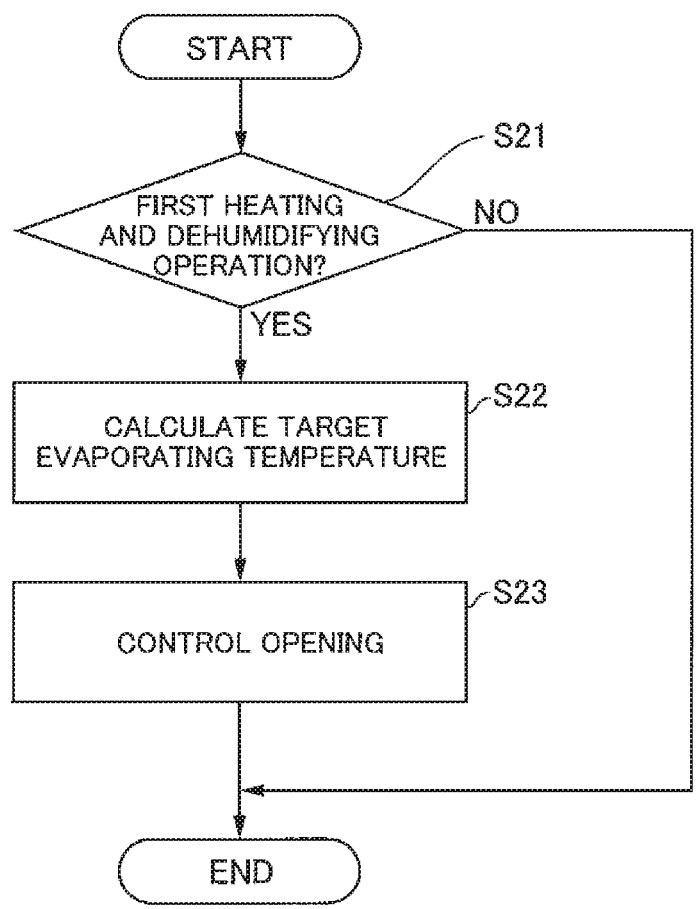
FIG. 9 is a flowchart showing an evaporating temperature control process.
Figure 10:
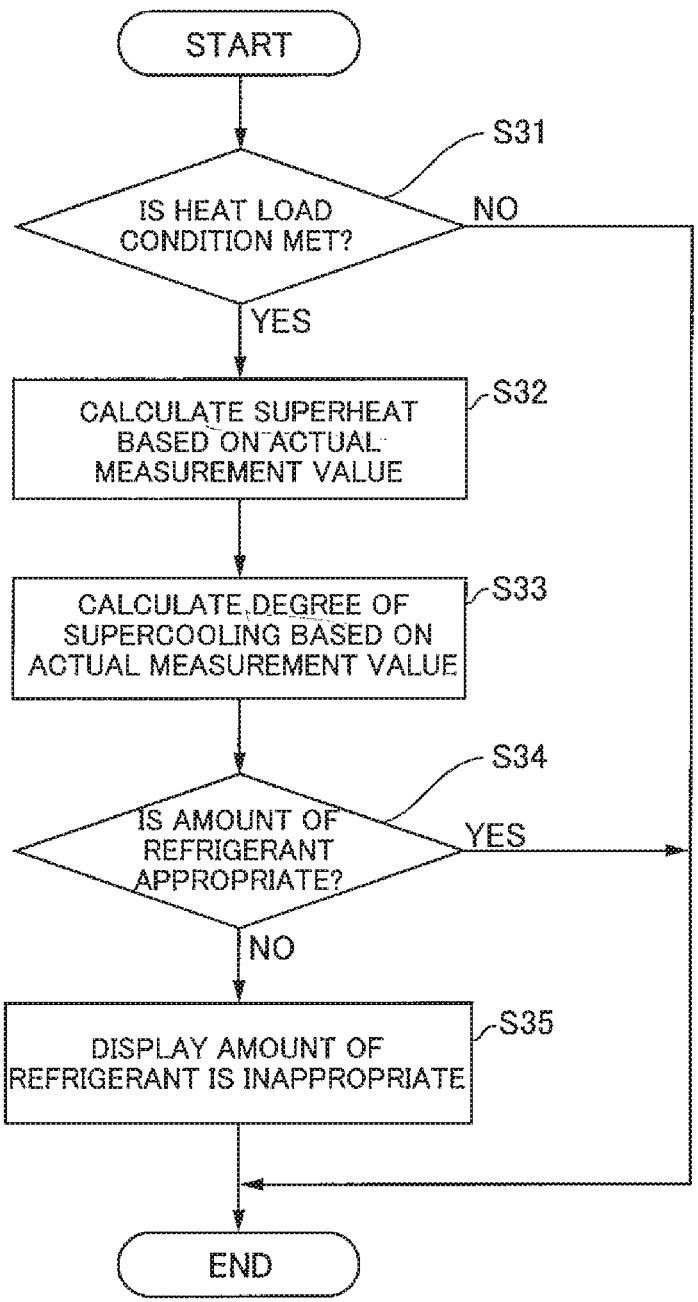
FIG. 10 is a flowchart showing a refrigerant amount determination process.

During the second heating and dehumidifying operation, in the refrigerant circuit 20, both the refrigerant flow channel to the expansion part and the refrigerant flow channel to the condensing pressure regulating part are closed in the first control valve 24; the second solenoid valve 26*b* is opened; and the first and third solenoid valves 26*a* and 26*c* are closed, and the compressor 21 is operated. By this means, as shown in FIG. 6, the refrigerant discharged from the compressor 21 flows through in this order: the refrigerant flow passage 20*a*; the radiator 15; the refrigerant flow passages 20*b* and 20*f*; the high-pressure side of the indoor heat exchanger 23; the refrigerant flow passage 20*g*; the heat exchanger 14; the refrigerant flow passage 20*h*; the low-pressure side of the indoor heat exchanger 23; and the refrigerant flow passages 20*i* and 20*e*, and is sucked into the compressor 21. The refrigerant flowing through the refrigerant circuit 20 releases the heat in the radiator 15 and absorbs the heat in the heat exchanger 14.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified in the same way as in the first heating and dehumidifying operation. Part of the air dehumidified in the heat exchanger 14 is subjected to a heat exchange with the refrigerant in the radiator 15, and therefore heated. As a result, the air at the target air-blowing temperature TAO blows to the vehicle interior.

While an automatic switch is turned on, the controller 40 performs an operation switching control process to switch the operation among the cooling operation, the cooling and dehumidifying operation, the heating operation, the first heating and dehumidifying operation, and the second heating and dehumidifying operation, based on environmental conditions including the outdoor air temperature Tam, the indoor air temperature Tr, the outdoor air humidity, the indoor air humidity Th, the amount of insolation Ts and so forth.

The controller 40 switches the mode of the outlets 11*c*, 11*d* and 11*e* by using the outlet switching dampers 13*b*, 13*c* and 13*d*, and controls the opening of the air mix damper 16 in order to set the temperature of the air blowing out of the outlets 11*c*, 11*d*, and 11*e* to the target air-blowing temperature TAO.

The controller 40 switches the mode among the foot mode, the vent mode and the bi-level mode depending on the target air-blowing temperature TAO during each operation switched by the operation switching control process. To be more specific, when the target air-blowing temperature TAO is high, for example, 40 degrees Celsius, the controller 40 sets the foot mode. Meanwhile, when the target air-blowing temperature TAO is low, for example, lower than 25 degrees Celsius, the controller sets the vent mode. Moreover, when the target air-blowing temperature TAO is the temperature between the temperature for the foot mode and the temperature for the vent mode, the controller 40 sets the bi-level mode.

Moreover, during the heating operation and the first heating and dehumidifying operation, the controller 40 performs an expansion part control process to control the opening of the expansion part of the first control valve 24 based on the operation state. Now, the operation of the controller 40 in this process will be explained with reference to the flowchart shown in FIG. 7.

(Step S1)

In step S1, the CPU determines whether the operation is the heating operation or the heating and dehumidifying operation. When determining that the operation is one of the heating operation and the heating and dehumidifying operation, the CPU moves the step to step S2. On the other hand, when determining that the operation is neither the heating operation nor the heating and dehumidifying operation, the CPU ends the expansion part control process.

(Step S2)

In the step S2, the CPU calculates superheat SH of the refrigerant based on the temperature Tlp detected by the low-pressure refrigerant temperature sensor 46 and the pressure Plp detected by the low-pressure refrigerant pressure sensor 47.

(Step S3)

In step S3, the CPU determines whether or not the superheat SH calculated in the step S2 is a predetermined value or higher. When determining that the superheat SH is the predetermined value or higher, the CPU moves the step to step S9. On the other hand, when determining that the superheat SH is not the predetermined value or higher, the CPU moves the step to step S4.

(Step S4)

In step S4, the CPU sets target degree of supercooling SCt based on the target air-blowing temperature TAO. For example, when the target air-blowing temperature TAO is a predetermined value (e.g. 60 degrees Celsius) or higher, the CPU sets first target degree of supercooling SCt1 (e.g. 15 degrees Celsius). On the other hand, when the target air-blowing temperature TAO is lower than the predetermined value, the CPU sets second target degree of supercooling SCt2 (e.g. 12 degrees Celsius).

(Step S5)

In step S5, for the target degree of supercooling SCt set in the step S4, the CPU calculates amount of correction H1 based on amount of air Ga supplied from the indoor fan 12 and amount of correction H2 based on amount of refrigerant Gr flowing through the refrigerant circuit 20. To be more specific, when the amount of air Ga supplied from the indoor fan 12 is a predetermined value or higher, the amount of correction H1 is zero. On the other hand, when the amount of air Ga is lower than the predetermined value, the amount of correction H1 (e.g. $-10 \leq H1 \leq 0$) is set to decrease the degree of supercooling SC according to the amount of air Ga. When the amount of refrigerant Gr flowing through the high-pressure side of the refrigerant circuit 20 is a predetermined value or higher, the amount of correction H2 (e.g. $0 \leq H2 \leq 5$) is set to increase the degree of supercooling according to an increase in the amount of refrigerant Gr. On the other hand, when the amount of refrigerant Gr is lower than the predetermined value, the amount of correction H2 (e.g. −5≤H2≤0) is set to decrease the degree of supercooling SC according to a decrease in the amount of refrigerant Gr. The amount of refrigerant Gr flowing through the high-pressure side of the refrigerant circuit 20 increases as the pressure of the refrigerant in the high-pressure side of the refrigerant circuit 20 increases, and decreases as the pressure of the refrigerant decreases. Therefore, the amount of refrigerant Gr flowing through the high-pressure side of the refrigerant circuit 20 is calculated based on the pressure Php detected by the high-pressure refrigerant pressure sensor 45.

(Step S6)

In step S6, the CPU calculates corrected target degree of supercooling SCtc by adding the amount of correction H1 and the amount of correction H2 to the target degree of supercooling SCt (SCtc=SCt−(H1+H2)).

(Step S7)

In step S7, the CPU calculates the degree of supercooling SC of the refrigerant based on the temperature Thp detected by the high-pressure refrigerant temperature sensor 44 and the pressure Php detected by the high-pressure refrigerant pressure sensor 45.

(Step S8)

In step S8, the CPU controls the opening of the first control valve 24 such that the degree of supercooling SC is the corrected target degree of supercooling SCtc, and ends the expansion part control process.

(Step S9)

When determining that the superheat SH is the predetermined value or higher in the step S3, the CPU performs a superheat control process to control the opening of the expansion part of the first control valve 24 to set the superheat SH of the low-pressure refrigerant to target superheat SHt in step S9, and ends the expansion part control process.

During the cooling and dehumidifying operation, the controller 40 performs a cooling and dehumidifying performance control process to control the heat absorbing performance of the heat exchanger 14 and the heat radiating performance of the radiator 15. Now, the operation of the controller 40 for this process will be explained with reference to the flowchart shown in FIG. 8.

(Step S11)

In step S11, the CPU determines whether or not the operation is the cooling and dehumidifying operation. When determining that the operation is the cooling and dehumidifying operation, the CPU moves the step to step S12. On the other hand, when determining that the operation is not the cooling and dehumidifying operation, the CPU ends the cooling and dehumidifying performance control process.

(Step S12)

In step S12, the CPU calculates target pressure Phpt of the high-pressure refrigerant based on the target air-blowing temperature TAO.

(Step S13)

In step S13, the CPU controls the opening of the condensing pressure regulating part of the first control valve 24 based on the target pressure Phpt of the high-pressure refrigerant and the pressure Php detected by the high-pressure refrigerant pressure sensor 45. To be more specific, the opening of the condensing pressure regulating part of the first control valve 24 is switched between two values, a large one and a small one, excluding the completely closed state. In this case, when the opening is switched from a small one to a large one, the pressure Php of the high-pressure refrigerant decreases. On the other hand, the opening is changed from a large one to a small one, the pressure Php of the high-pressure refrigerant increases.

(Step S14)

In step S14, the CPU calculates target evaporating temperature Tet of the refrigerant in the heat exchanger 14 based on the target air-blowing temperature TAO.

(Step S15)

In step S15, the CPU controls the number of rotations of the electric motor 21a of the compressor 21 such that the evaporating temperature Te of the refrigerant in the heat exchanger 14 is the target evaporating temperature Tet, based on the temperature of Te detected by the heat exchanger temperature sensor 48, and ends the cooling and dehumidifying performance control process.

During the first heating and dehumidifying operation, the controller 40 performs an evaporating temperature control process according to the operation state. Now, the operation of the controller 40 for this process will be explained with reference to the flowchart shown in FIG. 9.

(Step S21)

In step S11, the CPU determines whether or not the operation is the first heating and dehumidifying operation. When determining that the operation is the first heating and dehumidifying operation, the CPU moves the step to step S22. On the other hand, when determining that the operation is not the first heating and dehumidifying operation, the CPU ends the evaporating temperature control process.

(Step S22)

In step S22, the CPU calculates the target evaporating temperature Tet of the refrigerant in the heat exchanger 14 based on the target air-blowing temperature TAO.

(Step S23)

In step S23, the CPU controls the opening of the second control valve 25 based on the target evaporating temperature Tet and the temperature Te detected by the heat exchanger temperature sensor 48. To be more specific, when the temperature Te detected by the heat exchanger temperature sensor 48 is lower than the target evaporating temperature Tet, the opening of the second control valve 25 is decreased. On the other hand, when the temperature Te is higher than the target evaporating temperature Tet, the opening is increased.

During the heating operation and the first heating and dehumidifying operation, the controller 40 performs a refrigerant amount determination process to determine whether or not the amount of refrigerant enclosed in the refrigerant circuit 20 is appropriate. Now, the operation of the controller 40 for this process will be explained with reference to the flowchart shown in FIG. 10.

(Step S31)

In step S31, the CPU determines whether or not heat load conditions are met to determine the amount of refrigerant in the refrigerant circuit 20 based on the outdoor temperature Tam, the amount of air Ga supplied from the indoor fan 12, the number of rotations Nc of the electric motor 21a of the compressor 21 and so forth. When determining that it is possible to determine the amount of refrigerant, the CPU moves the step to step S32. On the other hand, when determining that it is not possible to determine the amount of refrigerant, the CPU ends the refrigerant amount determination process.

(Step S32)

In step S32, the CPU calculates the superheat SH of the refrigerant based on the temperature Tlp detected by the low-pressure refrigerant temperature sensor 46 and the pressure Plp detected by the low-pressure refrigerant pressure sensor 47.

(Step 33)

In step S33, the CPU calculates the degree of supercooling SC of the refrigerant based on the temperature Thp detected by the high-pressure refrigerant temperature sensor 44 and the pressure Php detected by the high-pressure refrigerant pressure sensor 45.

(step S34)

In step S34, the CPU determines whether or not the amount of the refrigerant in the refrigerant circuit 20 is appropriate, based on the superheat SH of the refrigerant calculated in the step S32, the degree of supercooling SC of the refrigerant calculated in the step S33, and the opening of the expansion part of the first control valve 24. When determining that the amount of the refrigerant is appropriate, the CPU ends the refrigerant amount determination process. On the other hand, when determining that the amount of the refrigerant is not appropriate, the CPU moves the step to step S35. Whether or not the amount of the refrigerant in the refrigerant circuit 20 is appropriate is determined based on the result of the determination of whether or not the superheat SH of the refrigerant calculated in the step S32, the degree of supercooling SC of the refrigerant calculated in the step 33, and the opening of the expansion part of the first control valve 24 are within appropriate ranges, respectively.

(Step S35)

When determining that the amount of the refrigerant is not appropriate in the step S34, the CPU displays that the amount of the refrigerant in the refrigerant circuit 20 is insufficient or excessive on the display part 50 in the step S35, and ends the refrigerant amount determination process.

In this way, with the vehicle air conditioning apparatus according to the present embodiment, during the heating operation and the heating and dehumidifying operation, the target degree of supercooling SCt when the target air-blowing temperature TAO is the predetermined temperature or higher is set to the target degree of supercooling SCt1 that is higher than the target degree of supercooling SCt2 when the target air-blowing temperature TAO is lower than the predetermined temperature, and, the set target degree of supercooling SCt is corrected such that when the amount of air Ga supplied from the indoor fan 12 is smaller than a predetermined value, the degree of supercooling SC is lower than the target degree of supercooling SCt that is corrected when the amount of air Ga supplied from the indoor fan 12 is the predetermined value or greater. By this means, it is possible to decrease the degree of supercooling SC of the refrigerant when the amount of air Ga from the indoor fan 12 is small, and therefore to reduce the difference in temperature between the refrigerant flowing from upstream of the radiator 15 and the refrigerant flowing from the downstream of the radiator 15 in the refrigerant flow direction. As a result, it is possible to prevent temperature variations of the air after the heat exchange in the radiator 15, and therefore to reliably control the temperature of the air blowing to the vehicle interior.

In addition, the set target degree of supercooling SCt is corrected such that when the amount of refrigerant Gr flowing through the refrigerant circuit 20 is a predetermined value or greater, the degree of supercooling SC is higher than the target degree of supercooling SCt that is corrected when the amount of refrigerant Gr is smaller than the predetermined value. By this means, when the amount of refrigerant Gr is large, the degree of supercooling of the refrigerant flowing upstream of the first control valve 24 is increased. Therefore, it is possible to increase the difference in enthalpy between the input side of the radiator 15 into which the refrigerant flows and the output side of the radiator 15 from which the refrigerant is discharged, and consequently to improve the heating performance. Moreover, it is possible to increase COP (coefficient of performance) to improve the operating efficiency of the heat pump system.

Moreover, the degree of supercooling SC of the refrigerant is calculated based on the temperature Thp detected by the high-pressure refrigerant temperature sensor 44 and the pressure Php detected by the high-pressure refrigerant pressure sensor 45, and the opening of the expansion part of the first control valve 24 is controlled based on the calculated degree of supercooling SC. By this means, it is possible to ensure that the degree of supercooling SC follows the target degree of supercooling SCt, and therefore to maintain the environment of the vehicle interior in good condition.

Furthermore, the superheat SH of the low-pressure refrigerant is calculated based on the temperature Tlp detected by the low-pressure refrigerant temperature sensor 46 and the pressure Plp detected by the low-pressure refrigerant pressure sensor 47. Then, when the calculated superheat SH is the predetermined value or higher, the opening of the expansion part of the first control valve 24 is controlled such that the superheat SH of the low-pressure refrigerant is the target superheat SH. By this means, it is possible to increase the degree of supercooling SC to prevent the superheat SH from being excessive because the amount of the refrigerant in the low-pressure side of the refrigerant circuit 20 is insufficient. Accordingly, it is possible to prevent the compressor 21 from failing.

Furthermore, it is determined whether or not the amount of the refrigerant enclosed in the refrigerant circuit 20 is appropriate, based on the calculated degree of supercooling SC of the refrigerant, the opening of the expansion part of the first control valve 24, and the calculated superheat SH of the low-pressure refrigerant. By this means, it is possible to easily detect the leakage of the refrigerant enclosed in the refrigerant circuit 20, and therefore to promptly address the failure.

Figure 11:
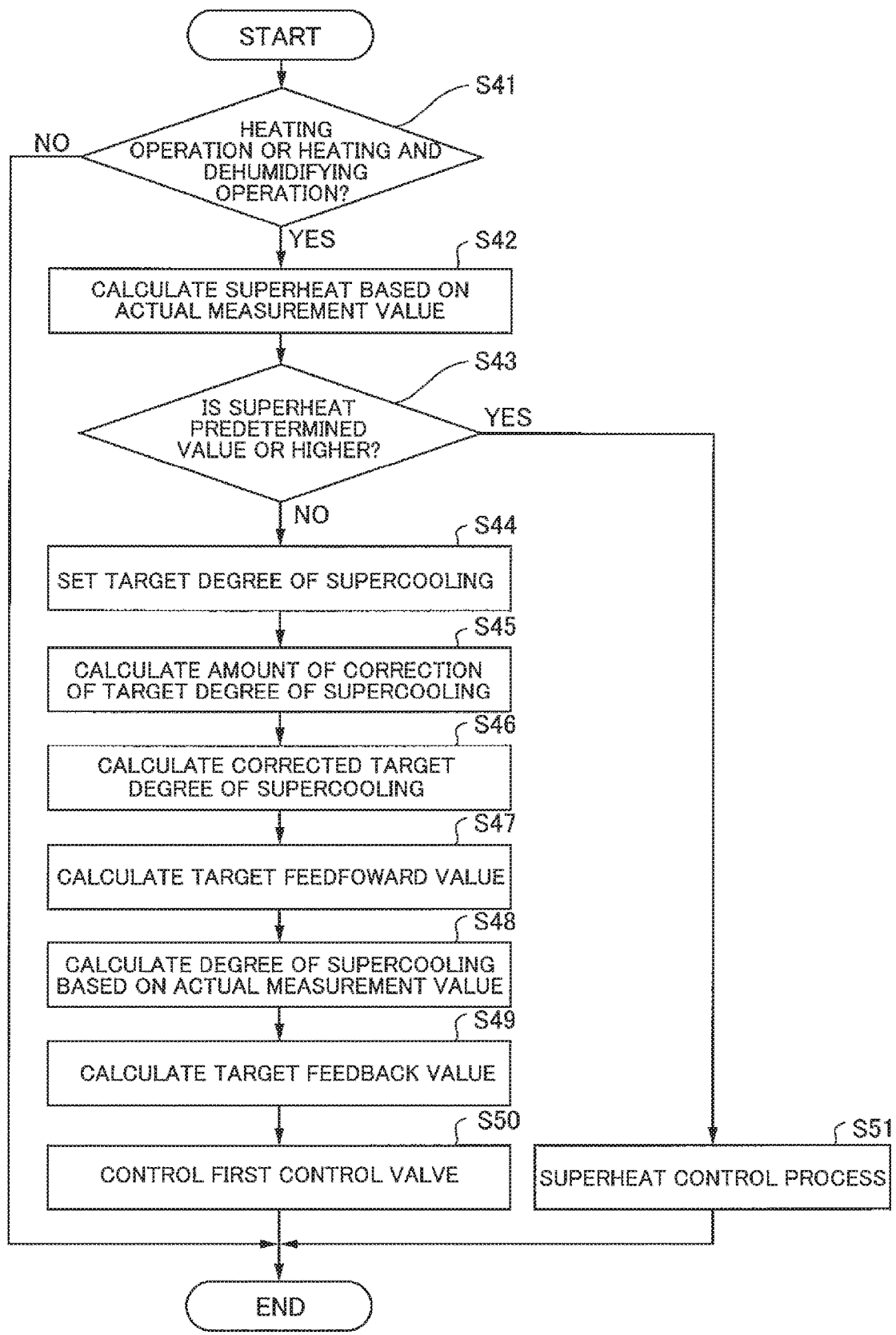
FIG. 11 is a flowchart showing an expansion part control process according to Embodiment 2 of the present invention.

FIG. 11 shows Embodiment 2. Here, the same components are assigned the same reference numerals as in the above-described embodiment.

In the vehicle air conditioning apparatus according to the present embodiment, the controller 40 performs an expansion part control process as shown in the flowchart in FIG. 11 with the same configuration as in Embodiment 1.

(Step S41)

In step S41, the CPU determines whether the operation is the heating operation or the heating and dehumidifying operation. When determining that the operation is one of the heating operation and the heating and dehumidifying operation, the CPU moves the step to step S42. On the other hand, when determining that the operation is neither the heating operation nor the heating and dehumidifying operation, the CPU ends the expansion part control process.

(Step S42)

In the step S42, the CPU calculates superheat SH of the refrigerant based on the temperature Tlp detected by the low-pressure refrigerant temperature sensor 46 and the pressure Plp detected by the low-pressure refrigerant pressure sensor 47.

(Step S43)

In step S43, the CPU determines whether or not the superheat SH calculated in the step S42 is a predetermined value or higher. When determining that the superheat SH is the predetermined value or higher, the CPU moves the step to step S51. On the other hand, when determining that the superheat SH is not the predetermined value or higher, the CPU moves the step to step S44.

(Step S44)

In step S44, the CPU sets target degree of supercooling SCt based on the target air-blowing temperature TAO. For example, when the target air-blowing temperature TAO is a predetermined value (e.g. 60 degrees Celsius) or higher, the CPU sets first target degree of supercooling SCt1 (e.g. 15 degrees Celsius). On the other hand, when the target air-blowing temperature TAO is lower than the predetermined value, the CPU sets second target degree of supercooling SCt2 (e.g. 12 degrees Celsius).

(Step S45)

In step S45, for the target degree of supercooling SCt set in the step S44, the CPU calculates amount of correction H1 based on amount of air Ga supplied from the indoor fan 12 and amount of correction H2 based on amount of refrigerant Gr flowing through the refrigerant circuit 20. To be more specific, when the amount of air Ga supplied from the indoor fan 12 is a predetermined value or higher, the amount of correction H1 is zero. On the other hand, when the amount of air Ga is lower than the predetermined value, the amount of correction H1 (e.g. −10≤H1≤0) is set to decrease the degree of supercooling SC according to the amount of air Ga. When the amount of refrigerant Gr flowing through the high-pressure side of the refrigerant circuit 20 is a predetermined value or higher, the amount of correction H2 (e.g. 0H25) is set to increase the degree of supercooling according to the amount of refrigerant Gr. On the other hand, when the amount of refrigerant Gr is lower than the predetermined value, the amount of correction H2 (e.g. −5≤H2≤0) is set to decrease the degree of supercooling SC according to a decrease in the amount of refrigerant Gr. The amount of refrigerant Gr flowing through the high-pressure side of the refrigerant circuit 20 increases as the pressure of the refrigerant in the high-pressure side of the refrigerant circuit 20 increases, and decreases as the pressure of the refrigerant decreases. Therefore, the amount of refrigerant Gr flowing through the high-pressure side of the refrigerant circuit 20 is calculated based on the pressure Php detected by the high-pressure refrigerant pressure sensor 45.

(Step S6)

In step S46, the CPU calculates corrected target degree of supercooling SCtc by adding the amount of correction H1 and the amount of correction H2 to the target degree of supercooling SCt (SCtc=SCt−(H1+H2)).

(Step S47)

In step S47, the CPU calculates target feedforward value EXVtgtFF for the opening of the expansion part of the first control valve 24 based on the corrected target degree of supercooling SCtc set in the step S46. The target feedfoward value EXVtgtFF is calculated based on the outdoor air temperature Tam, voltage BLV of the electric motor 12a to drive the indoor fan 12, and number of rotations Nc of the electric motor 21a to drive the compressor 21 (EXVtgtFF=Ka×Tam+Kb×BLV+Kc×Nc+d, where Ka, Kb, Kc, and dare preset fixed values).

(Step S48)

In step S48, the CPU calculates the degree of supercooling SC of the refrigerant based on the temperature Thp detected by the high-pressure refrigerant temperature sensor 44 and the pressure Php detected by the high-pressure refrigerant pressure sensor 45.

(Step S49)

In step S49, the CPU calculates target feedback value EXVtgtFB for the opening of the expansion part of the first control valve 24 based on the degree of supercooling SC calculated in the step S48. The target feedback value EXVtgtFB is an output value of proportional-plus-integral control (PI control), which is calculated based on the target feedfoward value EXVtgtFF calculated in the step S47 and the degree of supercooling SC of the refrigerant calculated in the step S48 (EXVtgtFB=EXVtgtfbp+EXVtgtfbi, EXVtgtfbp=Kp×(SCtgtFF−SC),EXVtgtfbi=EXVtgtfbi_n−1+Kp/Ti×(SCtgtFF−SC), where Kp is a constant value as proportional gain; Ti is integral time; and EXVtgtfbi_n−1 is the previous value of EXVtgtfbi).

(Step S50)

In step S50, the CPU controls the opening of the expansion part of the first control valve 24, based on the target feedforward value EXVtgtFF calculated in the step S47, and the target feedback value EXVtgtFB calculated in the step S49, and ends the expansion part control process.

(Step S51)

When determining that the superheat SH is the predetermined value or higher in the step S43, the CPU performs a superheat control process to control the opening of the expansion part of the first control valve 24 to set the superheat SH of the low-pressure refrigerant to target superheat SHt in step S51, and ends the expansion part control process.

In this way, with the vehicle air conditioning apparatus according to the present invention, it is possible to reduce the degree of supercooling SC of the refrigerant when the amount of air Ga supplied from the indoor fan 12 is small like Embodiment 1, and therefore it is possible to reduce the difference in temperature between the refrigerant flowing from upstream of the radiator and the refrigerant flowing from downstream of the radiator in the refrigerant flow direction. As a result, it is possible to prevent temperature variations of the air after the heat exchange in the radiator 15, and therefore to reliably control the temperature of the air blowing to the vehicle interior.

In addition, the target feedforward value EXVtgtFF for the opening of the expansion part of the first control valve 24 is calculated based on the target degree of supercooling Sctc; the target feedback value EXVtgtFB for the opening is calculated based on the calculated degree of supercooling SC and the set target degree of supercooling SCtc; and the opening is controlled based on the target feedforward value EXVtgtFF and the target feedback value EXVtgtFB. By this means, it is possible to ensure that the temperature and humidity of the vehicle interior is controlled to the set temperature and humidity.

Here, with the present embodiment, a configuration has been described where, during the heating operation and the first heating and dehumidifying operation, the refrigerant flowing out of the compressor 21 flows through the outdoor heat exchanger 22 from the first end to the second end. It is by no means limiting. For example, during the heating operation and the first heating and dehumidifying operation, the refrigerant flowing out of the compressor 21 may flow through the outdoor heat exchanger 22 from the second end side to the first end side as shown in FIG. 12.

Figure 12:
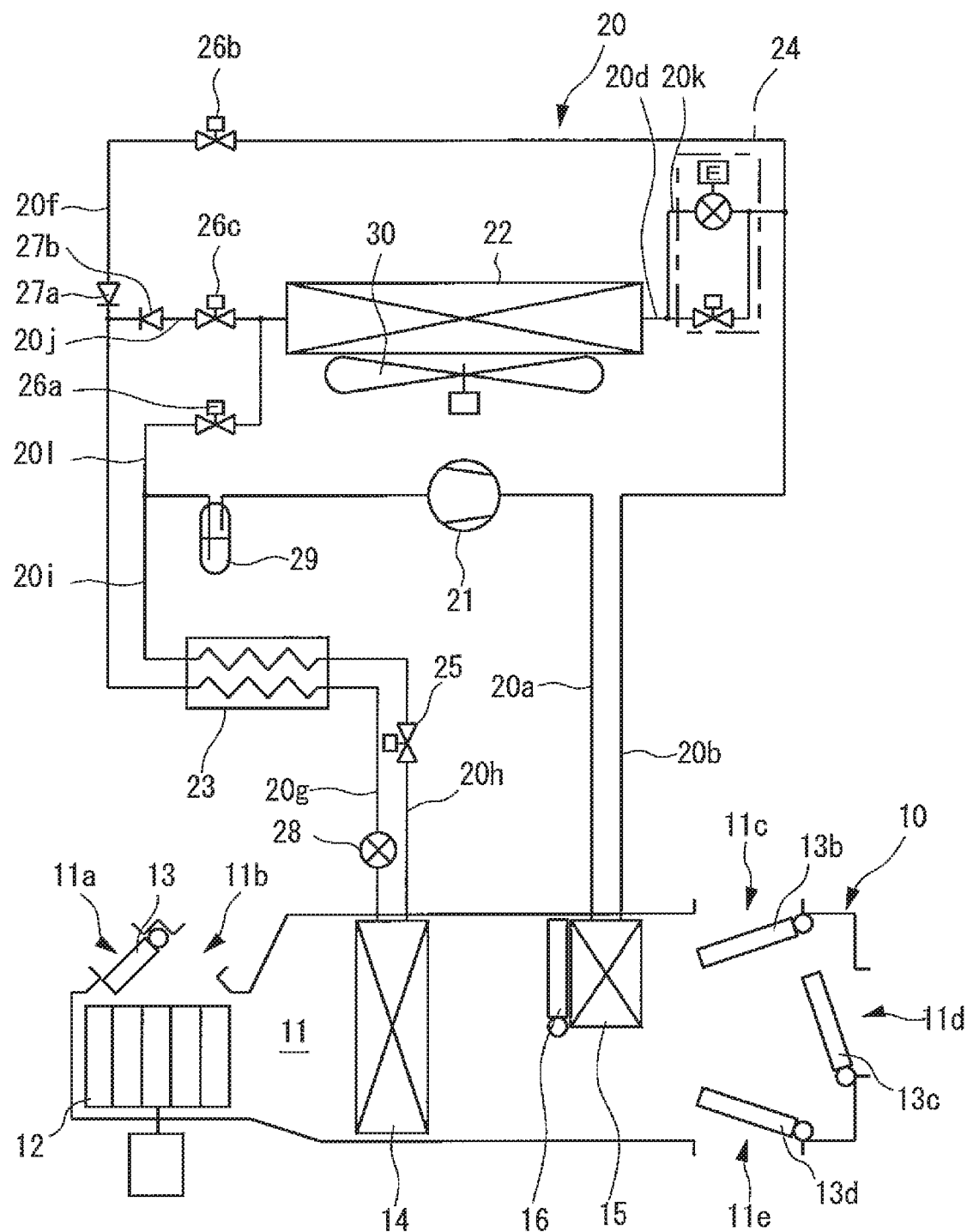
FIG. 12 is a schematic view showing another vehicle air conditioning apparatus according to the present invention.

In the vehicle air conditioning apparatus shown in FIG. 12, a refrigerant flow passage 20k is provided to connect between the output side of the expansion part of the first control valve 24 from which the refrigerant is discharged and the second end side of the outdoor heat exchanger 22, instead of the refrigerant flow passage 20c in Embodiment 1. In addition, in the vehicle air conditioning apparatus, a refrigerant flow passage 20l is provided to connect between the first end side of the outdoor heat exchanger 22 and the suction side of the compressor 21 into which the refrigerant is sucked, instead of the refrigerant flow passage 20e in Embodiment 1.

In the vehicle air conditioning apparatus having the above-described configuration, during the heating operation and the first heating and dehumidifying operation, the refrigerant flowing out of the radiator 15 flows through the outdoor heat exchanger 22 from the second end side to the first end side unlike Embodiment 1. During the other operations, the refrigerant flows in the same way as in Embodiment 2.

In addition, with the present embodiment, a configuration has been described where the first control valve is constituted by the expansion part to decompress the refrigerant flowing into the outdoor heat exchanger 22 during the heating operation and the condensing pressure regulating part to control the condensing pressure of the refrigerant in the radiator 15 during the cooling and dehumidifying operation, which are integrally formed. However, it is by no means limiting. Another configuration is possible, for example, where an electronic expansion valve as the expansion part and a condensing pressure regulating valve as the condensing pressure regulating part are connected in parallel to the upstream side of the outdoor heat exchanger 22 in the refrigerant flow direction. This provides the same effect as in the above-described embodiment.

Moreover, with the present embodiment, a configuration has been described where the degree of supercooling SC of the refrigerant flowing out of the radiator 15 is controlled by regulating the opening of the expansion part of the first control valve 24, which is located upstream of the outdoor heat exchanger 22. However, another configuration is possible where an electronic expansion valve is provided instead of the expansion valve 28 disposed upstream of the heat exchanger 14, and, by regulating the opening of the electronic expansion valve, the degree of supercooling SC of the refrigerant flowing out of the radiator 15 is controlled.

FIGS. 13 to 29 show Embodiment 3 of the present invention.

Figure 13:
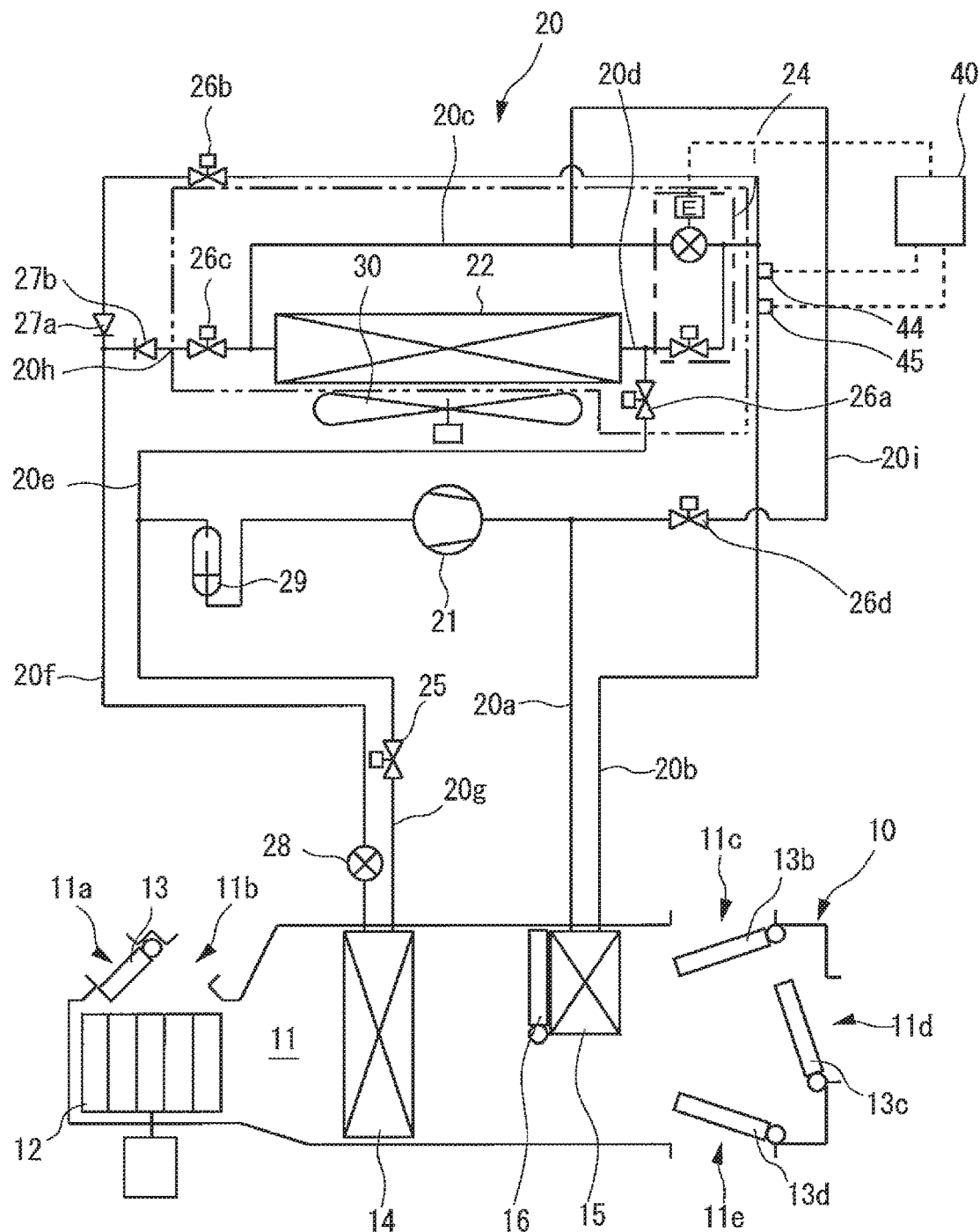
FIG. 13 is a schematic view showing the vehicle air conditioning apparatus according to Embodiment 3 of the present invention.

As shown in FIG. 13, the vehicle air conditioning apparatus according to the present invention includes the air conditioning unit 10 provided in the vehicle interior, and the refrigerant circuit 20 formed across the vehicle interior and the outdoor.

The air conditioning unit 10 includes the air flow passage 11 that allows the air to be supplied to the vehicle interior to pass through. The outdoor air inlet 11a and the indoor air inlet 11b are provided in the first end side of the air flow passage 11. The outdoor air inlet 11a is configured to allow the outdoor air to flow into the air flow passage 11, and the indoor air inlet 11b is configured to allow the indoor air to flow into the air flow passage 11. Meanwhile, the foot outlet 11c, the vent outlet 11d and the defroster outlet 11e are provided in the second end side of the air flow passage 11. The foot outlet 11c is configured to allow the air flowing through the air flow passage 11 to blow to the feet of the passengers in the vehicle. The vent outlet 11d is configured to allow the air flowing through the air flow passage 11 to blow to the upper bodies of the passengers in the vehicle. The defroster outlet 11e is configured to allow the air flowing through the air flow passage 11 to blow to the interior surface of the front window.

The indoor fan 12 such as a sirocco fan configured to allow the air to flow through the air flow passage 11 from end to end is provided in the first end side of the air flow passage 11.

Also, in the first end side of the air flow passage 11, the inlet switching damper 13 configured to open one of the outdoor air inlet 11a and the indoor air inlet 11b and to close the other. When the inlet switching damper 13 closes the indoor air inlet 11b and opens the outdoor air inlet 11a, the mode is switched to an outdoor air supply mode in which the air flows from the outdoor air inlet 11a into the air flow passage 11. Meanwhile, when the inlet switching damper 13 closes the outdoor air inlet 11a and opens the indoor air inlet 11b, the mode is switched to an indoor air circulation mode in which the air flows from the indoor air inlet 11b into the air flow passage 11. Moreover, when the inlet switching damper 13 is placed between the outdoor air inlet 11a and the indoor air inlet 11b and the outdoor air inlet 11a and the indoor air inlet 11b open, the mode is switched to a two-way mode in which the air flows from both the outdoor air inlet 11a and the indoor air inlet 11b into the air flow passage 11 according to the opening ratio of the outdoor air inlet 11a and the indoor air inlet 11b.

The outlet switching dampers 13b, 13c and 13d configured to open and close the foot outlet 11c, the vent outlet 11d and the defroster outlet 11e are provided in the foot outlet 11c, the vent outlet 11d and the defroster outlet 11e, respectively, in the second side of the air flow passage 11. These outlet switching dampers 13b, 13c and 13d are configured to move together by a linkage (not shown). Here, when the outlet switching dampers 13b, 13c and 13d open the foot outlet 1c, close the vent outlet 11d and slightly open the defroster outlet 11e, most of the air flowing through the air flow passage 11 blows out of the foot outlet 11c and the remaining air blows out of the defroster outlet 11e. This mode is referred to as "foot mode". Meanwhile, when the outlet switching dampers 13b, 13c and 13d close the foot outlet 11c and the defroster outlet 11e, and open the vent outlet 11d, all the air flowing through the air flow passage 11 blows out of the vent outlet 11d. This mode is referred to as "vent mode". In addition, when the outlet switching dampers 13b, 13c and 13d open the foot outlet 11c and the vent outlet 11d, and close the defroster outlet 11e, the air flowing through the air flow passage 11 blows out of the foot outlet 11c and the vent outlet 11d. This mode is referred to as "bi-level mode". Moreover, when the outlet switching dampers 13b, 13c and 13d close the foot outlet 11c and the vent outlet 11d, and open the defroster outlet 11e, the air flowing through the air flow passage 11 blows out of the defroster outlet 11e. This mode is referred to as "defroster mode". Furthermore, when the outlet switching dampers 13b, 13c and 13d close the vent outlet 11d and open the foot outlet 11c and the defroster outlet 11e, the air flowing through the air flow passage 11 blows out of the foot outlet 11c and the defroster outlet 11e. This mode is referred to as "defroster-foot mode". Here, in the bi-level mode, the air flow passage 11, the foot outlet 11c, the vent outlet 11d, and the heat exchanger and the radiator which will be described later, are arranged and configured such that the temperature of the air blowing out of the foot outlet 11c is higher than the temperature of the air blowing out of the vent outlet 11d.

The heat exchanger 14 is provided in the air flow passage 11 in the downstream of the air flow from the indoor fan 12. In addition, the radiator 15 is provided in the air flow passage 11 in the downstream of the air flow from the heat exchanger 14. The radiator 15 is configured to heat the air flowing through the air flow passage 11. The heat exchanger 14 and the radiator 15 are heat exchangers, each of which is constituted by fins and tubes and that is configured to perform a heat exchange between the refrigerant flowing through the refrigerant circuit 20 and the air flowing through the air flow passage 11.

The air mix damper 16 is provided between the heat exchanger 14 and the radiator 15 in the air flow passage 11 and is configured to control the percentage of the air to be heated, which is flowing through the air flow passage 11. When the air mix damper 16 is disposed in the air flow passage 11 in the upstream of the radiator 15, the percentage of the air subjected to a heat exchange in the radiator 15 is reduced. Meanwhile, when the air mix damper 16 is moved to a position other than the radiator 15 in the air flow passage 11, the percentage of the air subjected to a heat exchange is increased. In the air flow passage 11, when the air mix damper 16 closes the upstream side of the radiator 15 and opens the portion other than the radiator 15, the opening is 0%, and, on the other hand, when the air mix damper 16 opens the upstream side of the radiator 15 and closes the portion other than the radiator 15, the opening is 100%.

The refrigerant circuit 20 includes: the heat exchanger 14; the radiator 15; a compressor 21 configured to compress a refrigerant; an outdoor heat exchanger 22 configured to perform a heat exchange between the refrigerant and the outdoor air; the first control valve 24 that includes the expansion part to decompress the refrigerant flowing into the outdoor heat exchanger 22 during the heating operation and the first heating and dehumidifying operation, and the condensing pressure regulating part as a high-pressure refrigerant flow regulating valve to regulate the condensing pressure of the refrigerant in the radiator 15 during the cooling and dehumidifying operation, and that can switch the refrigerant flow channel between the refrigerant flow channel to the expansion part side and the refrigerant flow channel to the condensing pressure regulating part side as a refrigerant flow passage switching valve; the second control valve 25 as a low-pressure refrigerant flow regulating part to regulate the evaporating pressure of the refrigerant in the heat exchanger 14; first to fourth solenoid valves 26a, 26b, 26c and 26d; the first and second check valves 27a and 27b; the expansion valve 28; and the accumulator 29 configured to separate refrigerant liquid from refrigerant vapor to prevent the refrigerant liquid from being sucked into the compressor 21. These components are connected to each other by a copper pipe or an aluminum pipe.

To be more specific, input side of the radiator 15 into which the refrigerant flows is connected to the delivery side of the compressor 21 from which the refrigerant is discharged to form the refrigerant flow passage 20a. In addition, the input side of the first control valve 24 into which the refrigerant flows is connected to the output side of the radiator 15 from which the refrigerant is discharged, thereby to form the refrigerant flow passage 20b. The first end side of the outdoor heat exchanger 22 is connected to the output side of the expansion part of first control valve 24 from which the refrigerant is discharged, thereby to form the refrigerant flow passage 20c. Meanwhile, the second end side of the outdoor heat exchanger 22 is connected to the output side of the condensing pressure regulating part of the first control valve 24 from which the refrigerant discharged, thereby to form the refrigerant flow passage 20d. The suction side of the compressor 21 into which the refrigerant is sucked is connected to the second end side of the outdoor heat exchanger 22, in parallel with the refrigerant flow passage 20d, thereby to form the refrigerant flow passage 20e. The first solenoid valve 26a and the accumulator 29 are provided in the refrigerant flow passage 20e in the order from the upstream of the refrigerant flow direction. The input side of the heat exchanger 14 into which the refrigerant flows is connected to the refrigerant flow passage 20b, thereby to form the refrigerant flow passage 20f.

In the refrigerant flow passage 20f, the second solenoid valve 26b, the first check valve 27a, and the expansion valve 28 are provided in the order from the upstream of the refrigerant flow direction. Part of the refrigerant flow passage 20e between the first solenoid valve 26a and the accumulator 29 is connected to the output side of the heat exchanger 14 from which the refrigerant is discharged, thereby to form the refrigerant flow passage 20g. The second control valve 25 is provided in the refrigerant flow passage 20g. Part of the refrigerant flow passage 20f between the first check valve 27a and the expansion valve 28 is connected to the first end side of the outdoor heat exchanger 22, in parallel with the refrigerant flow passage 20c, thereby to form the refrigerant flow passage 20h. The third solenoid valve 26c and the second check valve 27b are provided in the refrigerant flow passage 20h in the order from the upstream of the refrigerant flow direction. The refrigerant flow passage 20a is connected to the refrigerant flow passage 20c to form the refrigerant flow passage 20i as a defrost refrigerant flow passage. The fourth solenoid valve 26d is provided in the refrigerant flow passage 20i.

The compressor 21 and the outdoor heat exchanger 22 are disposed outside the vehicle interior. The compressor 21 and the outdoor heat exchanger 22 are disposed outside the vehicle interior. The outdoor heat exchanger 22 includes an outdoor fan 30 configured to perform a heat exchange between the outdoor air and the refrigerant while the vehicle stops.

Figure 14:
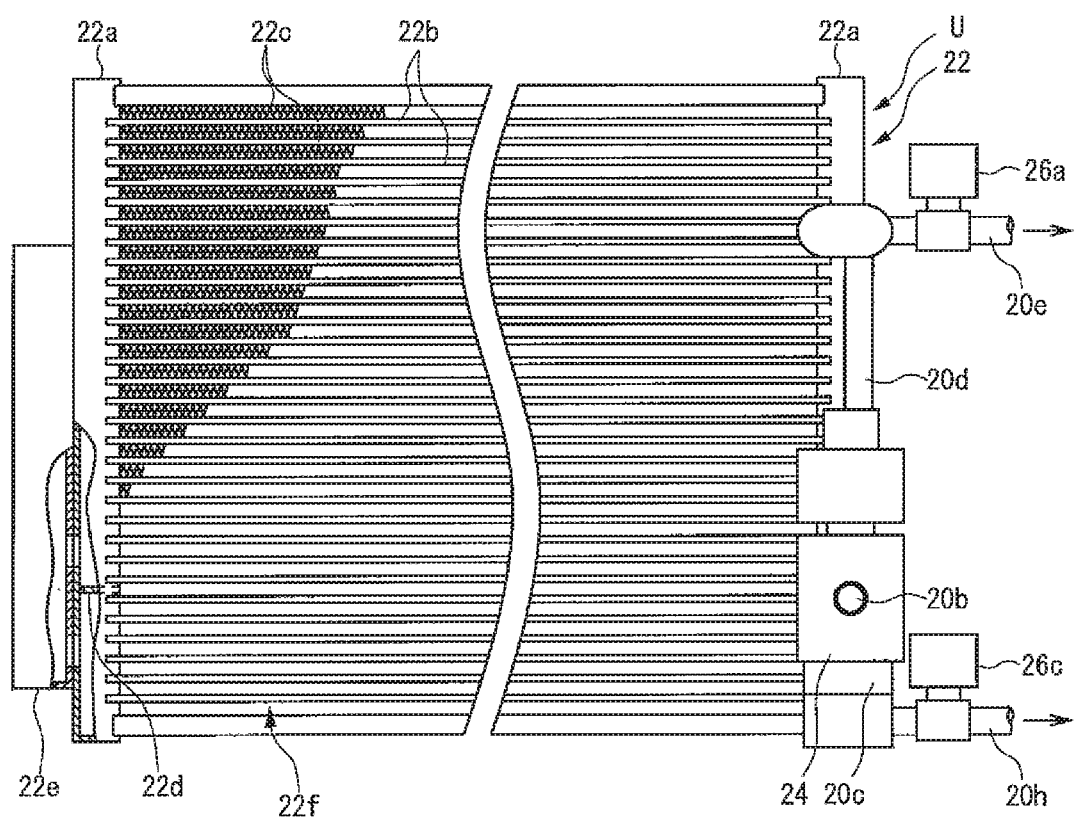
FIG. 14 is a front view showing an outdoor heat exchanger unit.
Figure 15:
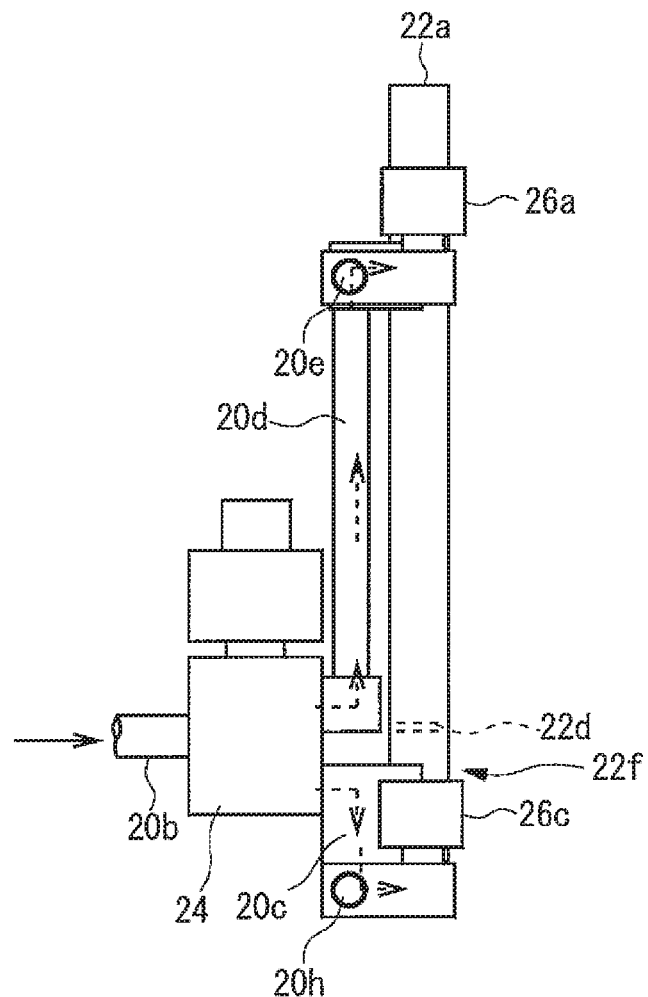
FIG. 15 is a side view showing the outdoor heat exchanger unit.

As shown in FIGS. 14 and 15, the outdoor heat exchanger 22 is formed integrally with the first control valve 24, the first solenoid valve 26a and the third solenoid valve 26c to form an outdoor heat exchanger unit U.

The outdoor heat exchanger 22 includes: a pair of headers 22a provided in the width direction of the outdoor heat exchanger 22 and extending in the vertical direction; a plurality of flat tubes 22b provided apart from each other and connecting between the headers 22a; and wavy fins provided between each of the flat tubes 22b.

Each of the header 22a is made of a cylindrical member whose upper and lower ends are closed. The lower part of the inside of each header 22a is partitioned in the vertical direction by a partition member 22d. The refrigerant flow passages 20d and 20e are connected to the space in the upper part of the first header 22a. In addition, the refrigerant flow passages 20c and 20h are connected to the space in the lower part of the first header 22a. Meanwhile, the space in the upper part and the space in the lower part of the second header 22a communicate with one another through a gas-liquid separator 22e outside the second header 22a in the width direction of the headers 22a. The gas-liquid separator 22e is made of a cylindrical member whose upper and lower ends are closed, and is configured to be able to accumulate the refrigerant liquid when the outdoor heat exchanger 22 functions as a radiator. When the outdoor heat exchanger 22 functions as a radiator, only the refrigerant liquid accumulated in the gas-liquid separator 22e flows into the space in the lower part of the second header 22a. That is, a supercooling part 22f is formed by the space in the lower part of each of the headers 22a and the flat tubes connecting between the headers 22a to place the refrigerant liquid flowing through in a supercooling state.

As shown in FIG. 16, the first control valve 24 includes: a valve body 24a configured to allow the refrigerant having passed through the refrigerant flow passage 20b to flow through, and an opening regulating mechanism 24b configured to switch the refrigerant flow channel of the valve body 24a between the refrigerant flow channel to the expansion part and the refrigerant flow channel to the condensing pressure regulating part, and to regulate the openings of the refrigerant flow channels to the expansion part side and to the condensing pressure regulating part side, respectively.

In the valve body 24a, a refrigerant inlet passage 24c that allows the refrigerant having passed through the refrigerant flow passage 20b to flow into, a refrigerant flow channel 24d to the expansion part and a refrigerant flow channel 24e to the condensing pressure regulating part are formed.

The opening regulating mechanism 24b includes: a solenoid 24h to linearly reciprocate a plunger 24g with respect to a coil 24f; a first valve element 24j provided in the refrigerant inlet passage 24c and configured to be able to open and close a communicating hole 24i that allows communication between the refrigerant inlet passage 24c and the refrigerant flow channel 24d; and a second valve element 24l provided in the refrigerant inlet passage 24c and configured to be able to open and close a communicating hole 24k that allows communication between the refrigerant inlet passage 24c and the refrigerant flow channel 24e.

The solenoid 24h can regulate the magnitude of the current flowing through the coil 24f to adjust the position of the plunger 24g with respect to the coil 24f. An abutment portion 24m configured to abut on one end face of the second valve element 24l is provided on the front end of the plunger 24g. In addition, a cylindrical valve element holder member 24n is provided on the front end side of the abutment portion 24m. A second valve element 24l is provided on the outer surface of the valve element holder member 24n, and a first valve element 24j can be inserted in the inside of the valve element holder member 24n.

The first valve element 24j is a needle-like member, which has a circular cross-section and tapers to one end. The other end side is inserted into the valve element holder member 24n. A first coil spring 24o is provided on the inner surface of the valve element holder member 24n. One end of the first valve element 24j is biased to close the communicating hole 24i.

A through hole 24p is provided in the second valve element 24l in the middle portion in the diameter direction. The inner diameter of the through hole 24p is approximately the same as the outer diameter of the valve element holder member 24n, and the valve element holder member 24n is inserted into the through hole 24p. The second valve element 24l is biased by a second coil spring 24q provided in the refrigerant inlet passage 24c to close the communicating hole 24k.

FIG. 16A shows a state in which the refrigerant flow channel 24d to the expansion part is opened while the refrigerant flow channel 24e communicating with the condensing pressure regulating part is closed. FIG. 16B shows a state in which the refrigerant flow channel 24d communicating with the expansion part is closed while the refrigerant flow channel 24e to the condensing pressure regulating part. FIG. 16C shows a state in which the refrigerant flow channel 24d to the expansion part is closed while the refrigerant flow channel 24e to the condensing pressure regulating part is opened.

The expansion valve 28 is a temperature expansion valve with the adjustable opening according to the temperature of the refrigerant flowing out of the heat exchanger 14. As a temperature expansion valve, for example, a box type temperature valve including a refrigerant outlet channel that allows the refrigerant flowing out of the heat exchanger to flow through, a temperature-sensitive rod that detects the temperature of the refrigerant flowing out of the refrigerant outlet channel, and a diaphragm to move the valve element, which are integrally formed.

Figure 17:
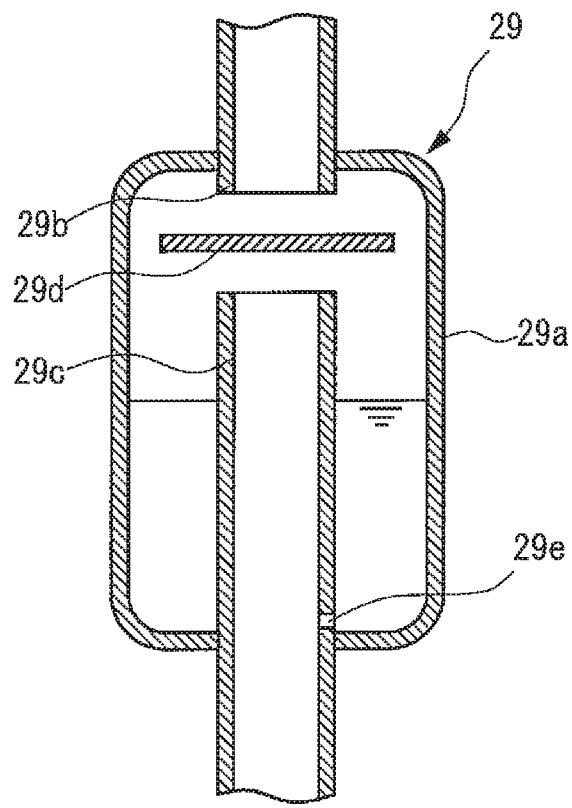
FIG. 17 is a cross-sectional view showing an accumulator.

As shown in FIG. 17, the accumulator 29 includes a container body 29a that extends in the vertical direction. A refrigerant inlet tube 29 is connected to the upper part of the container body 29a to allow the refrigerant flowing through the refrigerant flow passage 20e or the refrigerant flow passage 20g to flow into. Meanwhile, a refrigerant outlet tube 29c is provided in the lower part of the container body 29a to allow the refrigerant to flow out of the container body 29a to the compressor 21. An open end of the refrigerant outlet tube 29c is placed above the bottom of the container body 29e with a predetermined distance between them to regulate the refrigerant liquid flowing out of the container body. A refrigerant flow restriction plate 29d is provided in the container body 29a between the open end of the refrigerant inlet tube 29b and the open end of the refrigerant outlet tube 29c to prevent the refrigerant from flowing directly from the refrigerant inlet tube 29b into the refrigerant outlet tube 29c. In addition, an oil return hole 29e is provided in the refrigerant outlet tube 29c positioned in the lower part of the container body 29a to return lubricating oil separated from the refrigerant accumulated in the container body 29a to the compressor 21.

Moreover, as shown in FIG. 13, the vehicle air conditioning apparatus has the controller 40 that controls the opening of the expansion part and the opening of the condensing pressure regulating part in the first control valve 24.

The first control valve 24 is connected to the output side of the controller 40. Meanwhile, the high-pressure refrigerant temperature sensor 44 to detect the temperature Thp of the high-pressure refrigerant flowing through the refrigerant flow passage 20b, and the high-pressure refrigerant pressure sensor 45 to detect the pressure Php of the high-pressure refrigerant flowing through the refrigerant flow passage 20b are connected to the input side of the controller 40.

The vehicle air conditioning apparatus having the above-described configuration performs cooling operation, cooling and dehumidifying operation, heating operation, first heating and dehumidifying operation, second heating and dehumidifying operation, and defrost operation. Now, each operation will be explained.

Figure 18:
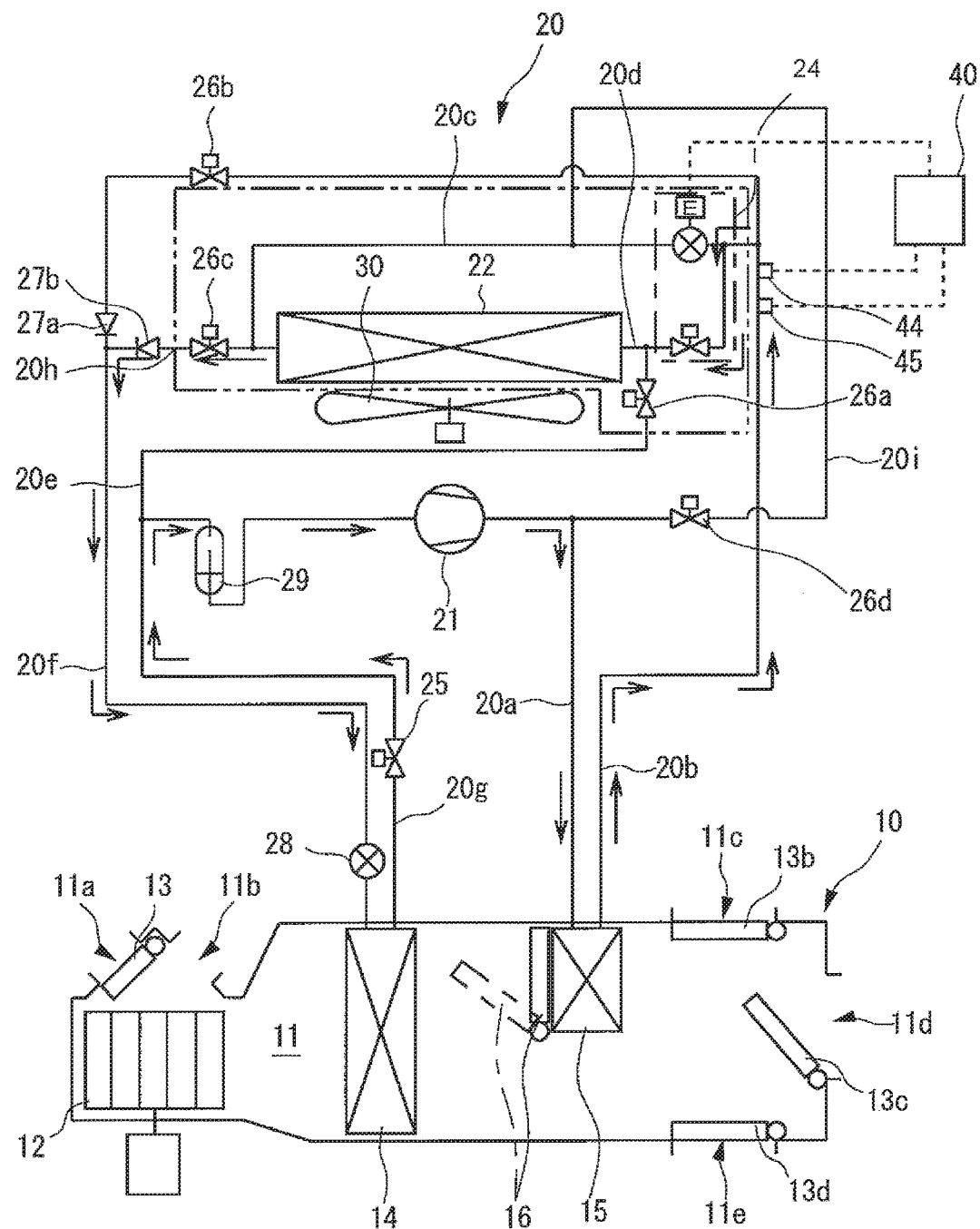
FIG. 18 is a schematic view showing the vehicle air conditioning apparatus performing a cooling operation and a cooling and dehumidifying operation.

During the cooling and dehumidifying operation, in the refrigerant circuit 20, the refrigerant flow passage to the expansion part is closed while the refrigerant flow passage to the condensing pressure regulating part is opened in the first control valve 24; the third solenoid valve 26c is opened; the first, second, and fourth solenoid valves 26a, 26b and 26d are closed; and compressor 21 is operated. By this means, as shown in FIG. 18, the refrigerant discharged from the compressor 21 flows through in this order: the refrigerant flow passage 20a; the radiator 15; the refrigerant flow passages 20b and 20d; the outdoor heat exchanger 22, the refrigerant flow passages 20h and 20f; the heat exchanger 14; and the refrigerant flow passages 20g and 20e, and is sucked into the compressor 21. During the cooling operation, the refrigerant flowing through the refrigerant circuit 20 releases the heat in the outdoor heat exchanger 22 and absorbs the heat in the heat exchanger 14. During the cooling and dehumidifying operation, when the air mix damper 16 is opened as shown by the dashed-dotted line of FIG. 18, the refrigerant flowing through the refrigerant circuit 20 releases the heat also in the radiator 15.

In this case, in the air conditioning unit 10 during the cooling operation, the indoor fan 12 is operated to flow the air through the air flow passage 11, and the air is subjected to a heat exchange with the refrigerant in the heat exchanger 14 and cooled. The temperature of the cooled air becomes target air-blowing temperature TAO of the air to blow out of the outlets 11c, 11d and 11e to the vehicle interior in order to set the temperature of the vehicle interior to the target preset temperature Tset.

The target air-blowing temperature TAO is calculated based on the preset temperature Tset, and detected environmental conditions such as the outdoor air temperature Tam, the indoor air temperature Tr, and an amount of insolation Ts.

Meanwhile, in the air conditioning unit 10 during the cooling and dehumidifying operation, the indoor fan 12 is operated to flow the air through the air flow passage 11, and the air is subjected to a heat exchange with the refrigerant which absorbs the heat in the heat exchanger 14, and therefore is cooled and dehumidified. The air having been dehumidified in the heat exchanger 14 is subjected to a heat exchange with the refrigerant which releases the heat in the radiator 15, and therefore heated. As a result, the air at the target air-blowing temperature TAO blows to the vehicle interior.

During the cooling and dehumidifying operation, the opening of the condensing pressure regulating part of the first control valve 24 is adjusted to regulate the condensing pressure of the refrigerant in the radiator 15. That is, it is possible to control the quantity of heat release in the radiator 15 by regulating the condensing pressure of the refrigerant in the radiator 15. To be more specific, the condensing pressure of the refrigerant in the radiator 15 is decreased by increasing the opening of the condensing pressure regulating part of the first control valve 24, and, on the other hand, is increased by decreasing the opening. By this means, the quantity of heat release in the radiator 15 is decreased by decreasing the condensing pressure but is increased by increasing the condensing pressure.

During the cooling operation and the cooling and dehumidifying operation, the refrigerant flowing through the outdoor heat exchanger 22 is in a supercooling state because the refrigerant subjected to a heat exchange with the outdoor air in the supercooling portion 22f is in liquid state.

In addition, the opening of the expansion valve 28 is regulated based on the temperature of the refrigerant flowing out of the heat exchanger 14, and therefore to control the superheat of the refrigerant flowing out of the heat exchanger 14. To be more specific, when the temperature of the refrigerant flowing out of the heat exchanger 14 is low, the opening is small. On the other hand, the temperature of the refrigerant flowing out of the heat exchanger 14, the opening is large.

Figure 19:
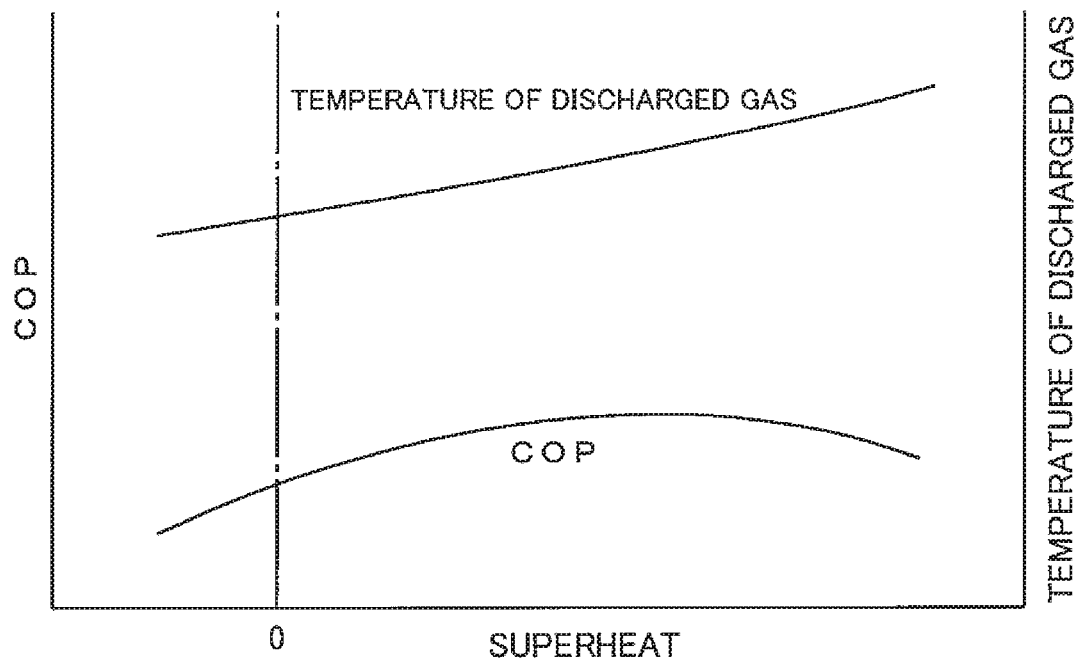
FIG. 19 is a drawing showing the relationship between the degree of supercooling of the refrigerant flowing out of the heat exchanger and a coefficient of performance, and the relationship between the degree of supercooling of the refrigerant and the temperature of the refrigerant discharged from the compressor.

FIG. 19 shows the relationship between the superheat of the refrigerant flowing out of the heat exchanger 14 and a coefficient of performance (COP), and the relationship between the superheat of the refrigerant and the temperature of the refrigerant discharged from the compressor 21. The coefficient of performance increases as the superheat increases within a predetermined range, and decreases as the superheat beyond the predetermined range. The temperature of the refrigerant discharged from the compressor 21 increases as the superheat increases.

Figure 20:
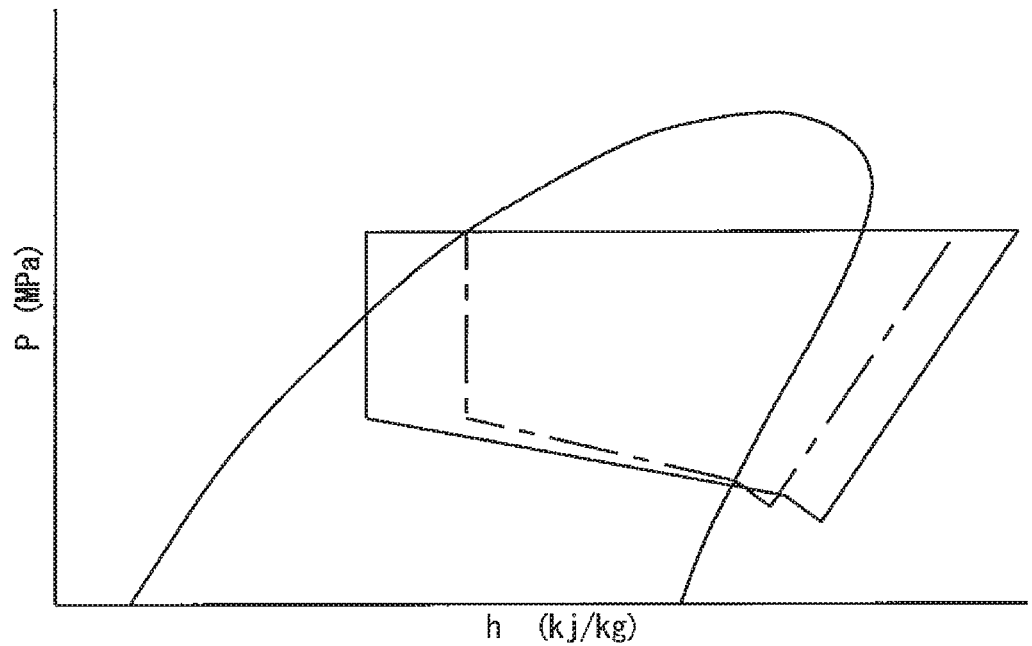
FIG. 20 is a pressure-specific enthalpy (p-h) diagram during a cooling and dehumidifying operation.

To be more specific, in a case in which the refrigerant is in a supercooling state in the supercooling portion 22f and the superheat of the refrigerant flowing out of the heat exchanger 14 is increased within the predetermined range, the difference in enthalpy between the refrigerant flowing into the heat exchanger 14 and the refrigerant flowing out of the heat exchanger 14 is greater than in a case where there is no superheating portion 22f and the superheat of the refrigerant is not controlled, which is shown by the dashed-dotted line in FIG. 20, and therefore the coefficient of performance is improved.

In addition, when the superheat of the refrigerant flowing out of the heat exchanger 14 is above the predetermined range, the temperature of the refrigerant discharged from the compressor 21 is increased. Then, an increases in the temperature of the refrigerant discharged from the compressor 21 causes the lubricating oil and the refrigerant to deteriorate, and makes it difficult to cool the compressor 21. As a result, the mechanical loss of the compressor 21 may increase, thereby to drop the coefficient performance.

Figure 21:
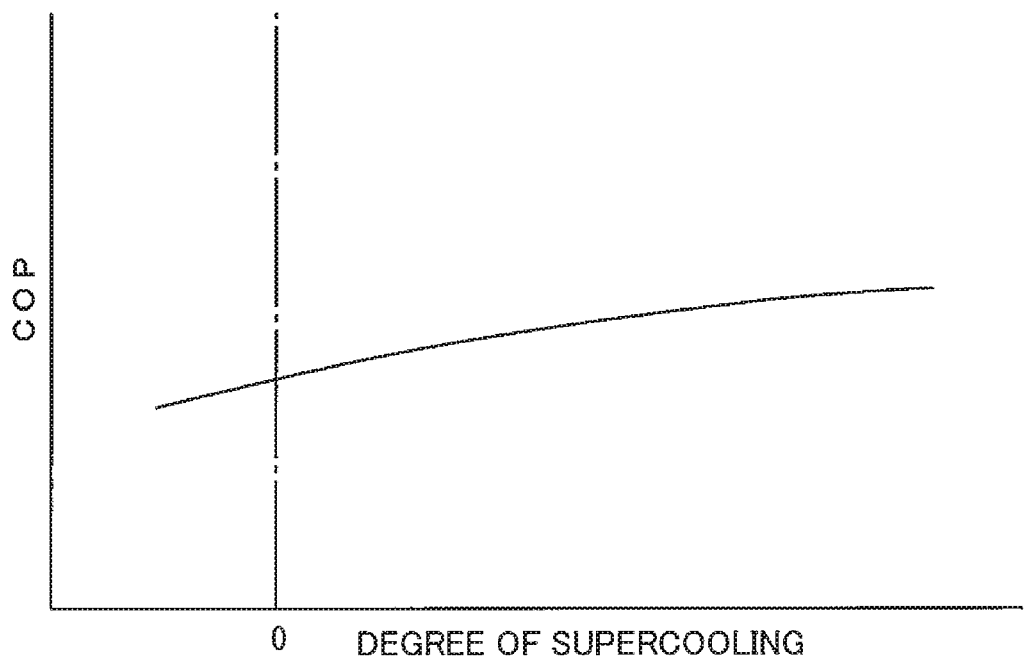
FIG. 21 is a drawing showing the relationship between the degree of supercooling of the refrigerant flowing out of the outdoor heat exchanger and a coefficient of performance during the cooling operation and the cooling and dehumidifying operation.

FIG. 21 shows the relationship between the degree of supercooling of the refrigerant flowing out of the outdoor heat exchanger 22 and the coefficient of performance. The coefficient of performance increases as the degree of supercooling increases. In order to increase the degree of supercooling, it is required to increase the surface area for a heat exchange between the air and the refrigerant flowing through the space in the lower part of the headers 22a of the outdoor heat exchanger 22. For this reason, the degree of supercooling increases in proportion to the outline dimension of the outdoor heat exchanger 22, and therefore is determined by the outline dimension of the outdoor heat exchanger 22 that can be fitted in.

As described above, by setting the superheat that allows the coefficient of performance to be maximized and setting the degree of supercooling that allows the coefficient of performance to be the upper limit, it is possible to maximize the coefficient of performance during the cooling operation and the cooling and dehumidifying operation.

Figure 22:
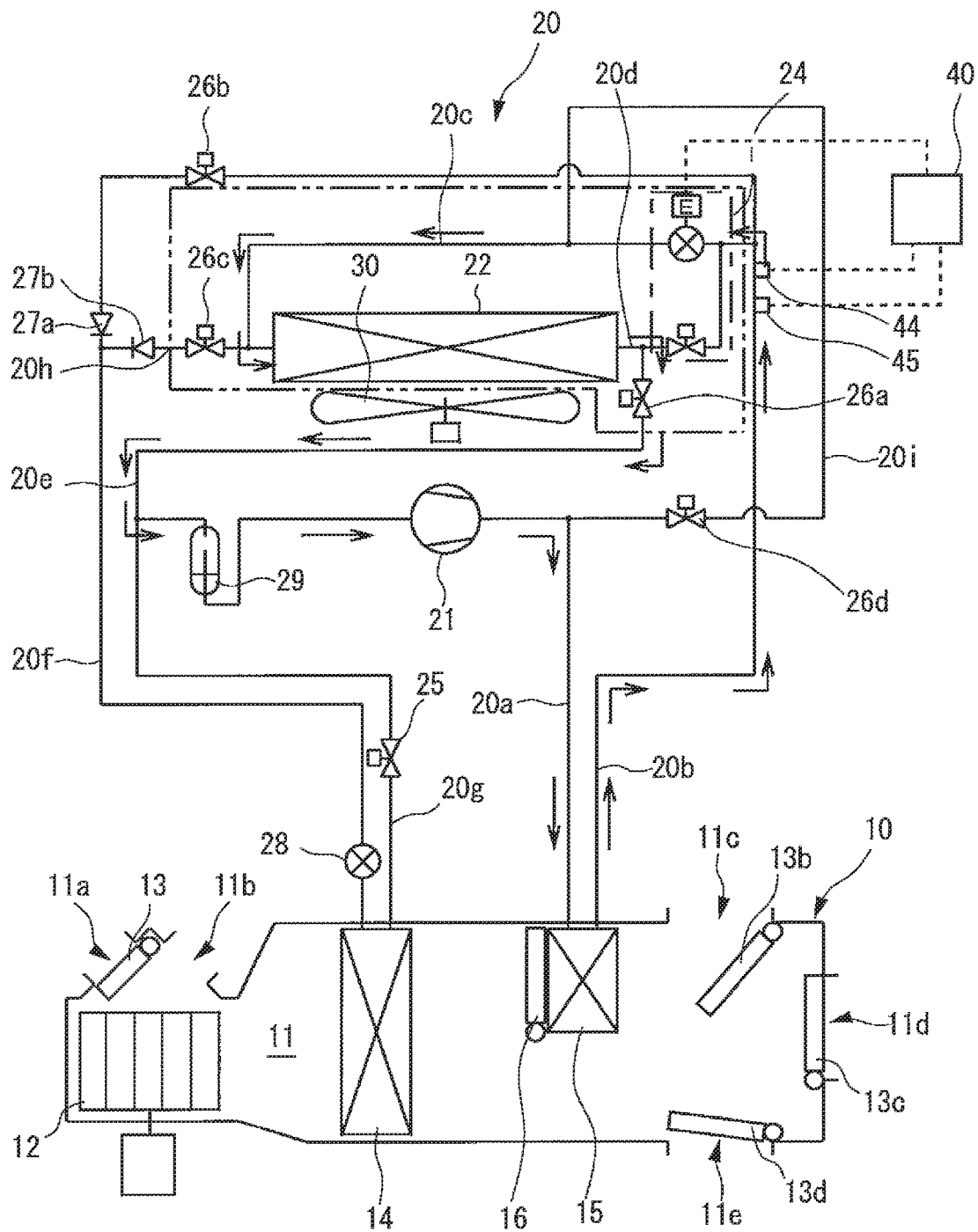
FIG. 22 is a schematic view showing the vehicle air conditioning apparatus performing a heating operation.

During the heating operation, in the refrigerant circuit 20, the refrigerant flow channel to the expansion part is opened while the refrigerant flow channel to the condensing pressure regulating part is closed in the first control valve 24; the first solenoid valve 26a is opened; the second to fourth solenoid valves 26b, 26c and 26d are closed; and the compressor 21 is operated. By this means, as shown in FIG. 22, the refrigerant discharged from the compressor 21 flows through in this order: the refrigerant flow passage 20a; the radiator 15; the refrigerant flow passages 20b and 20c; the outdoor heat exchanger 22; and the refrigerant flow passage 22e, and is sucked into the compressor 21. The refrigerant flowing through the refrigerant circuit 20 releases the heat in the radiator 15 and absorbs the heat in the outdoor heat exchanger 22.

In this case, in the air conditioning unit 10, the indoor fan 12 is operated to flow the air through the air flow passage 11, and the flowing air is not subjected to a heat exchange with the refrigerant in the heat exchanger 14, but is subjected to a heat exchange with the refrigerant in the radiator 15 and therefore is heated. As a result, the air at the target air-blowing temperature TAO blows to the vehicle interior.

In the accumulator 29, the refrigerant flows through the container body 29a, contacting the inner surface of the container body 29a and the refrigerant flow restriction plate 29d, and consequently to separate refrigerant liquid from refrigerant vapor. Excessive refrigerant liquid is accumulated in the container body 29a and only the refrigerant vapor, which is almost saturated vapor, flows out of the refrigerant outlet tube 29c. In addition, when the refrigerant liquid is separated from the refrigerant vapor, the lubricating oil contained in the refrigerant is separated from the refrigerant, and is accumulated in the container body 29a. The lubricating oil accumulated in the container body 29a flows from the oil return hole 29e into the refrigerant outlet tube 29c, and is returned to the compressor 21.

Figure 23:
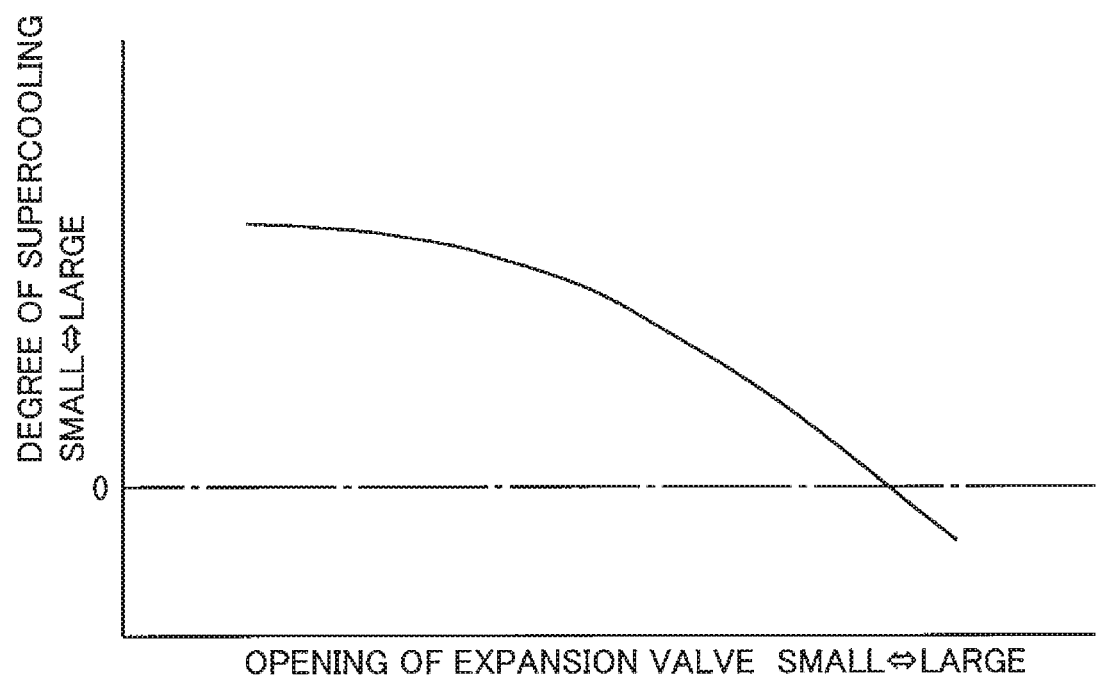
FIG. 23 is a drawing showing the relationship between the degree of supercooling of the refrigerant flowing out of the radiator and the opening of the expansion valve.

During the heating operation, as shown in FIG. 23, when the opening of the expansion part of the first control valve 24 increases, the degree of supercooling of the refrigerant flowing out of the radiator 15 is decreased, and, on the other hand, when the opening is increased, the degree of supercooling decreases. Therefore, the opening of the expansion valve of the first control valve 24 is controlled such that the degree of supercooling of the refrigerant in the radiator 15 is a predetermined value, based on the temperature detected by the high-pressure refrigerant temperature sensor 44 and the pressure detected by the high-pressure refrigerant pressure sensor 45.

Figure 24:
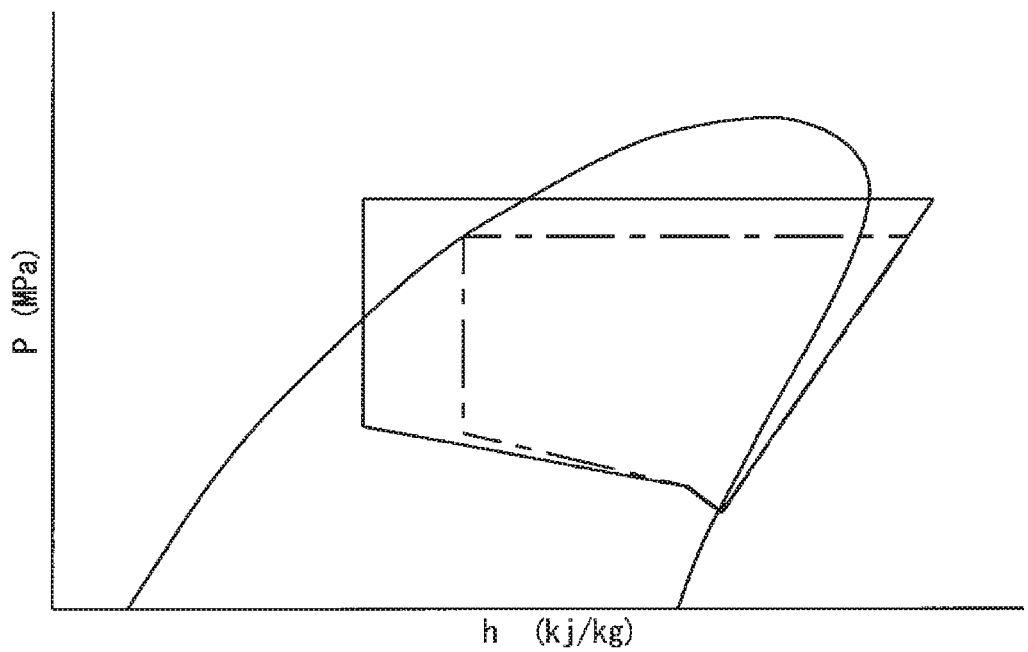
FIG. 24 is a pressure-specific enthalpy diagram during a heating operation.

To be more specific, when the degree of supercooling of the refrigerant flowing out of the radiator 15 is increased, the difference in enthalpy between the refrigerant flowing into the radiator 15 and the refrigerant flowing out of the radiator 15 is greater than in a case where the degree of supercooling is small, which is indicated by the dashed-dotted line in FIG. 24, and therefore the coefficient of performance is improved.

Figure 25:
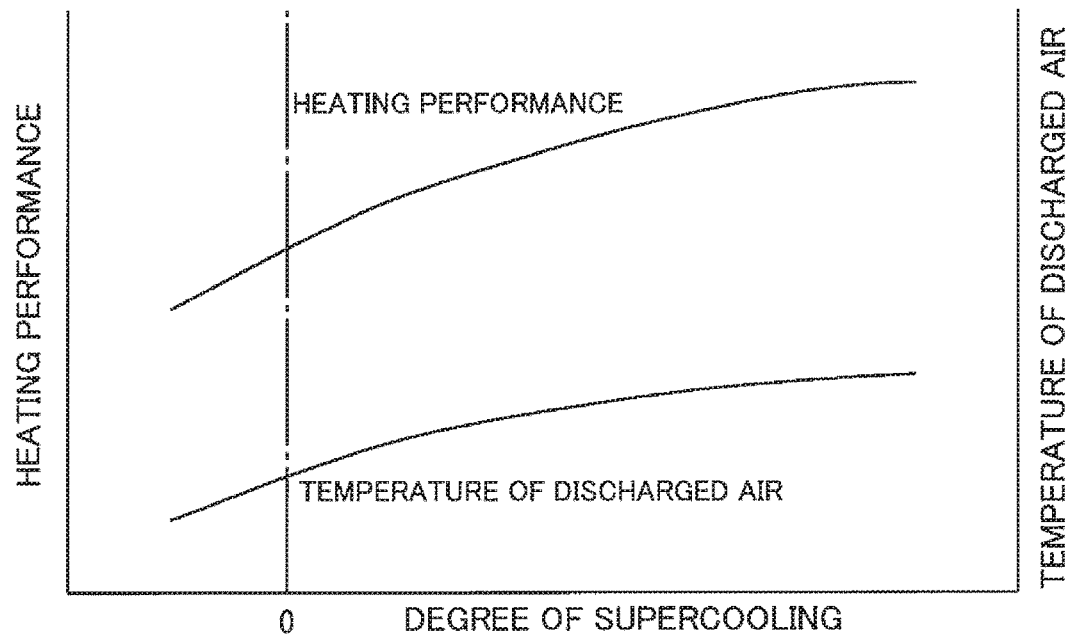
FIG. 25 is a drawing showing the relationship between the degree of supercooling of the refrigerant flowing out of the radiator and the heating performance, and the relationship between the degree of supercooling of the refrigerant and the temperature of the air blowing to the vehicle interior during a heating operation.

In addition, when the degree of supercooling of the refrigerant flowing out of the radiator 15 is increased, the liquid phase area in the radiator 15 increases. Therefore, the efficiency of the heat exchange decreases, thereby to increase the pressure of the refrigerant in the high-pressure side. When the pressure of the refrigerant in the high-pressure side is increased, the difference in enthalpy between the refrigerant flowing into the radiator 15 and the refrigerant flowing out of the radiator 15 increases, as shown in FIG. 24. In this case, as shown in FIG. 25, the heating performance increases as the degree of supercooling of the refrigerant flowing out of the radiator 15 increases, and the temperature of the air blowing to the vehicle interior is increased as the degree of supercooling of the refrigerant flowing out of the radiator 15 increases.

Generally, an increase in the pressure of a refrigerant in the high-pressure side causes an increase in the pressure ratio, and therefore the power of the compressor increases. As a result, the coefficient of performance drops. However, with the present embodiment, by increasing the degree of supercooling of the refrigerant flowing out of the radiator 15, an increase in the difference in enthalpy between the refrigerant flowing into the radiator 15 and the refrigerant flowing out of the radiator 15 may be greater than the increased amount of the power of the compressor. Therefore, it is possible to improve the coefficient of performance.

Figure 26:
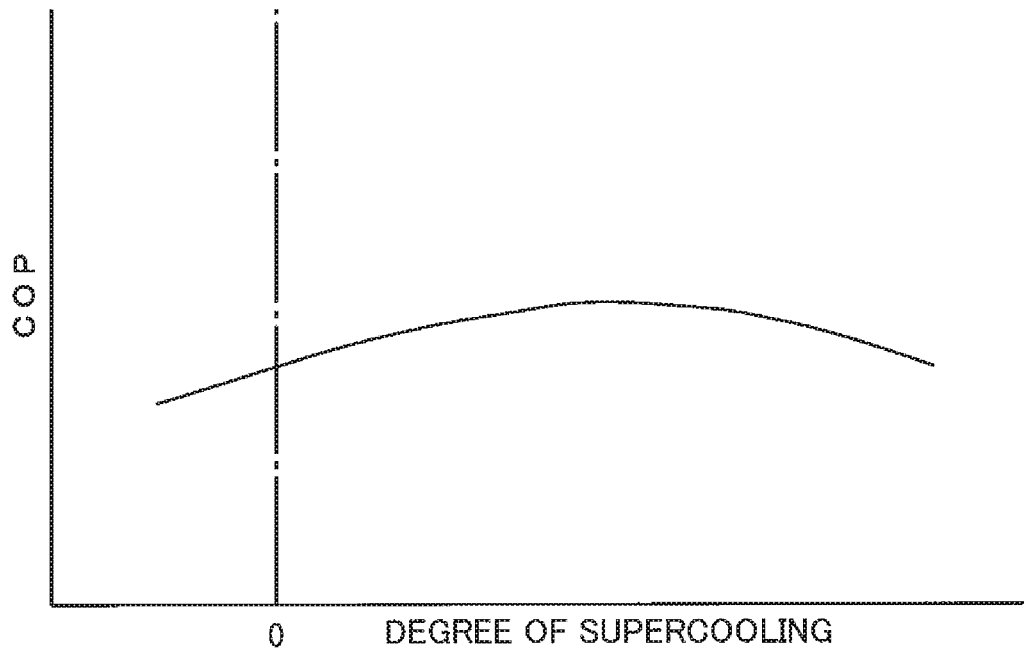
FIG. 26 is a drawing showing the relationship between the degree of supercooling of the refrigerant flowing out of the radiator and a coefficient of performance during the heating operation.

In addition, if the degree of supercooling of the refrigerant flowing out of the radiator 15 is above a predetermined range, the pressure ratio of the compressor 21 increases, and consequently the coefficient of performance drops as shown in FIG. 26. To prevent this, it is desired to control the degree of supercooling of the refrigerant to be within the predetermined range.

Therefore, when high heating performance is required, the opening of the expansion part of the first control valve 24 is controlled to increase the degree of supercooling of the refrigerant flowing out of the radiator 15. Meanwhile, when the heating operation with high energy efficiency is required, the opening of the expansion part of the first control valve 24 is controlled such that the degree of supercooling of the refrigerant flowing out of the radiator 15 is a predetermined value.

Figure 27:
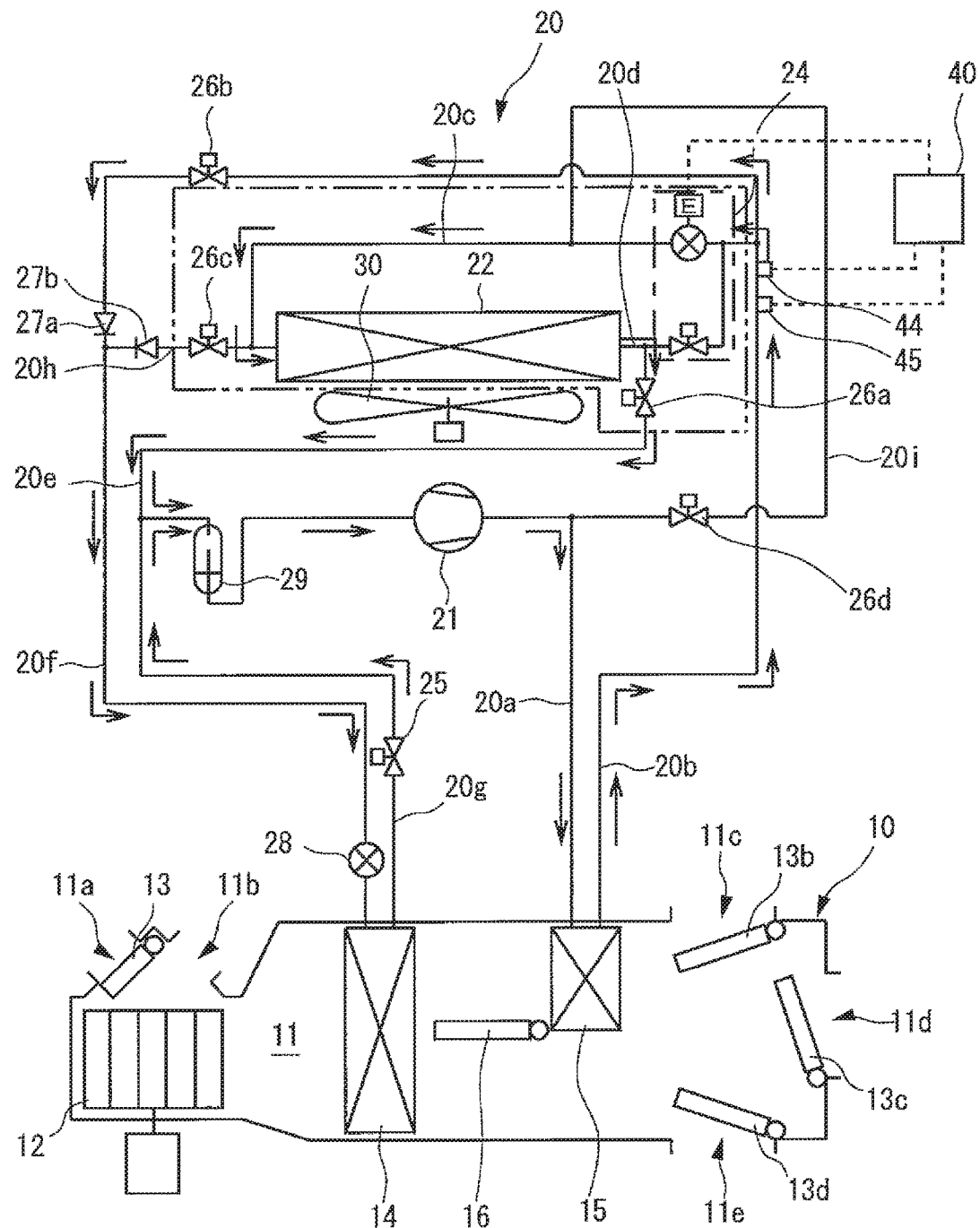
FIG. 27 is a schematic view showing the vehicle air conditioning apparatus performing a first heating and dehumidifying operation.

During the first heating and dehumidifying operation, in the refrigerant circuit 20, the refrigerant flow channel to the expansion part is opened while the refrigerant flow channel to the condensing pressure regulating part is closed in the first control valve 24; the first and second solenoid valves 26a and 26b are opened; the third and fourth solenoid valves 26c and 26d are closed; and the compressor 21 is operated. By this means, as shown in FIG. 27, the refrigerant discharged from the compressor 21 flows through in this order: the refrigerant flow passage 20a; the radiator 15; and the refrigerant flow passage 20b. Part of the refrigerant flowing through the refrigerant flow passage 20b flows through in this order: the refrigerant flow passage 20c; the outdoor heat exchanger 22; and the refrigerant flow passage 20e, and is sucked into the compressor 21. Meanwhile, the remaining refrigerant flowing through the refrigerant flow passage 20b flows through in this order: the refrigerant flow passage 20f; the heat exchanger 14; the refrigerant flow passages 20g and 20e, and is sucked into the compressor 21. The refrigerant flowing through the refrigerant circuit 20 releases the heat in the radiator 15 and absorbs the heat in the heat exchanger 14 and the outdoor heat exchanger 22.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified. Part of the air having been dehumidified in the heat exchanger 14 is subjected to a heat exchange with the refrigerant in the radiator 15 and heated. As a result, the air at the target air-blowing temperature TAO blows into the vehicle interior.

In addition, the evaporating temperature of the refrigerant in the heat exchanger 14 is controlled by regulating the opening of the second control valve 25. That is, when the opening of the second control valve 25 is decreased, the evaporating temperature of the refrigerant in the heat exchanger 14 increases. On the other hand, when the opening of the second control valve is increased, the evaporating temperature decreases.

Figure 28:
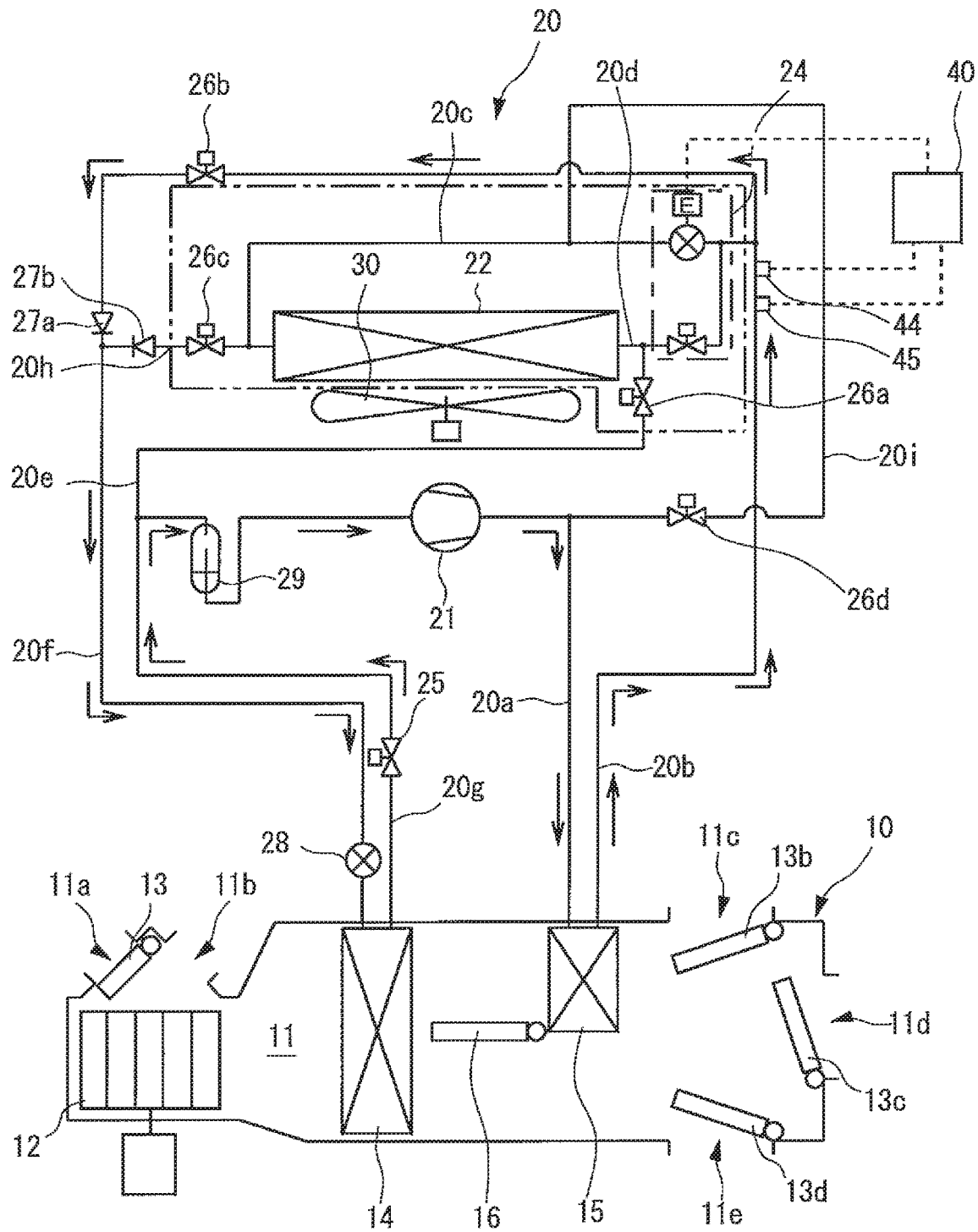
FIG. 28 is a schematic view showing the vehicle air conditioning apparatus performing a second heating and dehumidifying operation.

During the second heating and dehumidifying operation, in the refrigerant circuit 20, both the refrigerant flow channel to the expansion part and the refrigerant flow channel to the condensing pressure regulating part are closed in the first control valve 24; the second solenoid valve 26b is opened; the first, third and fourth solenoid valves 26a, 26c and 26d are closed; and the compressor 21 is operated. By this means, as shown in FIG. 28, the refrigerant discharged from the compressor 21 flows through in this order: the refrigerant flow passage 20a; the radiator 15; the refrigerant flow passages 20b and 20f; the heat exchanger 14; and the refrigerant flow passages 20g and 20e, and is sucked into the compressor 21. The refrigerant flowing through the refrigerant circuit 20 releases the heat in the radiator 15 and absorbs the heat in the heat exchanger 14.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified in the same way as in the first heating and dehumidifying operation. Part of the air dehumidified in the heat exchanger 14 is subjected to a heat exchange with the refrigerant in the radiator 15, and therefore heated. As a result, the air at the target air-blowing temperature TAO blows to the vehicle interior.

Figure 29:
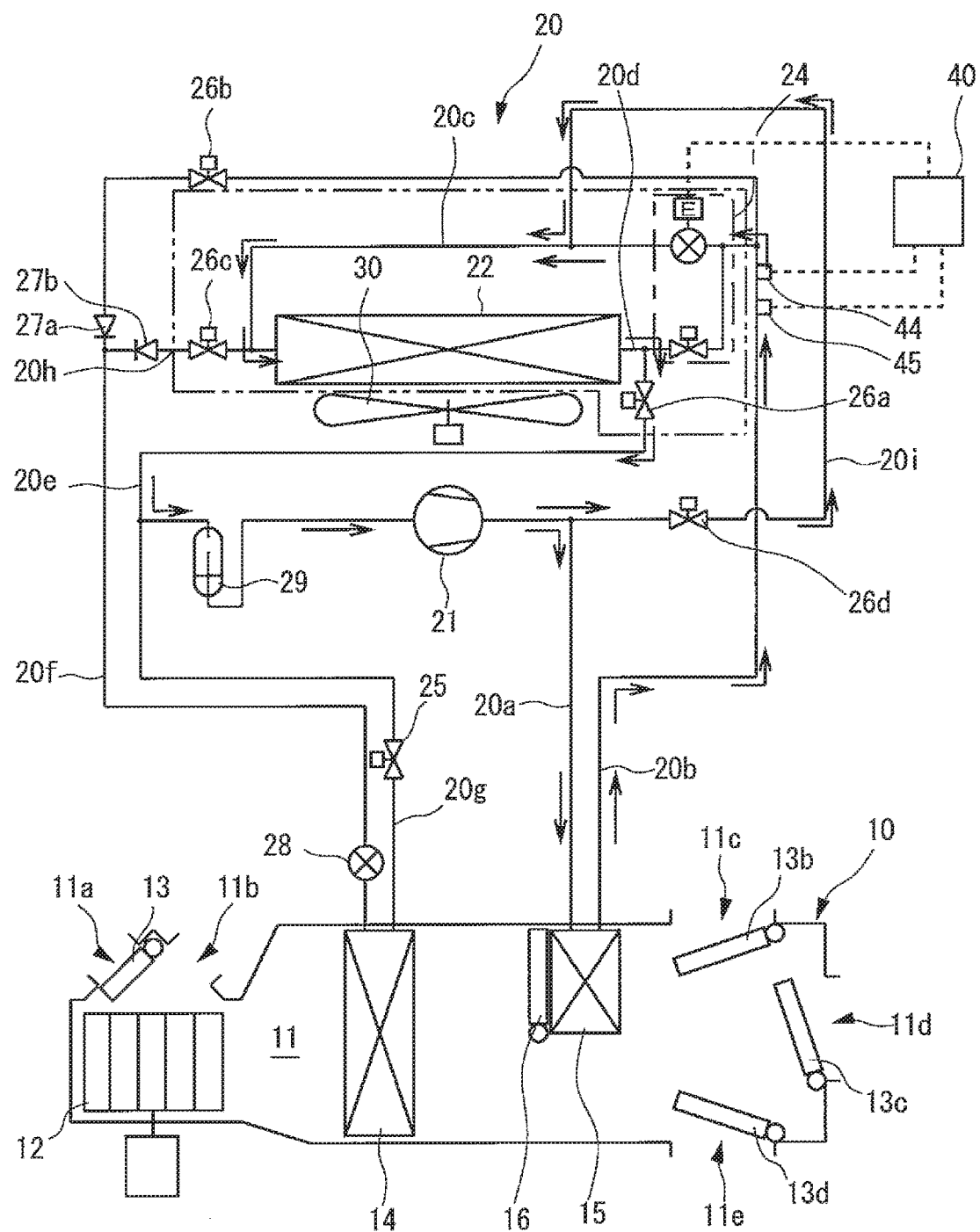
FIG. 29 is a schematic view showing the vehicle air conditioning apparatus performing a defrost operation.

During the defrost operation, in the refrigerant circuit 20, the refrigerant flow channel of the first control valve 24 is set to the refrigerant flow channel to the expansion part; the first and fourth solenoid valves 26a and 26d are opened and the second and third solenoid valves 26b and 26c are closed; and the compressor 21 is operated. By this means, as shown in FIG. 29, part of the refrigerant discharged from the compressor 21 flows through in this order: the refrigerant flow passage 20*a*; the radiator 15; and the refrigerant flow passages 20*b* and 20*c*, and is sucked into the compressor 21. Meanwhile, the remaining refrigerant discharged from the compressor 21 flows through the refrigerant flow passages 20*a*, 20*i* and 20*c*, and flows into the outdoor heat exchanger 22. The refrigerant flowing out of the outdoor heat exchanger 22 flows through the refrigerant flow passage 20*e* and is sucked into the compressor 21. The refrigerant flowing through the refrigerant circuit 20 releases the heat in the radiator 15, and at this time, absorbs the heat in the outdoor heat exchanger 22.

In this case, in the air conditioning unit 10, the indoor fan 12 is operated to flow the air through the air flow passage 11. The flowing air is not subjected to a heat exchange with the refrigerant in the heat exchanger 14, but is subjected to a heat exchange with the refrigerant which releases the heat in the radiator 15, and therefore is heated and then blows to the vehicle interior.

While an automatic switch is turned on, the operation is switched among the cooling operation, the cooling and dehumidifying operation, the heating operation, the first heating and dehumidifying operation, the second heating and dehumidifying operation and the defrost operation, based on environmental conditions including the outdoor air temperature Tam, the indoor air temperature Tr, the outdoor air humidity, the indoor air humidity Th, the amount of insolation Ts and so forth.

In addition, the mode of the outlets 11*c*, 11*d* and 11*e* are switched by the outlet switching dampers 13*b*, 13*c* and 13*d*. The opening of the air mix damper 16 is controlled such that the temperature of the air blowing out of the outlets 11*c*, 11*d* and 11*e* is the target air-blowing temperature TAO.

In each operation, switching the operation among the foot mode, the vent mode and the bi-level mode is performed according to the target air-blowing temperature TAO. To be more specific, when the target air-blowing temperature TAO is high, for example, 40 degrees Celsius, the mode is set to the foot mode. Meanwhile, when the target air-blowing temperature TAO is low, for example, lower than 25 degrees Celsius, the mode is set to the vent mode. Moreover, when the target air-blowing temperature TAO is the temperature between the temperature for the foot mode and the temperature for the vent mode, the mode is set to the bi-level mode.

In this way, with the vehicle air conditioning apparatus according to the present embodiment, during the cooling operation and the cooling and dehumidifying operation, the first control valve 24 that can control the amount of refrigerant flowing out of the radiator 15 and into the outdoor heat exchanger 22 is provided in the refrigerant flow passage between the radiator 15 and the outdoor heat exchanger 22 in the refrigerant circuit 20. By this means, during the cooling and dehumidifying operation, the condensing pressure regulating part of the first control valve 24 regulates the quantity of heat release in the radiator 15, and therefore it is possible to secure the amount of heating, which is required to heat the air blowing to the vehicle interior. Consequently, it is possible to ensure that the temperature of the air supplied to the vehicle interior is the preset temperature Tset.

In addition, during the first heating and dehumidifying operation, the second control valve 25 that can regulate the amount of refrigerant flowing out of the heat exchanger 14 and sucked into the compressor 21 is provided in the refrigerant flow passage between the heat exchanger 14 and the compressor 21 in the refrigerant circuit 20. By this means, during the first heating and dehumidifying operation, the opening of the second control valve 25 is decreased, and therefore it is possible to increase the evaporating pressure of the refrigerant in the heat exchanger 14. Therefore, even if the outdoor temperature is low, it is possible to prevent a frost from being formed on the heat exchanger 14, and therefore to secure the necessary quantity of heat to be absorbed into the refrigerant in the heat exchanger 14.

In addition, the first control valve 24 includes: the expansion part configured to expand the refrigerant flowing into the outdoor heat exchanger 22 in the refrigerant circuit 20 during the heating operation and the first heating and dehumidifying operation; the condensing pressure regulating part configured to regulate the condensing pressure of the refrigerant flowing out of in the radiator 15 and into the outdoor heat exchanger 22 in the refrigerant circuit 20 during the cooling and dehumidifying operation; and the refrigerant flow channel switching part to switch the refrigerant flow channel between the refrigerant flow channel to the expansion part and the refrigerant flow passage to the condensing pressure regulating part, and they are integrally formed. By this means, there is no need to provide the expansion part, the condensing pressure regulating part and the refrigerant flow channel switching part separately as individual parts, and therefore it is possible to reduce the number of parts and the number of man-hours in the assembly.

Moreover, the outdoor heat exchanger 22, the first control valve 24, the first solenoid valve 26*a* and the third solenoid valve 26*c* are integrally formed as the outdoor heat exchanger unit. By this means, there is no need to provide the outdoor heat exchanger 22, the first control valve 24, the first solenoid valve 26*a* and the third solenoid valve 26*c* separately as individual parts, and therefore it is possible to reduce the number of parts and the number of man-hours in the assembly.

Moreover, the accumulator 29 is provided in the refrigerant flow passage that allows the refrigerant to be sucked into the compressor 21. The opening of the expansion part of the first control valve 24 can be regulated to expand the refrigerant flowing out of the radiator 15 and into the outdoor heat exchanger 22 in the refrigerant circuit 20 during the heating operation. By this means, only the refrigerant vapor, which is almost saturated vapor, can be sucked into the compressor 21, and it is possible to optimize the degree of supercooling of the refrigerant flowing out of the radiator 15. Consequently, it is possible to improve the heating performance and the coefficient of performance during the heating operation.

Moreover, the expansion part of the first control valve 24 may include an electronic expansion valve with the opening regulated by the solenoid 24*h*. By this means, during the heating operation, it is possible to optimize the degree of supercooling of the refrigerant flowing out of the radiator 15, based on the temperature Thp of the high-pressure refrigerant flowing through the refrigerant flow passage 20*b*, and the pressure Php of the high-pressure refrigerant flowing through the refrigerant flow passage 20*b*. Therefore, it is possible to improve the heating performance and the coefficient of performance during the heating operation.

Moreover, the outdoor heat exchanger 22 includes the supercooling portion 22*f* to place the flowing refrigerant in a supercooling state is provided in the refrigerant circuit 20 during the cooling operation and the cooling and dehumidifying operation. The expansion valve 28 to expand the refrigerant flowing into the heat exchanger 14 is a temperature expansion valve with the adjustable opening according to the temperature of the refrigerant flowing out of the heat exchanger 14. In this way, by placing the refrigerant flowing through the outdoor heat exchanger 22 in a supercooling state in the refrigerant circuit 20 during the cooling operation and the cooling and dehumidifying operation, it is possible to increase the difference in enthalpy between the refrigerant flowing into the heat exchanger 14 and the refrigerant flowing out of the heat exchanger 14 and also to regulate the superheat of the refrigerant flowing out of the heat exchanger 14. Therefore, it is possible to improve the coefficient of performance during the cooling operation and the cooling and dehumidifying operation.

Furthermore, the refrigerant flow passage 20i is provided in the refrigerant circuit 20 which allows part of the refrigerant to flow into the outdoor heat exchanger 22 but restricts the part from flowing into the radiator 15 during the heating operation. By this means, even if the outdoor temperature is low and a frost is formed on the outdoor heat exchanger 22, it is possible to remove the frost on the outdoor heat exchanger 22. Therefore, it is possible to prevent the heating performance from dropping in the heating operation.

Figure 30:
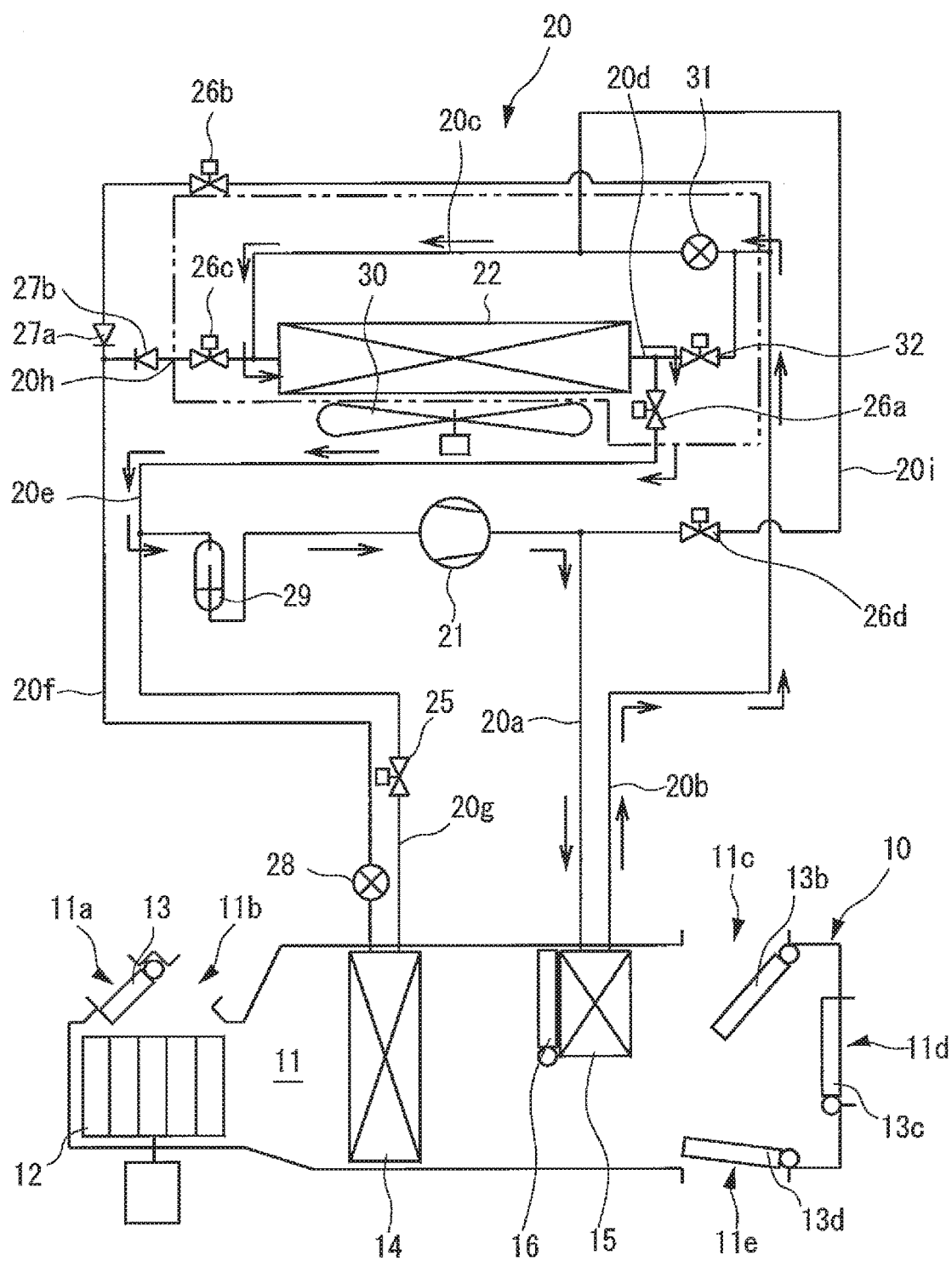
FIG. 30 is a schematic view showing the vehicle air conditioning apparatus according to Embodiment 4 of the present invention.
Figure 31:
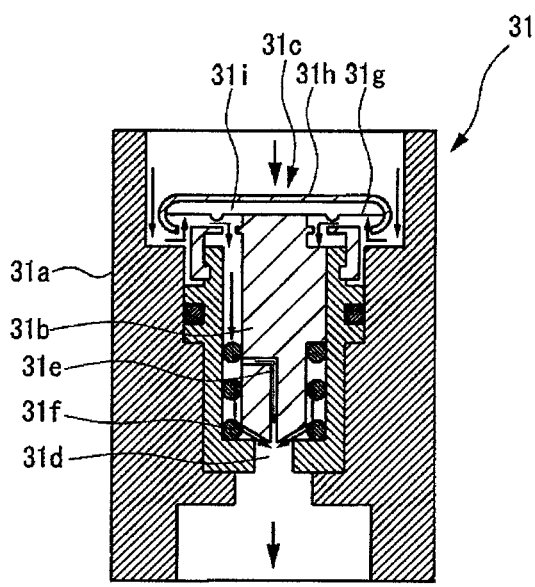
FIGS. 31A and 31B are cross-sectional views showing the expansion valve.
Figure 31:
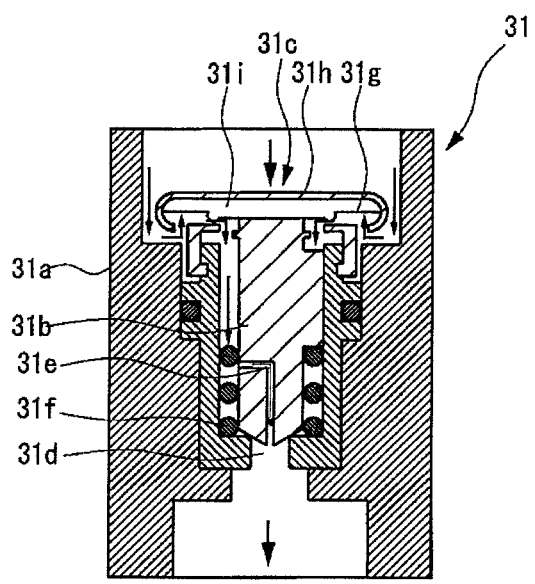

FIGS. 30 and 31 show Embodiment 4 of the present invention. Here, the same components are assigned the same reference numerals as in the above-described embodiments.

This vehicle air conditioning apparatus includes an expansion valve 31 provided between the refrigerant flow passage 20b and the refrigerant flow passage 20c, instead of the first control valve 24 in Embodiment 3, and a third control valve 32 provided between the refrigerant flow passage 20b and the refrigerant flow passage 20d.

The expansion valve 31 is a mechanical temperature expansion valve whose opening varies according to the temperature of the flowing refrigerant. As shown in FIG. 31, the expansion valve 31 includes a cylindrical valve body 31a, a valve element 31b provided in the valve body 31a and a power element 31c to sense the temperature of the refrigerant and move the valve element 31b.

The valve element 31a is configured to allow the refrigerant flow through, and includes a communicating hole 31d that allows communication between the upstream and downstream of the refrigerant flow direction.

The valve element 31b is provided upstream of the communicating hole 31d in the valve body 31a and configured to be able to move in the refrigerant flow direction. When the valve element 31b moves to the communicating hole 31b, its one end closes the communicating hole 31d. On the other hand, when the valve element 31b moves opposite to the communicating hole 31d, the communicating hole 31d is opened. A communicating passage 31e is formed in the valve body 31b to allow communication between the upstream and downstream of the refrigerant flow direction in the valve body 31a while the valve element 31b closes the communicating hole 31d. The valve element 31b is biased by a coil spring 31f to open the communicating hole 31d.

The power element 31c is constituted by a diaphragm 31g and a cover member 31h that encloses the diaphragm 31g. An air tight chamber 31i in which temperature sensitive gas is sealed is formed between the first surface (the upper surface in FIG. 31) of the diaphragm 31g and the inner surface of the cover member 31h. Meanwhile, the refrigerant flowing into the valve body 31a flows between the second surface of the diaphragm 31g and the inner surface of the cover member 31h. When the temperature of the refrigerant flowing into the valve body 31a rises, the pressure in the airtight chamber 31i increases. Then, the diaphragm 31g is moved to the second surface side so as to increase the volume of the airtight chamber 31i. The movement of the diaphragm 31g to increase the volume of the airtight chamber 31i causes the valve body 31b to move to close the communicating hole 31d. When the valve body 31b closes the communicating hole 31d, only the communicating passage 31e allows communication between the upstream and downstream of the refrigerant flow direction in the valve body 31a.

The opening of the third control valve 32 can vary, so that it is possible to regulate the condensing pressure of the refrigerant in the radiator 15 during the cooling and dehumidifying operation.

In the vehicle air conditioning apparatus having the above-described configuration, the degree of supercooling of the refrigerant flowing out of the radiator 15 is regulated by the expansion valve 31.

To be more specific, when the temperature of the refrigerant flowing out of the radiator 15 increases, the opening of the expansion valve 31 decreases. On the other hand, when the temperature of the refrigerant flowing out of the radiator decreases, the opening of the expansion valve 31 increases. FIG. 31A shows a state in which the communicating hole 31d is open. FIG. 31B shows a state in which the communicating hole 31d is closed.

In this way, with the vehicle air conditioning apparatus according to the present embodiment, during the cooling operation and the cooling and dehumidifying operation, the quantity of heat release in the radiator 15 is regulated by the third control valve 32, and therefore it is possible to secure the amount of heating required to heat the air blowing to the vehicle interior. Therefore, it is possible to ensure that the temperature of the air supplied to the vehicle interior is the preset temperature Tset.

The expansion valve 31 is a mechanical temperature expansion valve. By this means, during the heating operation, it is possible to optimize the degree of supercooling of the refrigerant flowing out of the radiator 15 with a simple configuration, and therefore it is possible to reduce the production cost.

Figure 32:
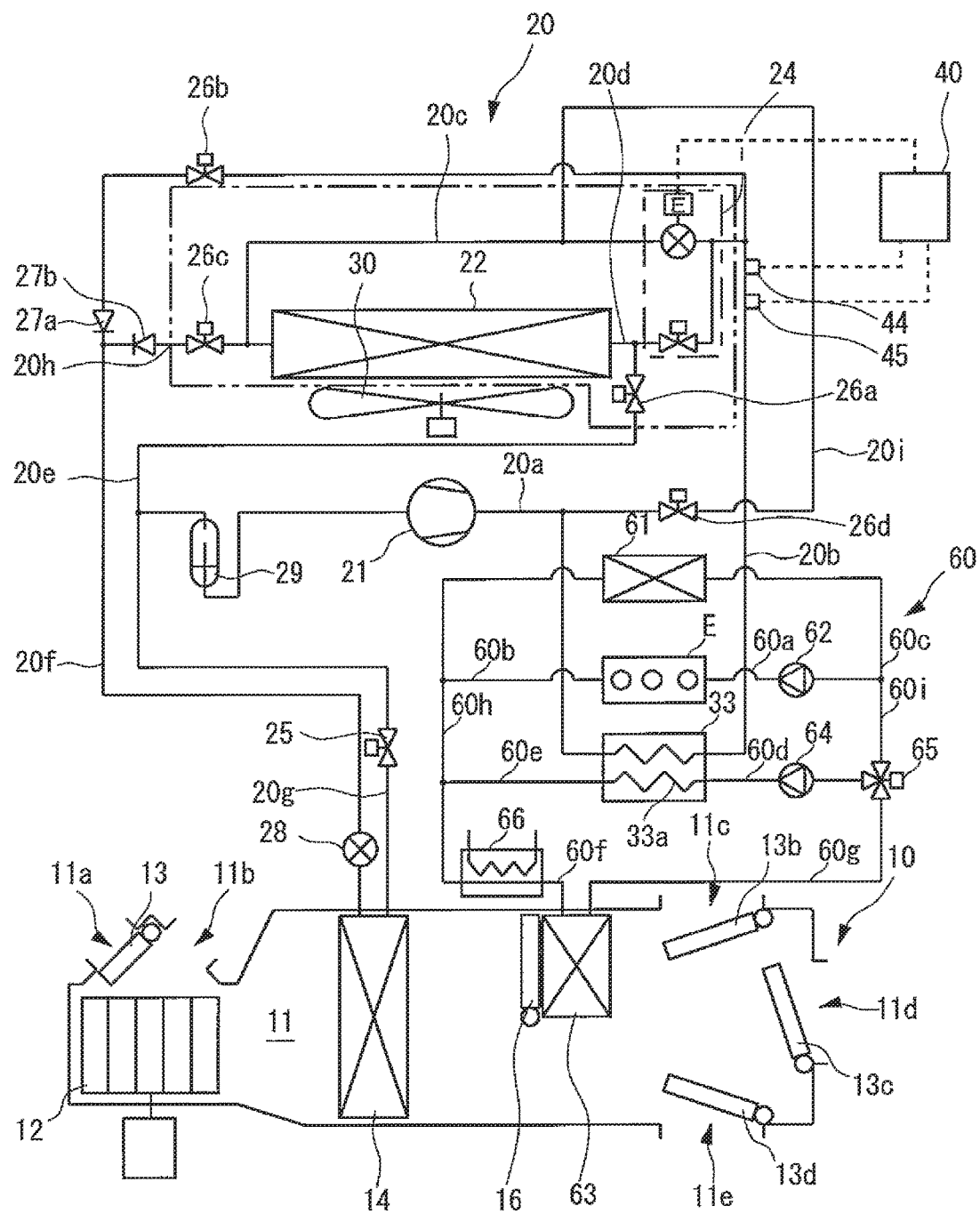
FIG. 32 is a schematic view showing the vehicle air conditioning apparatus according to Embodiment 5 of the present invention.

FIG. 32 shows Embodiment 5. Here, the same components are assigned the same reference numerals as in the above-described embodiments.

This vehicle air conditioning apparatus includes a water-refrigerant heat exchanger 33 configured to release the heat from the refrigerant flowing through the refrigerant circuit 20 and to absorb the heat into the cooling water to cool the engine E for driving the vehicle, instead of the radiator 15 to release the heat from the refrigerant in Embodiments 3 and 4. The water-refrigerant heat exchanger 33 includes a cooling water flow passage 33a as a heat medium flow passage configured to allow cooling water to flow through. An engine cooling circuit 60 is connected to the cooling water flow passage 33a, which is a heat medium circuit configured to allow cooling water to flow through.

The engine cooling circuit 60 includes: the water-refrigerant heat exchanger 33; a water jacket for the engine E; an engine radiator 61; a first pump 62 configured to circulate cooling water between the water jacket for the engine E and the engine radiator 61; a radiator 63 configured to release the heat from the cooling water to the air flowing through the air flow passage 11; a second pump 64 configured to circulate the cooling water between the water-refrigerant heat exchanger 33 and the radiator 63; a three-way valve 65; and water heater 66 configured to heat cooling water by electric power. These components are connected to each other by a copper pipe or an aluminum pipe.

To be more specific, input side of the water jacket for the engine E into which the water flows is connected to the delivery side of the first pump 62 from which the water is discharged, thereby to form a water flow passage 60a. In addition, the input side of the engine radiator 61 into which the water flows is connected to the output side of the water jacket for the engine E from which the water is discharged, thereby to form a water flow passage 60b. The suction side of the first pump 62 into which the water is sucked is connected to the output side of the engine radiator 61 from which the water is discharged, thereby to form a water flow passage 60c. The input side of the water-refrigerant heat exchanger 33 into which the water flows is connected to the delivery side of the second pump 62 from which the water is discharged, thereby to form a water flow passage 60d. The input side of the water heater 66 into which the water flows is connected to the output side of the water-refrigerant heat exchanger 33 from which the water is discharged, thereby to form a water flow passage 60e. The input side of the radiator 63 into which the water flows is connected to the output side of the water heater 66 from which the water is discharged, thereby to form a water flow passage 60f. The suction side of the second pump 64 into which the water is sucked is connected to the output side of the radiator 63 from which the water is discharged, thereby to form a water flow passage 60g. The water flow passage 60b is connected to the water flow passage 60e, thereby to form a water flow passage 60h. Moreover, the water flow passage 60c is connected to the water flow passage 60g, thereby to form a water flow passage 60i. The three-way valve 65 is provided in the connection portion between the water flow passage 60g and the water flow passage 60i to allow the communication between the output side of the heat radiator 63 and the first pump 62 side or the second pump 64 side.

The engine cooling circuit 60 is realized by connecting the circuit constituted by the water-refrigerant heat exchanger 33, the radiator 63, the second pump 64, the three-way valve 65, and the water heater 66 to the engine cooling circuit constituted by the water jacket for the engine E, the engine radiator 61 and the first pump 62.

In the vehicle air conditioning apparatus having the above-described configuration, the second pump 64 is driven while the three-way valve 65 allows communication between the heat radiator 63 and the second pump 64, so that it is possible to perform cooling operation, cooling and dehumidifying operation, heating operation, first heating and dehumidifying operation, second heating and dehumidifying operation, and defrost operation, in the same way as in Embodiments 3 and 4.

In addition, during the heating operation, when the quantity of heat release is not sufficient in the water-refrigerant heat exchanger 33, the water heater 66 heats the cooling water to compensate for the insufficient quantity of heat.

When the first pump 62 is driven while the three-way valve 65 allows communication between the radiator 63 and the second pump 64, the exhaust heat of the engine E is discharged from the engine radiator 61.

In addition, the first pump 62 is driven while the three-way valve 65 allows communication between the radiator 63 and the first pump 62, the heat released in the water-refrigerant heat exchanger 33 is transferred to the engine E to promote the warm-up of the engine E.

In this way, with the vehicle air conditioning apparatus according to the present embodiment, during the cooling operation and the cooling and dehumidifying operation, the quantity of heat release in the water-refrigerant heat exchanger 33 is regulated by the condensing pressure regulating part of the first control valve 24, and therefore it is possible to secure the amount of heating required to heat the air blowing to the vehicle interior. Therefore, it is possible to ensure that the temperature of the air supplied to the vehicle interior is the preset temperature Tset.

Figure 33:
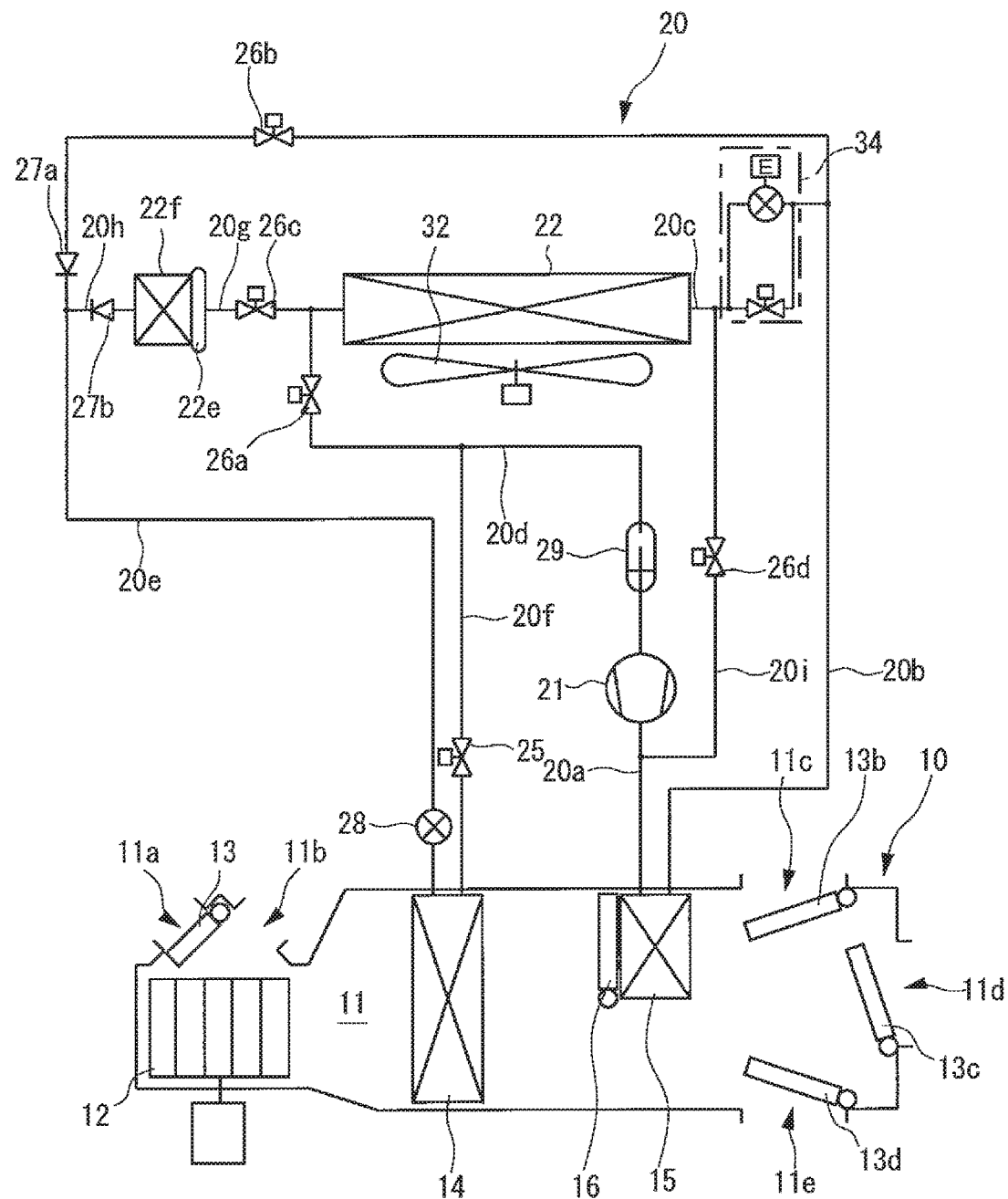
FIG. 33 is a schematic view showing the vehicle air conditioning apparatus according to Embodiment 6 of the present invention.

FIGS. 33 and 34 show Embodiment 6 of the present invention. Here, the same components are assigned the same reference numerals as in Embodiment 3.

As shown in FIG. 33, in the refrigerant circuit 20 of the vehicle air conditioning apparatus, a third control valve 34 is provided instead of the first control valve 24b in Embodiment 3. The third control valve 34 includes a refrigerant inlet and a refrigerant outlet and can regulate its opening within each of a decompression range and a condensing pressure regulating range.

To be more specific, input side of the radiator 15 into which the refrigerant flows is connected to the delivery side of the compressor 21 from which the refrigerant is discharged to form the refrigerant flow passage 20a. In addition, the input side of the third control valve 34 into which the refrigerant flows is connected to the output side of the radiator 15 from which the refrigerant is discharged, thereby to form the refrigerant flow passage 20b. The input side of the outdoor heat exchanger 22 into which the refrigerant flows is connected to the output side of the third control valve 34 from which the refrigerant is discharged, thereby to form the refrigerant flow passage 20c. The suction side of the compressor 21 into which the refrigerant is sucked is connected to the output side of the outdoor heat exchanger 22 from which the refrigerant is discharged, thereby to form the refrigerant flow passage 20d. In the refrigerant flow passage 20d, the first solenoid valve 26a and the accumulator 29 are provided in the order from the upstream of the refrigerant flow direction. The input side of the heat exchanger 14 into which the refrigerant flows is connected to the refrigerant flow passage 20b, thereby to form the refrigerant flow passage 20e. In the refrigerant flow passage 20e, the second solenoid valve 26b, the first check valve 27a and the expansion valve 28 are provided in the order from the upstream of the refrigerant flow direction. Part of the refrigerant flow passage 20d between the first solenoid valve 26a and the accumulator 29 is connected to the output side of the heat exchanger 14 from which the refrigerant is discharged, thereby to form the refrigerant flow passage 20f. The second control valve 25 is provided in the refrigerant flow passage 20f. The input side of the gas-liquid separator 22e into which the refrigerant flows is connected to the output side of the outdoor heat exchanger 22 from which the refrigerant is discharged, in parallel with the refrigerant flow passage 20d, thereby to form the refrigerant flow passage 20g. The third solenoid valve 26c is provided in the refrigerant flow passage 20g. Part of the refrigerant flow passage 20e between the first check valve 27a and the expansion valve 28 is connected to the output side of the gas-liquid separator 22e from which the refrigerant is discharged via the supercooling portion 22f, thereby to form the refrigerant flow passage 20h. The second check valve 27b is provided in the refrigerant flow passage 20h. Moreover, the refrigerant flow passage 20a is connected to the refrigerant flow passage 20c, thereby to form the refrigerant flow passage 20i, as a defrost refrigerant flow passage. The fourth solenoid valve 26d is provided in the refrigerant flow passage 20i.

As shown in FIG. 34, the third control valve 34 includes: a valve body 34a configured to allow the refrigerant having passed through the refrigerant flow passage 20b to flow through; and an opening regulating mechanism 34b configured to switch the refrigerant flow passage of the valve body 34 between the refrigerant flow channel to the expansion part and the refrigerant flow channel to the condensing pressure regulating part, and to regulate the openings of the refrigerant flow passages to the expansion part and to the condensing pressure regulating part, respectively.

In the valve body 34a, there are formed a refrigerant inlet chamber 34d configured to communicate with a refrigerant inlet 34c connecting to the refrigerant flow passage 20b, and a refrigerant outlet chamber 34f configured to communicate with a refrigerant outlet 34e connecting to the refrigerant flow passage 20c. The refrigerant inlet chamber 34d may be a room having a circular cross-section and extending in the horizontal direction. The refrigerant inlet 34c is provided on the outer periphery of the refrigerant inlet chamber 34d in the refrigerant outlet chamber 34f side. Meanwhile, the refrigerant outlet chamber 34f may be a room having a circular cross-section and extending along the same axis as the refrigerant inlet chamber 34f. The refrigerant outlet chamber 34f communicates with the refrigerant inlet chamber 34d via a first communicating hole 34g that is opened and closed by the opening regulating mechanism 34b.

In addition, in the valve body 34a, an expansion part refrigerant flow channel 34h configured to allow communication between the refrigerant outlet chamber 34f side of the refrigerant inlet chamber 34d and the refrigerant outlet chamber 34f. A second communicating hole 34i that is opened and closed by the opening regulating mechanism 34b is provided in the expansion part refrigerant flow channel 34h in the refrigerant outlet chamber 34f side.

Moreover, a pilot refrigerant flow channel 34j is provided in the valve body 34a to allow communication between the refrigerant inlet chamber 34d in the side opposite to the refrigerant outlet chamber 34f and the second communicating hole 34i of the expansion part refrigerant flow channel 34h in the refrigerant inlet chamber 34d side. A third communicating hole 34k that is opened and closed by the opening regulating mechanism 34b is provided in the pilot refrigerant flow channel 34j in the refrigerant outlet chamber 34f side.

The opening regulating mechanism 34b includes: a solenoid 34l to linearly reciprocate a plunger g with respect to a coil; a first valve element 34m to open and close the first communicating hole 34g; a second valve element 34n to open and close the second communicating hole 34i; and a third valve element 34o to open and close the third communicating hole 34k.

The solenoid 34l is a proportional solenoid configured to be able to adjust the position of the plunger with respect to the coil by regulating the magnitude of the current flowing though the coil.

The first valve element 34m includes: a valve element portion 34p to open and close the first communicating hole 34g; a piston portion 23q configured to be able to move in the refrigerant inlet chamber 34d; and a coupling portion 34r configured to couple the valve element portion 34q with the piston portion 34q. A communicating hole 34s is provided in the piston portion 34q that allows communication between the part of the refrigerant inlet chamber 34d in the refrigerant outlet chamber 34f side and the part of the refrigerant inlet chamber 34d located on the opposite side of the refrigerant outlet chamber 34f. The first valve element 34m is biased in the direction in which the valve element portion 34p closes the first communicating hole 34g by a coil spring 34t in the piston portion 34q, which is provided in the opposite side of the refrigerant outlet chamber 34f.

The second valve element 34n is a needle-like member, which has a circular cross-section and tapers to one end, and is fixed to the front end of the plunger. The second valve element 34n increases the opening of the second communicating hole 34i as the plunger moves upward.

The third valve element 34o is a needle-like member, which has a circular cross-section and tapers to one end, and is provided to engage with an engagement portion 34u that is provided in the middle of the plunger in the axis direction of the plunger. The third valve element 34o is biased to close the third communicating hole 34k by a coil spring 34v provided on the third valve element 34o. When the amount of the upward movement of the plunger is a predetermined value or greater, the third valve 34o engages with the engagement portion 34u, and, when the amount of the upward movement of the plunger exceeds the predetermined value, the opening of the third communicating hole 34 increases.

In FIG. 34A, the first valve element 34m, the second valve element 34n, and the third valve element 34o close the first communicating hole 34g, the second communicating hole 34i and the third communicating hole 34k, respectively.

When the plunger of the solenoid 34l moves upward from the state shown in FIG. 34A, the second valve element 34n opens the second communicating hole 34i while the first valve element 34m and the third valve element 34o close the first communicating hole 34g and the third communicating hole 34k, respectively, as shown in FIG. 34B. In this case, the refrigerant flowing from the refrigerant inlet 34c into the refrigerant inlet chamber 34d is decompressed via the expansion part refrigerant flow channel 34h and flows into the refrigerant outlet chamber 34f, and then flows out of the refrigerant outlet 34e. The first valve element 34m keeps the first communicating hole 34g closed by the biasing force of the coil spring 34t. The plunger of the solenoid 34l is moved as long as the first communicating hole 34g and the third communicating hole 34k are closed, the opening is regulated within the range of the expansion part.

The plunger of the solenoid 34l moves more upward from the state shown in FIG. 34B, the second valve element 34n and the third valve element 34o open the second communicating hole 34i and the third communicating hole 34k, respectively, because of the upward movement of the plunger as shown in FIG. 34C. When the second communicating hole 34i and the third communicating hole 34j are opened, the part of the refrigerant inlet chamber 34d located on the opposite side of the first communicating hole 34g communicates with the refrigerant outlet chamber 34f via the pilot refrigerant flow channel 34j, so that the pressure drops. By this means, as shown in FIG. 34C, the first valve element 34m moves to the opposite side of first communicating hole 34g of the refrigerant inlet chamber 34d, against the biasing force of the coil spring 34t. The plunger of the solenoid 34l is moved as long as the first communicating hole 34g is open, the opening is regulated within the condensing pressure regulating part.

In this way, with the vehicle air conditioning apparatus according to the present embodiment, during the cooling operation and the cooling and dehumidifying operation, the quantity of heat release in the radiator 15 is controlled with the third control valve 34, and therefore it is possible to secure the amount of heating required to heat the air blowing to the vehicle interior in the same way as in Embodiment 3 to Embodiment 5. As a result, it is possible to ensure that the temperature of the air supplied to the vehicle interior is the preset temperature Tset.

Here, a configuration has been described where the outdoor heat exchanger 22, the first control valve 24, the first solenoid valve 26a and the third solenoid valve 26 are integrally formed as the outdoor heat exchanger unit. However, it is by no means limiting. Another configuration is possible where the second solenoid valve 26b or the fourth solenoid valve 26d, and the first and second check valves 27a and 27b are formed integrally with the outdoor heat exchanger 22 as long as they are positioned close to the outdoor heat exchanger 22.

In addition, with the present embodiment, a configuration has been described where the solenoid 24h switches the refrigerant flow channels and regulates the opening. However, it is by no means limiting. For example, a stepping motor may be used as long as it is possible to switch the refrigerant flow channels in the valve body 24a and to regulate the opening.

Moreover, with Embodiment 5, a configuration has been described where the heat released from the refrigerant circuit 20 is absorbed into the cooling water flowing through the engine cooling circuit 60 via the water-refrigerant heat exchanger 33. However, heat medium subjected to a heat exchange with the refrigerant is not limited to water, but any heat medium is applicable, which enables heat transfer, such as antifreeze solution containing ethyleneglycol and so forth.

FIGS. 35 to 45 show Embodiment 7 of the present invention.

Figure 35:
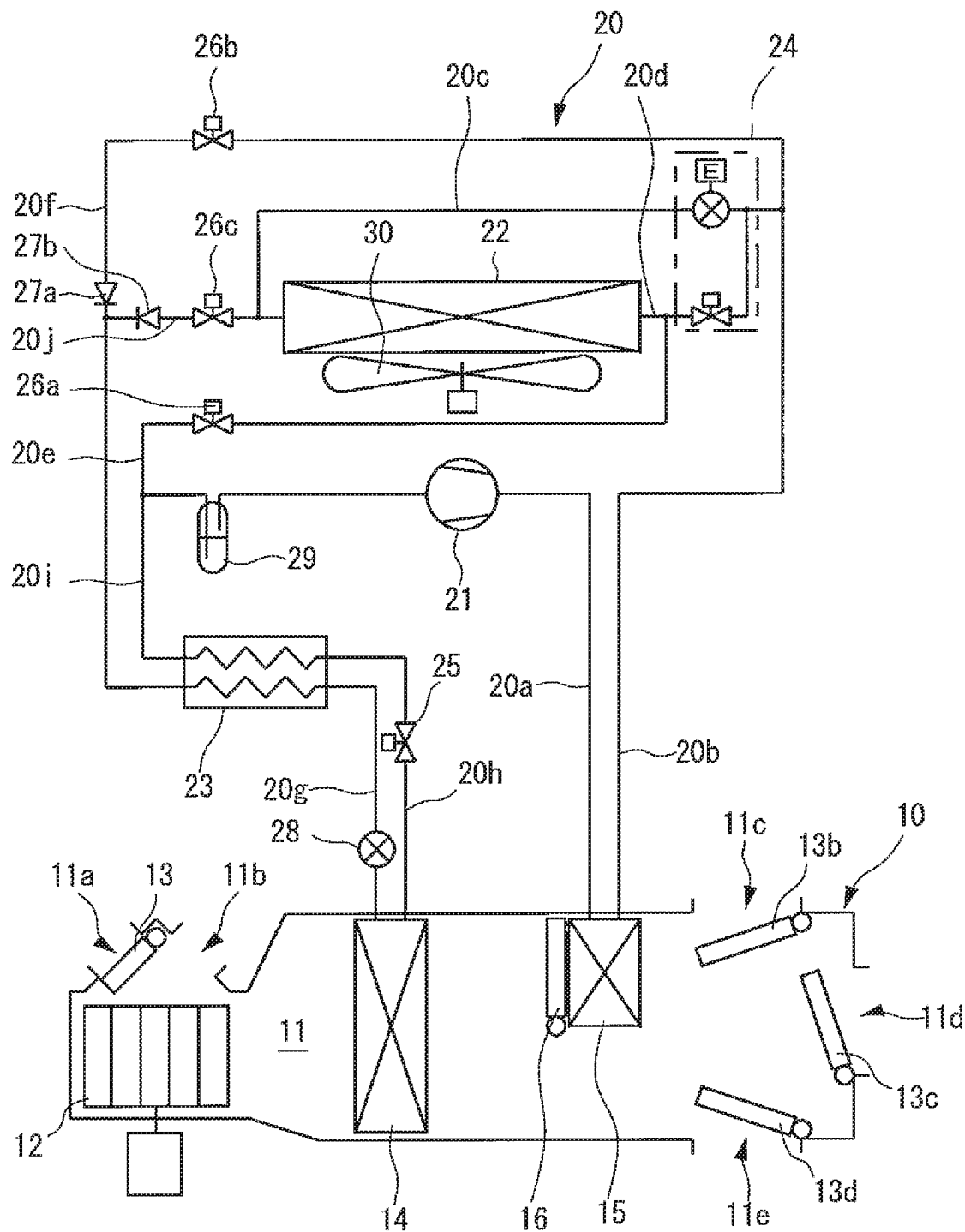
FIG. 35 is a schematic view showing the vehicle air conditioning apparatus according to Embodiment 7 of the present invention.

As shown in FIG. 35, the vehicle air conditioning apparatus according to the present invention includes the air conditioning unit 10 provided in the vehicle interior, and the refrigerant circuit 20 formed across the vehicle interior and the outdoor.

The air conditioning unit 10 includes the air flow passage 11 that allows the air to be supplied to the vehicle interior to pass through. The outdoor air inlet 11a and the indoor air inlet 11b are provided in the first end side of the air flow passage 11. The outdoor air inlet 11a is configured to allow the outdoor air to flow into the air flow passage 11, and the indoor air inlet 11b is configured to allow the indoor air to flow into the air flow passage 11. Meanwhile, the foot outlet 11c, the vent outlet 11d and the defroster outlet 11e are provided in the second end side of the air flow passage 11. The foot outlet 11c is configured to allow the air flowing through the air flow passage 11 to blow to the feet of the passengers in the vehicle. The vent outlet 11d is configured to allow the air flowing through the air flow passage 11 to blow to the upper bodies of the passengers in the vehicle. The defroster outlet 11e is configured to allow the air flowing through the air flow passage 11 to blow to the interior surface of the front window.

The indoor fan 12 such as a sirocco fan configured to allow the air to flow through the air flow passage 11 from end to end is provided in the first end side of the air flow passage 11. This indoor fan 12 is driven by the electric motor 12a.

Also, in the first end side of the air flow passage 11, an inlet switching damper 13 configured to open one of the outdoor air inlet 11a and the indoor air inlet 11b and to close the other. This inlet switching damper 13 is driven by the electric motor 13a. When the inlet switching damper 13 closes the indoor air inlet 11b and opens the outdoor air inlet 11a, the mode is switched to an outdoor air supply mode in which the air flows from the outdoor air inlet 11a into the air flow passage 11. Meanwhile, when the inlet switching damper 13 closes the outdoor air inlet 11a and opens the indoor air inlet 11b, the mode is switched to an indoor air circulation mode in which the air flows from the indoor air inlet 11b into the air flow passage 11. Moreover, when the inlet switching damper 13 is placed between the outdoor air inlet 11a and the indoor air inlet 11b and the outdoor air inlet 11a and the indoor air inlet 11b open, the mode is switched to a two-way mode in which the air flows from both the outdoor air inlet 11a and the indoor air inlet 11b into the air flow passage 11 according to the opening ratio of the outdoor air inlet 11a and the indoor air inlet 11b.

Outlet switching dampers 13b, 13c and 13d configured to open and close the foot outlet 11c, the vent outlet 11d and the defroster outlet 11e are provided in the foot outlet 11c, the vent outlet 11d and the defroster outlet 11e, respectively, in the second side of the air flow passage 11. These outlet switching dampers 13b, 13c and 13d are configured to move together by a linkage (not shown) and are opened and closed by the electric motor 13e. Here, when the outlet switching dampers 13b, 13c and 13d open the foot outlet 1c, close the vent outlet 11d and slightly open the defroster outlet 11e, most of the air flowing through the air flow passage 11 blows out of the foot outlet 11c and the remaining air blows out of the defroster outlet 11e. This mode is referred to as "foot mode." Meanwhile, when the outlet switching dampers 13b, 13c and 13d close the foot outlet 11c and the defroster outlet 11e, and open the vent outlet 11d, all the air flowing through the air flow passage 11 blows out of the vent outlet 11d. This mode is referred to as "vent mode." In addition, when the outlet switching dampers 13b, 13c and 13d open the foot outlet 11c and the vent outlet 11d, and close the defroster outlet 11e, the air flowing through the air flow passage 11 blows out of the foot outlet 11c and the vent outlet 11d. This mode is referred to as "bi-level mode." Moreover, when the outlet switching dampers 13b, 13c and 13d close the foot outlet 11c and the vent outlet 11d, and open the defroster outlet 11e, the air flowing through the air flow passage 11 blows out of the defroster outlet 11e. This mode is referred to as "defroster mode." Furthermore, when the outlet switching dampers 13b, 13c and 13d close the vent outlet 11d and open the foot outlet 11c and the defroster outlet 11e, the air flowing through the air flow passage 11 blows out of the foot outlet 11c and the defroster outlet 11e. This mode is referred to as "defroster-foot mode." Here, in the bi-level mode, the air flow passage 11, the foot outlet 11c, the vent outlet 11d, and a heat exchanger and a radiator which will be described later, are arranged and configured such that the temperature of the air blowing out of the foot outlet 11c is higher than the temperature of the air blowing out of the vent outlet 11d.

A heat exchanger 14 is provided in the air flow passage 11 in the downstream of the air flow from the indoor fan 12. The heat exchanger 14 is configured to cool and dehumidify the air flowing through the air flow passage 11. In addition, a radiator 15 is provided in the air flow passage 11 in the downstream of the air flow from the heat exchanger 14. The radiator 15 is configured to heat the air flowing through the air flow passage 11. The heat exchanger 14 and the radiator 15 are heat exchangers, each of which is constituted by fins and tubes and which is configured to perform a heat exchange between the refrigerant flowing through the refrigerant circuit 20 and the air flowing through the air flow passage 11.

An air mix damper 16 is provided between the heat exchanger 14 and the radiator 15 in the air flow passage 11 and is configured to control the percentage of the air to be heated, which is flowing through the air flow passage 11. The air mix damper 16 is driven by the electric motor 16a. When the air mix damper 16 is disposed in the air flow passage 11 in the upstream of the radiator 15, the percentage of the air subjected to a heat exchange in the radiator 15 is reduced. Meanwhile, when the air mix damper 16 is moved to a position other than the radiator 15 in the air flow passage 11, the percentage of the air subjected to a heat exchange is increased. In the air flow passage 11, when the air mix damper 16 closes the upstream side of the radiator 15 and opens the portion other than the radiator 15, the opening is 0%, and, on the other hand, when the air mix damper 16 opens the upstream side of the radiator 15 and closes the portion other than the radiator 15, the opening is 100%.

The refrigerant circuit 20 includes: the heat exchanger 14; the radiator 15; a compressor 21 configured to compress a refrigerant; an outdoor heat exchanger 22 configured to perform a heat exchange between the refrigerant and the outdoor air;

an indoor heat exchanger 23 configured to perform a heat exchange between the refrigerant flowing out of the heat exchanger 14 and the refrigerant flowing out of the radiator 15 and the outdoor heat exchanger 22, or at least of the radiator 15; a first control valve 24 including an expansion part configured to decompress the refrigerant flowing into the outdoor heat exchanger 22 during the heating operation, and a condensing pressure regulating part configured to regulate the condensing pressure of the refrigerant in the radiator during the cooling and dehumidifying operation; a second control valve 25 having a function as an evaporating pressure regulating part to regulate the evaporating pressure of the refrigerant in the heat exchanger 14; first to third solenoid valves 26a, 26b and 26c; first and second check valves 27a and 27b, an expansion valve 28; and an accumulator 29 configured to separate refrigerant liquid from refrigerant vapor to prevent the refrigerant liquid from being sucked into the compressor 21. These components are connected to each other by a copper pipe or an aluminum pipe.

To be more specific, input side of the radiator 15 into which the refrigerant flows is connected to the delivery side of the compressor 21 from which the refrigerant is discharged to form the refrigerant flow passage 20a. In addition, the input side of the first control valve 24 into which the refrigerant flows is connected to the output side of the radiator 15 from which the refrigerant is discharged, thereby to form the refrigerant flow passage 20b. The first end side of the outdoor heat exchanger 22 is connected to the output side of the expansion part of first control valve 24 from which the refrigerant is discharged, thereby to form the refrigerant flow passage 20c. Meanwhile, the second end side of the outdoor heat exchanger 22 is connected to the output side of the condensing pressure regulating part of the first control valve 24 from which the refrigerant discharged, thereby to form the refrigerant flow passage 20d. The suction side of the compressor 21 into which the refrigerant is sucked is connected to the second end side of the outdoor heat exchanger 22, in parallel with the refrigerant flow passage 20d, thereby to form the refrigerant flow passage 20e. The first solenoid valve 26a and the accumulator 29 are provided in the refrigerant flow passage 20e in the order from the upstream of the flow of the refrigerant. The input side of the indoor heat exchanger 23 into which a high-pressure refrigerant flows is connected to the refrigerant flow passage 20b, thereby to form the refrigerant flow passage 20f. In the refrigerant flow passage 20f, the second solenoid valve 26b and the first check valve 27a are provided in the order from the upstream of the refrigerant flow direction. The input side of the heat exchanger 14 into which the refrigerant flows is connected to the output side of the indoor heat exchanger 23 from which the high-pressure refrigerant is discharged, thereby to form the refrigerant flow passage 20g. The expansion valve 28 is provided in the refrigerant flow passage 20g. The input side of the indoor heat exchanger 23 into which a low-pressure refrigerant flows is connected to the output side of the heat exchanger 14 from which the refrigerant is discharged, thereby to form the refrigerant flow passage 20h. The second control valve 25 is provided in the refrigerant flow passage 20h. The part of the refrigerant flow passage 20e between the first solenoid valve 26a and the accumulator 29 is connected to the output side of the indoor heat exchanger 23 from which the low-pressure refrigerant is discharged, thereby to form the refrigerant flow passage 20i. Part of the refrigerant flow passage 20f located downstream from the first check valve 27a in the refrigerant flow direction is connected to the first end side of the outdoor heat exchanger 22, in parallel with the refrigerant flow passage 20c, thereby to form the refrigerant flow passage 20j. The third solenoid valve 26c and the second check valve 27b are provided in the refrigerant flow passage 20j in the order from the upstream of the refrigerant flow direction.

The compressor 21 and the outdoor heat exchanger 22 are disposed outside the vehicle interior. The compressor 21 is driven by the electric motor 21a. The outdoor heat exchanger 22 includes an outdoor fan 30 configured to perform a heat exchange between the outdoor air and the refrigerant while the vehicle stops. The outdoor fan 30 is driven by the electric motor 30a.

As shown in FIG. 36, the first control valve 24 includes: a valve body 24a configured to allow the refrigerant having passed through the refrigerant flow passage 20b to flow through, and an opening regulating mechanism 24b configured to switch the refrigerant flow channel of the valve body 24a between the refrigerant flow channel to the expansion part and the refrigerant flow channel to the condensing pressure regulating part, and to regulate the openings of the refrigerant flow channels.

In the valve body 24a, a refrigerant inlet passage 24c that allows the refrigerant having passed through the refrigerant flow passage 20b to flow into, a refrigerant flow channel 24d to the expansion part and a refrigerant flow channel 24e to the condensing pressure regulating part are formed.

The opening regulating mechanism 24b includes: a solenoid 24h to linearly reciprocate a plunger 24g with respect to a coil 24f; a first valve element 24j provided in the refrigerant inlet passage 24c and configured to be able to open and close a communicating hole 24i that allows communication between the refrigerant inlet passage 24c and the refrigerant flow channel 24d; and a second valve element 24l provided in the refrigerant inlet passage 24c and configured to be able to open and close a communicating hole 24k that allows communication between the refrigerant inlet passage 24c and the refrigerant flow channel 24e.

The solenoid 24h can regulate the magnitude of the current flowing through the coil 24f to adjust the position of the plunger 24g with respect to the coil 24f. An abutment portion 24m configured to abut on one end face of the second valve element 24l is provided on the front end of the plunger 24g. Meanwhile, in the front end side of the abutment portion 24m, a valve element holder member 24n is provided to receive the first valve element 24j, and a second valve element 24l is provided on the outer surface of the valve element holder member 24n.

The first valve element 24j is a needle-like member, which has a circular cross-section and tapers to one end. The other end side is inserted into the valve element holder member 24n. A first coil spring 24o is provided on the inner surface of the valve element holder member 24n. One end of the first valve element 24j is biased to close the communicating hole 24i.

A through hole 24p is provided in the second valve element 24l in the middle portion in the diameter direction. The inner diameter of the through hole 24p is approximately the same as the outer diameter of the valve element holder member 24n, and the valve element holder member 24n is inserted into the through hole 24p. The second valve element 24l is biased by a second coil spring 24q provided in the refrigerant inlet passage 24c to close the communicating hole 24k.

FIG. 36A shows a state in which the refrigerant flow channel 24d to the expansion part is open while the refrigerant flow channel 24e to the condensing pressure regulating part is closed. FIG. 36B shows a state in which the refrigerant flow channel 24d to the expansion part is closed, and the refrigerant flow channel 24e to the condensing pressure regulating part is also closed. FIG. 36C shows a state in which the refrigerant flow channel 24d to the expansion part is closed while the refrigerant flow channel 24e to the condensing pressure regulating part is open.

Moreover, the vehicle air conditioning apparatus also includes a controller 40 that controls the temperature and the humidity of the vehicle interior to be the preset temperature and humidity.

The controller 40 includes a CPU, a ROM and a RAM. In the controller, upon receiving an input signal from a device connected to the input side, the CPU reads the program stored in the ROM according to the input signal, stores the state detected by the input signal on the RAM and transmits an output signal to a device connected to the output side.

Figure 37:
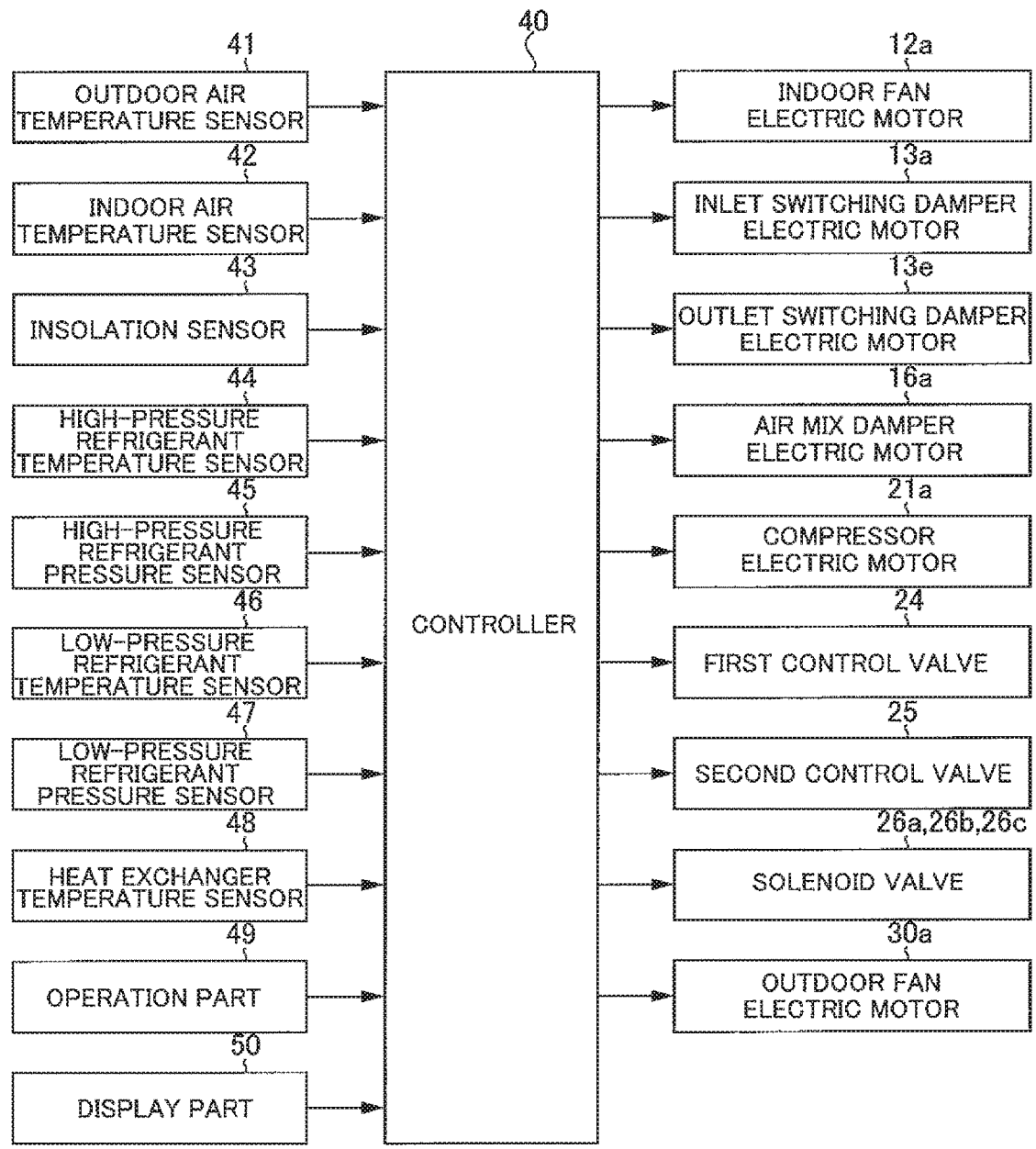
FIG. 37 is a block diagram showing a control system.

As shown in FIG. 37, an electric motor 12a for driving the indoor fan 12; an electric motor 13a for driving the inlet switching damper 13; an electric motor 13e for driving the outlet switching dampers 13b, 13c and 13d; an electric motor 16a for driving the air mix damper 16; an electric motor 21a for driving the compressor 21; the first control valve 24; the second control valve 25; the first to third solenoid valves 26a, 26b and 26c and an electric motor 30a for driving the outdoor fan 30 are connected to the output side of the controller 40.

As shown in FIG. 37, an outdoor air temperature sensor 41 configured to detect temperature Tam outside the vehicle interior; an indoor air temperature sensor 42 configured to detect indoor air temperature Tr; an insolation sensor 43 such as a photo sensor configured to detect amount of insolation Ts; a high-pressure refrigerant temperature sensor 44 configured to detect temperature Thp of a high-pressure refrigerant flowing through the refrigerant flow passage 20b; a high-pressure refrigerant pressure sensor 45 configured to detect pressure Php of the high-pressure refrigerant flowing through the refrigerant flow passage 20b; a low-pressure refrigerant temperature sensor 46 configured to detect temperature Tlp of the low-pressure refrigerant that flows through the refrigerant flow passage 20e and is sucked into the compressor 21; a low-pressure refrigerant pressure sensor 47 configured to detect pressure Plp of the refrigerant that flows through the refrigerant flow passage 20e and is sucked into the compressor 21; a heat exchanger temperature sensor 48 configured to detect evaporating temperature Te of the refrigerant in the heat exchanger 14; an operation part 49 configured to set modes regarding to target preset temperature Tset and the switching of the operation; and a display part 50 configured to display the indoor air temperature Tr and operation states, are connected to the output side of the controller 40.

The vehicle air conditioning apparatus having the above-described configuration performs cooling operation, cooling and dehumidifying operation, heating operation, first heating and dehumidifying operation, and second heating and dehumidifying operation. Now, each operation will be explained.

Figure 38:
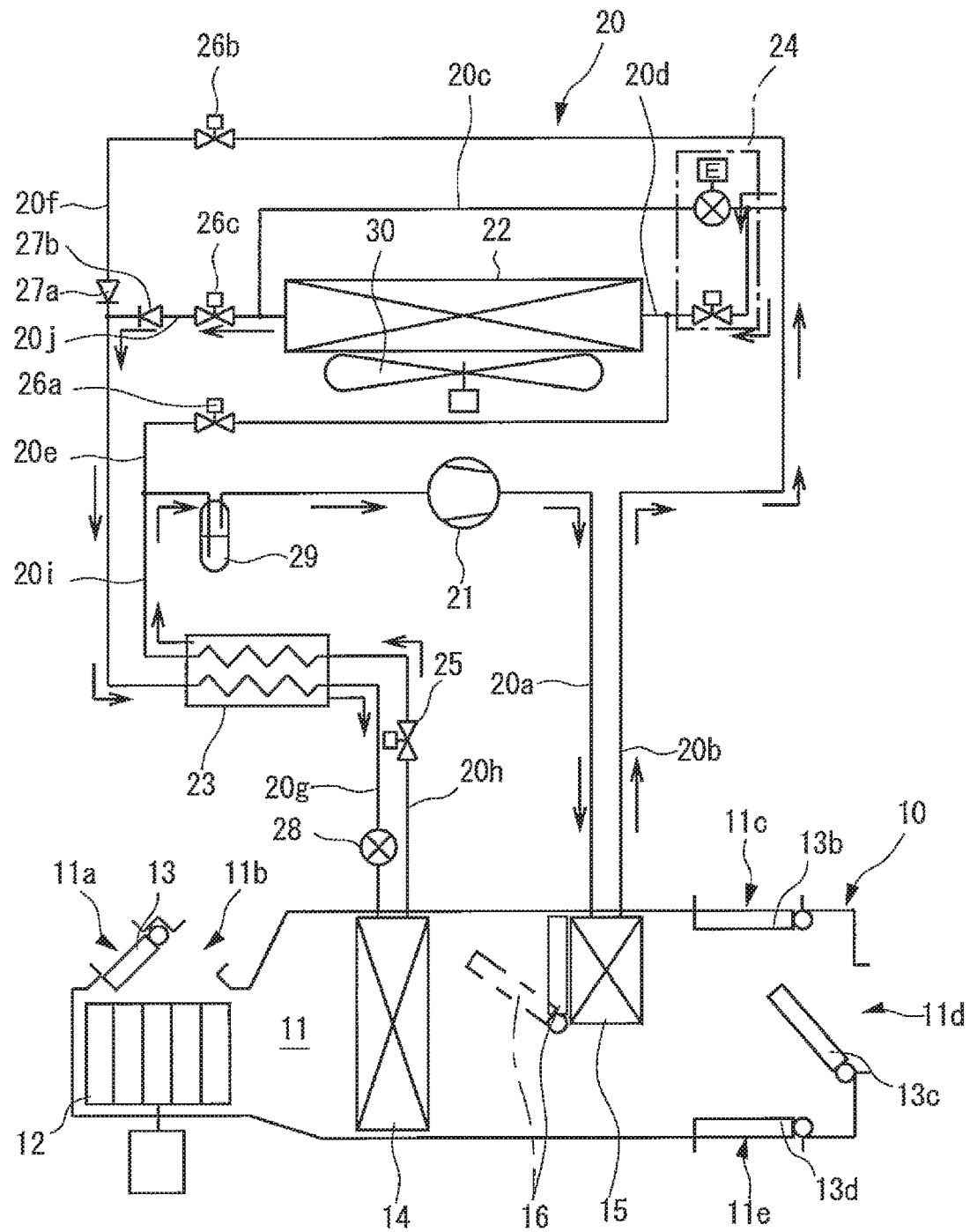
FIG. 38 is a schematic view showing the vehicle air conditioning apparatus performing a cooling operation and a cooling and dehumidifying operation.

During the cooling and dehumidifying operation, in the refrigerant circuit 20, the refrigerant flow channel to the expansion part is closed while the refrigerant flow channel to the condensing pressure regulating part is open in the first control valve 24; the third solenoid valve 26c is opened; the first and second solenoid valves 26a and 26b are closed; and compressor 21 is operated. Here, although the expansion part of the first control valve 24 closes the refrigerant flow channel, the area of the refrigerant flow channel to the expansion part is quite smaller than the refrigerant flow passage to the condensing pressure regulating part, and therefore most of the refrigerant flows through the refrigerant flow channel to the condensing pressure regulating part even if the refrigerant flow channel to the expansion part is opened. Accordingly, during the cooling operation and the cooling and dehumidifying operation, there is no need to close the refrigerant flow passage to the expansion part. By this means, as shown in FIG. 38, the refrigerant discharged from the compressor 21 flows through in this order: the refrigerant flow passage 20a; the radiator 15; the refrigerant flow passages 20b and 20d; the outdoor heat exchanger 22; the refrigerant flow passages 20j and 20f; the high-pressure side of the indoor heat exchanger 23; the refrigerant flow passage 20g; the heat exchanger 14, the refrigerant flow passage 20h; the low pressure side of the indoor heat exchanger 23; and the refrigerant flow passages 20i and 20e, and is sucked into the compressor 21. During the cooling operation, the refrigerant flowing through the refrigerant circuit 20 releases the heat in the outdoor heat exchanger 22 and absorbs the heat in the heat exchanger 14. During the cooling and dehumidifying operation, when the air mix damper 16 is opened as represented by the dashed-dotted line of FIG. 38, the refrigerant flowing through the refrigerant circuit 20 releases the heat also in the radiator 15.

In this case, in the air conditioning unit 10 during the cooling operation, the indoor fan 12 is operated to flow the air through the air flow passage 11, and the air is subjected to a heat exchange with the refrigerant in the heat exchanger 14 and cooled. The temperature of the cooled air becomes target air-blowing temperature TAO of the air to blow out of the outlets 11c, 11d and 11e to the vehicle interior in order to set the temperature of the vehicle interior to the target preset temperature Tset. The target air-blowing temperature TAO is calculated based on the preset temperature Tset, and environmental conditions including the outdoor air temperature Tam, the indoor air temperature Tr, and an amount of insolation Ts, which are detected by the outdoor air temperature sensor 41, the indoor air temperature sensor 42, and the insolation sensor 48, respectively.

Meanwhile, in the air conditioning unit 10 during the cooling and dehumidifying operation, the indoor fan 12 is operated to flow the air through the air flow passage 11, and the air is subjected to a heat exchange with the refrigerant which absorbs the heat in the heat exchanger 14, and therefore is cooled and dehumidified. The air having been dehumidified in the heat exchanger 14 is subjected to a heat exchange with the refrigerant which releases the heat in the radiator 15, and therefore heated. As a result, the air at the target air-blowing temperature TAO blows to the vehicle interior.

Figure 39:
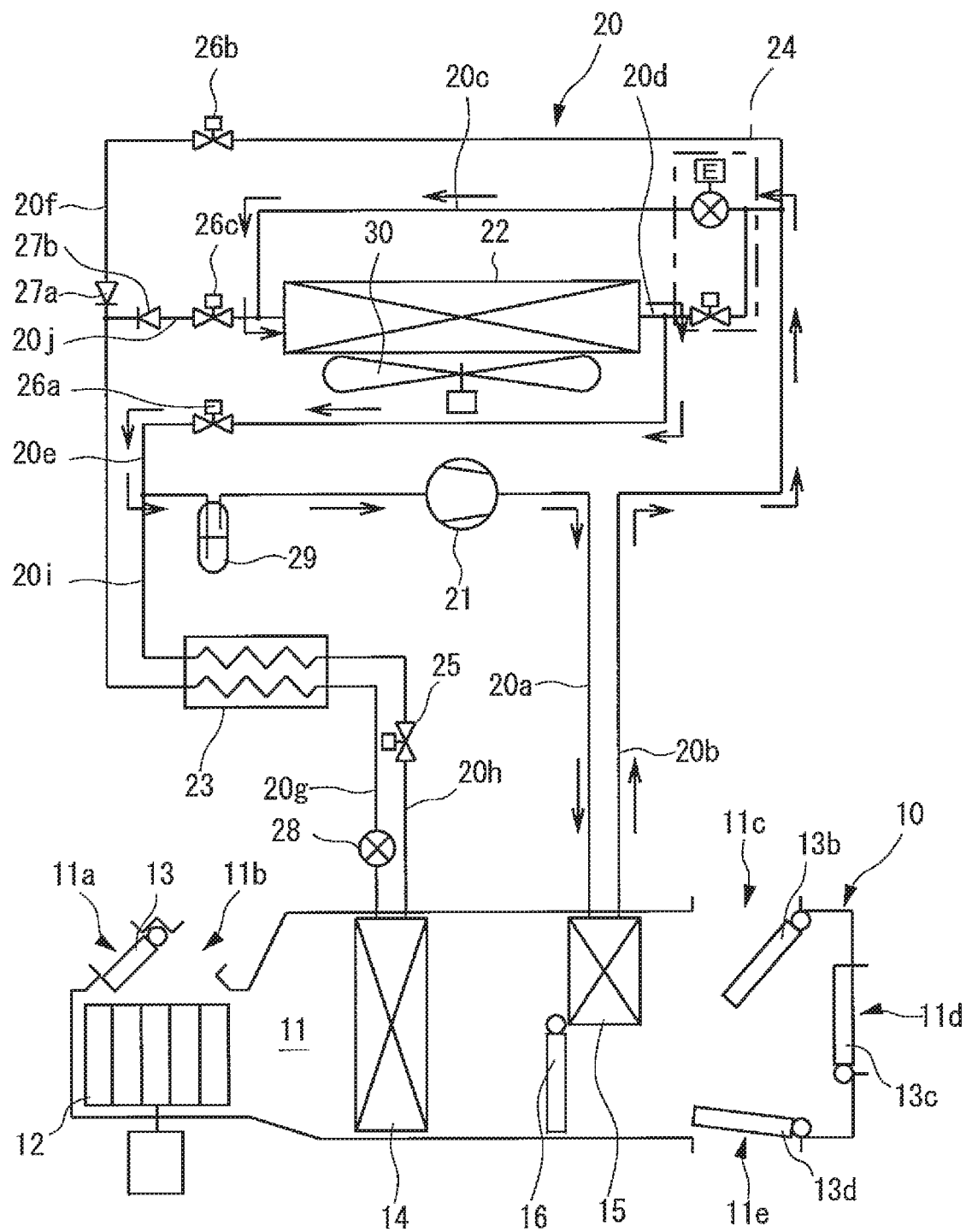
FIG. 39 is a schematic view showing the vehicle air conditioning apparatus performing a heating operation.

During the heating operation, in the refrigerant circuit 20, the refrigerant flow channel to the expansion part is open while the refrigerant flow channel to the condensing pressure regulating part is closed in the first control valve 24; the first solenoid valve 26a is opened; the second and third solenoid valves 26b and 26c are closed; and the compressor 21 is operated. By this means, as shown in FIG. 39, the refrigerant discharged from the compressor 21 flows through in this order: the refrigerant flow passage 20a; the radiator 15; the refrigerant flow passages 20b and 20c; the outdoor heat exchanger 22; and the refrigerant flow passage 22e, and is sucked into the compressor 21. The refrigerant flowing through the refrigerant circuit 20 releases the heat in the radiator 15 and absorbs the heat in the outdoor heat exchanger 22.

In this case, in the air conditioning unit 10, the indoor fan 12 is operated to flow the air through the air flow passage 11, and the flowing air is not subjected to a heat exchange with the refrigerant in the heat exchanger 14, but is subjected to a heat exchange with the refrigerant in the radiator 15 and therefore is heated. As a result, the air at the target air-blowing temperature TAO blows to the vehicle interior.

Figure 40:
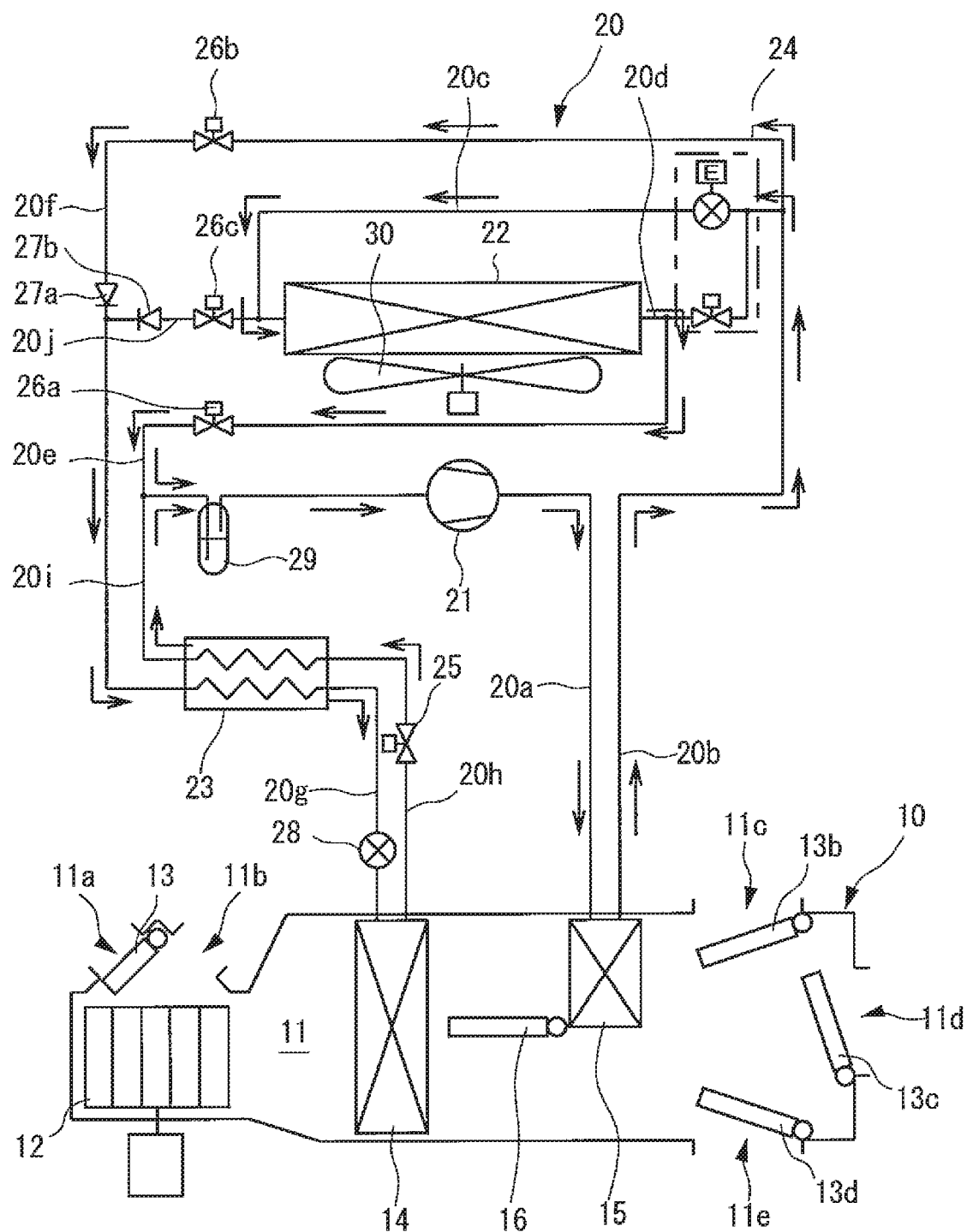
FIG. 40 is a schematic view showing the vehicle air conditioning apparatus performing a first heating and dehumidifying operation.

During the first heating and dehumidifying operation, in the refrigerant circuit 20, the refrigerant flow channel to the expansion part is open while the refrigerant flow channel to the condensing pressure regulating part is closed in the first control valve 24; the first and second solenoid valves 26a and 26b are opened; the third solenoid valve 26c is closed; and the compressor 21 is operated. By this means, as shown in FIG. 40, the refrigerant discharged from the compressor 21 flows through in this order: the refrigerant flow passage 20a; the radiator 15; and the refrigerant flow passage 20b. Part of the refrigerant having passed through the refrigerant flow passage 20b flows through in this order: the first control valve 24; the refrigerant flow passage 20c; the outdoor heat exchanger 22; and the refrigerant flow passage 20e, and is sucked into the compressor 21. Meanwhile, the remaining refrigerant having passed through the refrigerant flow passage 20b flows through in this order: the refrigerant flow passage 20f; the high-pressure side of the indoor heat exchanger 23; the refrigerant flow passage 20g; the heat exchanger 14; the refrigerant flow passage 20h; the low-pressure side of the indoor heat exchanger 23; and the refrigerant flow passage 20i, and is sucked into the compressor 21. The refrigerant flowing through the refrigerant circuit 20 releases the heat in the radiator 15 and absorbs the heat in the heat exchanger 14 and the outdoor heat exchanger 22.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified. Part of the air having been dehumidified in the heat exchanger 14 is subjected to a heat exchange with the refrigerant in the radiator 15 and heated. As a result, the air at the target air-blowing temperature TAO blows into the vehicle interior.

Figure 41:
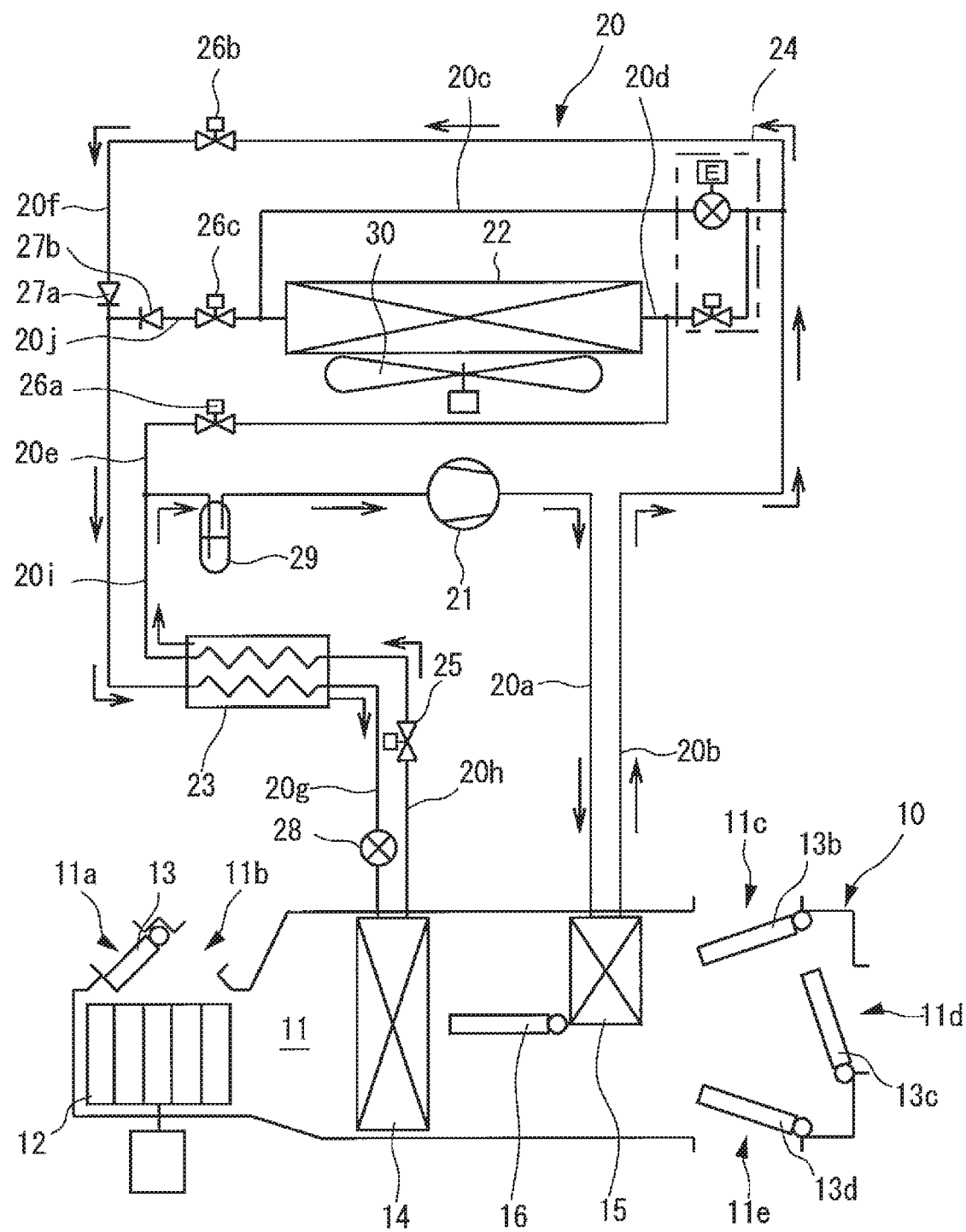
FIG. 41 is a schematic view showing the vehicle air conditioning apparatus performing a second heating and dehumidifying operation.
Figure 42:
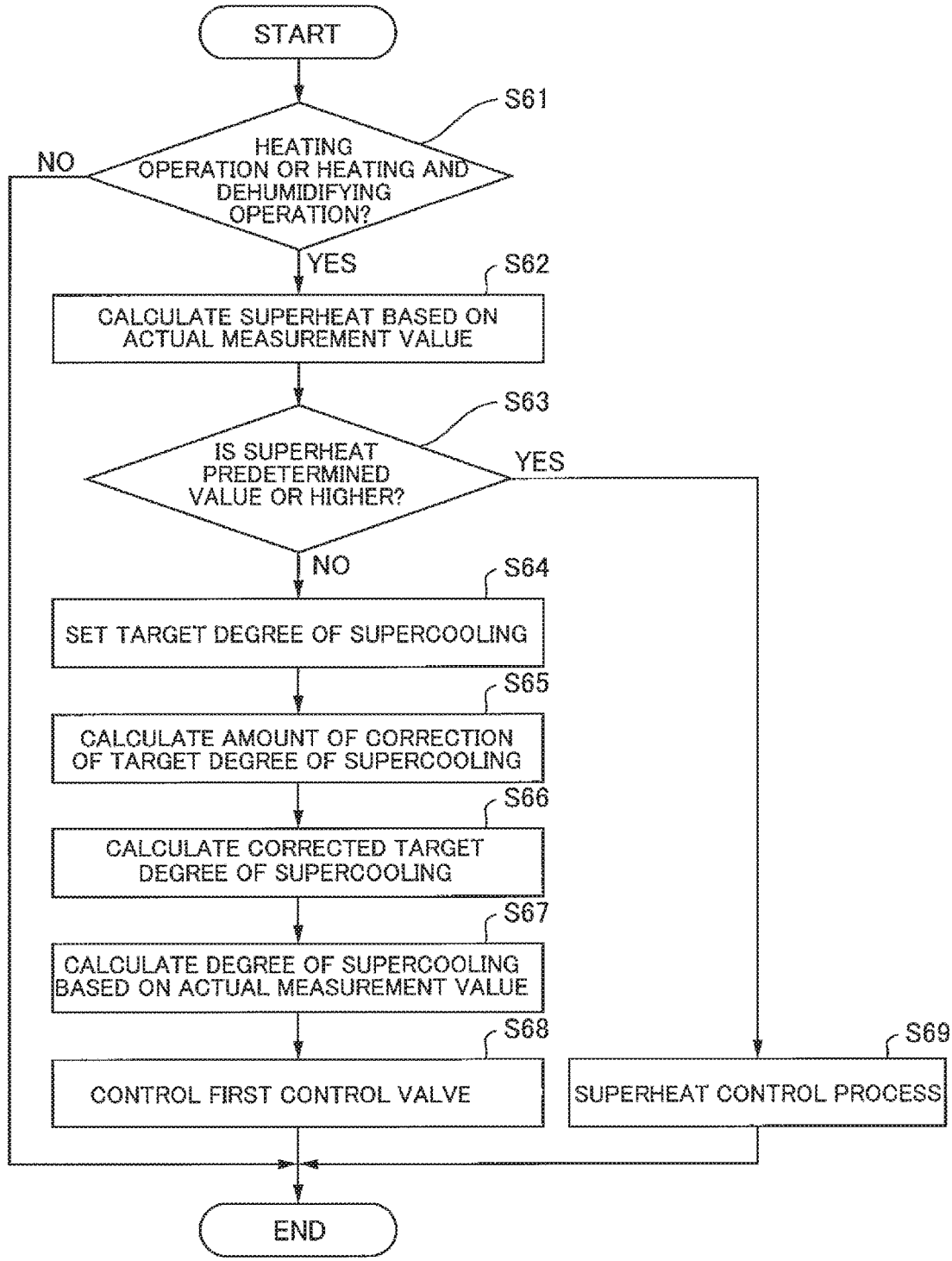
FIG. 42 is a flowchart showing an expansion part control process.
Figure 43:
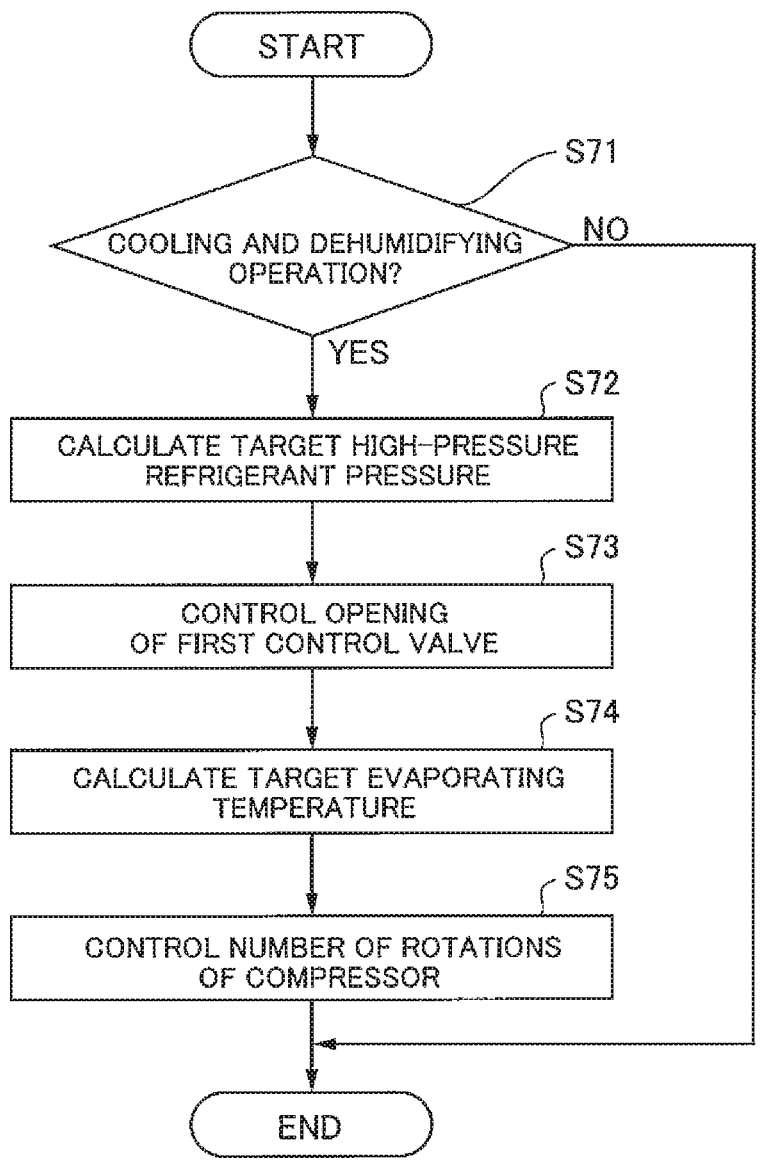
FIG. 43 is a flowchart showing a cooling and dehumidifying performance control process.
Figure 44:
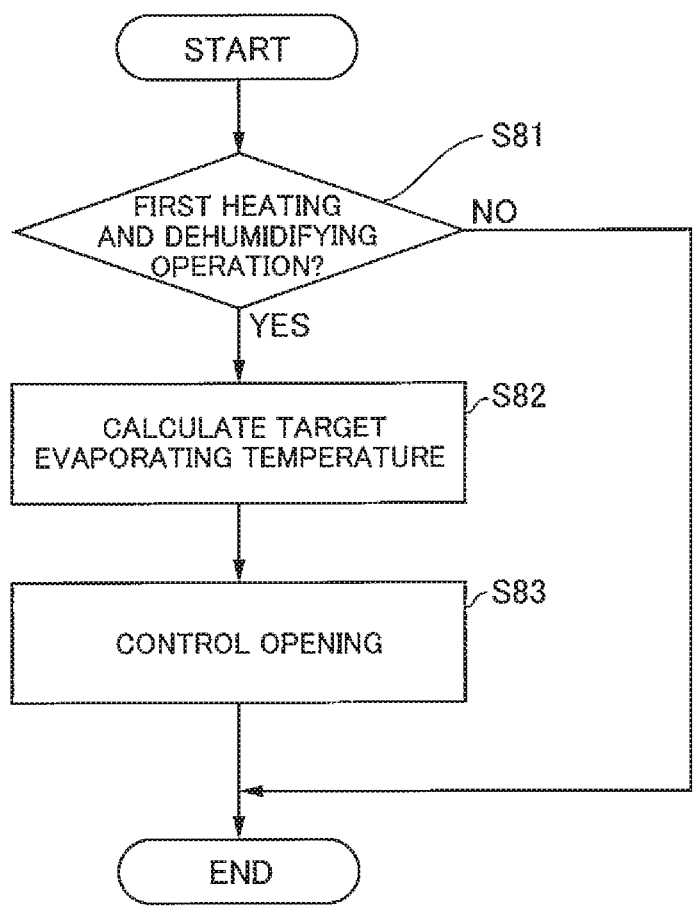
FIG. 44 is a flowchart showing an evaporating temperature control process.
Figure 45:
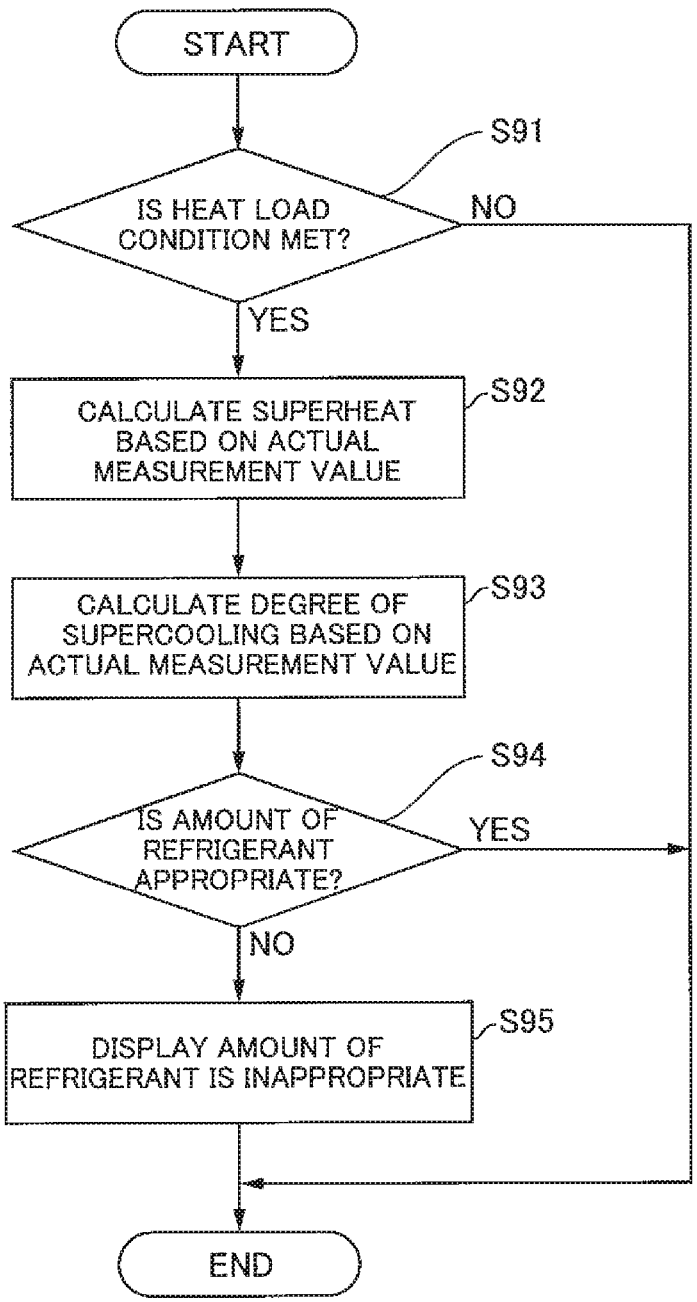
FIG. 45 is a refrigerant amount determination process.

During the second heating and dehumidifying operation, in the refrigerant circuit 20, both the refrigerant flow channel to the expansion part and the refrigerant flow channel to the condensing pressure regulating part are closed in the first control valve 24; the second solenoid valve 26b is opened; and the first and third solenoid valves 26a and 26c are closed, and the compressor 21 is operated. By this means, as shown in FIG. 41, the refrigerant discharged from the compressor 21 flows through in this order: the refrigerant flow passage 20a; the radiator 15; the refrigerant flow passages 20b and 20f; the high-pressure side of the indoor heat exchanger 23; the refrigerant flow passage 20g; the heat exchanger 14; the refrigerant flow passage 20h; the low-pressure side of the indoor heat exchanger 23; and the refrigerant flow passages 20i and 20e, and is sucked into the compressor 21. The refrigerant flowing through the refrigerant circuit 20 releases the heat in the radiator 15 and absorbs the heat in the heat exchanger 14.

The refrigerant flowing through the refrigerant circuit 20 releases the heat in the radiator 15 and absorbs the heat in the heat exchanger 14. Part of the air dehumidified in the heat exchanger 14 is subjected to a heat exchange with the refrigerant in the radiator 15, and therefore heated. As a result, the air at the target air-blowing temperature TAO blows to the vehicle interior.

While an automatic switch is turned on, the controller 40 performs an operation switching control process to switch the operation among the cooling operation, the cooling and dehumidifying operation, the heating operation, the first heating and dehumidifying operation, and the second heating and dehumidifying operation, based on environmental conditions including the outdoor air temperature Tam, the indoor air temperature Tr, the outdoor air humidity, the indoor air humidity Th, the amount of insolation Ts and so forth.

The controller 40 switches the mode of the outlets 11c, 11d and 11e by using the outlet switching dampers 13b, 13c and 13d, and controls the opening of the air mix damper 16 in order to set the temperature of the air blowing out of the outlets 11c, 11d, and 11e to the target air-blowing temperature TAO.

The controller 40 switches the mode among the foot mode, the vent mode and the bi-level mode depending on the target air-blowing temperature TAO during each operation switched by the operation switching control process. To be more specific, when the target air-blowing temperature TAO is high, for example, 40 degrees Celsius, the controller 40 sets the foot mode. Meanwhile, when the target air-blowing temperature TAO is low, for example, lower than 25 degrees Celsius, the controller sets the vent mode. Moreover, when the target air-blowing temperature TAO is the temperature between the temperature for the foot mode and the temperature for the vent mode, the controller 40 sets the bi-level mode.

Moreover, during the heating operation and the first heating and dehumidifying operation, the controller 40 performs an expansion part control process to control the opening of the expansion part of the first control valve 24 based on the operation state. Now, the operation of the controller 40 in this process will be explained with reference to the flowchart shown in FIG. 42.

(Step S61)

In step S61, the CPU determines whether the operation is the heating operation or the heating and dehumidifying operation. When determining that the operation is one of the heating operation and the heating and dehumidifying operation, the CPU moves the step to step S62. On the other hand, when determining that the operation is neither the heating operation nor the heating and dehumidifying operation, the CPU ends the expansion part control process.

(Step S62)

In the step S62, the CPU calculates superheat SH of the refrigerant based on the temperature Tlp detected by the low-pressure refrigerant temperature sensor 46 and the pressure Plp detected by the low-pressure refrigerant pressure sensor 47.

(Step S63)

In step S63, the CPU determines whether or not the superheat SH calculated in the step S62 is a predetermined value or higher. When determining that the superheat SH is the predetermined value or higher, the CPU moves the step to step S69. On the other hand, when determining that the superheat SH is not the predetermined value or higher, the CPU moves the step to step S64.

(Step S64)

In step S64, the CPU sets target degree of supercooling SCt based on the target air-blowing temperature TAO. For example, when the target air-blowing temperature TAO is a predetermined value (e.g. 60 degrees Celsius) or higher, the CPU sets first target degree of supercooling SCt1 (e.g. 15 degrees Celsius). On the other hand, when the target air-blowing temperature TAO is lower than the predetermined value, the CPU sets second target degree of supercooling SCt2 (e.g. 12 degrees Celsius).

(Step S65)

In step S65, for the target degree of supercooling SCt set in the step S64, the CPU calculates amount of correction H1 based on amount of air Qa supplied from the indoor fan 12 and amount of correction H2 based on amount of refrigerant Qr flowing through the refrigerant circuit 20. To be more specific, when the amount of air Qa supplied from the indoor fan 12 is a predetermined value or higher, the amount of correction H1 is zero. On the other hand, when the amount of air Qa is lower than the predetermined value, the amount of correction H1 (e.g. $-10 \leq H1 \leq 0$) is set to decrease the degree of supercooling SC according to the amount of air Qa. When the amount of refrigerant Qr flowing through the high-pressure side of the refrigerant circuit 20 is a predetermined value or higher, the amount of correction H2 (e.g. $0 \leq H2 \leq 5$) is set to increase the degree of supercooling according to the amount of refrigerant Qr. On the other hand, when the amount of refrigerant Qr is lower than the predetermined value, the amount of correction H2 (e.g. $-5 \leq H2 \leq 0$) is set to decrease the degree of supercooling SC according to a decrease in the amount of refrigerant Qr. The amount of refrigerant Qr flowing through the high-pressure side of the refrigerant circuit 20 increases as the pressure of the refrigerant in the high-pressure side of the refrigerant circuit 20 increases, and decreases as the pressure of the refrigerant decreases. Therefore, the amount of refrigerant Qr flowing through the high-pressure side of the refrigerant circuit 20 is calculated based on the pressure Php detected by the high-pressure refrigerant pressure sensor 45.

(Step S66)

In step S66, the CPU calculates corrected target degree of supercooling SCtc by adding the amount of correction H1 and the amount of correction H2 to the target degree of supercooling SCt (SCtc=SCt−(H1+H2)).

(Step S67)

In step S67, the CPU calculates the degree of supercooling SC of the refrigerant based on the temperature Thp detected by the high-pressure refrigerant temperature sensor 44 and the pressure Php detected by the high-pressure refrigerant pressure sensor 45.

(Step S68)

In step S68, the CPU controls the opening of the first control valve 24 such that the degree of supercooling SC is the corrected target degree of supercooling SCtc, and ends the expansion part control process.

(Step S69)

When determining that the superheat SH is the predetermined value or higher in the step S63, the CPU performs a superheat control process to control the opening of the expansion part of the first control valve 24 to set the superheat SH of the low-pressure refrigerant to target superheat SHt in step S69, and ends the expansion part control process.

During the cooling and dehumidifying operation, the controller 40 performs a cooling and dehumidifying performance control process to control the heat absorbing performance of the heat exchanger 14 and the heat radiating performance of the radiator 15. Now, the operation of the controller 40 for this process will be explained with reference to the flowchart shown in FIG. 43.

(Step S71)

In step S71, the CPU determines whether or not the operation is the cooling and dehumidifying operation. When determining that the operation is the cooling and dehumidifying operation, the CPU moves the step to step S72. On the other hand, when determining that the operation is not the cooling and dehumidifying operation, the CPU ends the cooling and dehumidifying performance control process.

(Step S72)

In step S72, the CPU calculates target pressure Phpt of the high-pressure refrigerant based on the target air-blowing temperature TAO.

(Step S73)

In step S73, the CPU controls the opening of the condensing pressure regulating part of the first control valve 24 based on the target pressure Phpt of the high-pressure refrigerant and the pressure Php detected by the high-pressure refrigerant pressure sensor 45. To be more specific, the opening of the condensing pressure regulating part of the first control valve 24 is switched between two values, a large one and a small one, excluding the completely closed state. In this case, when the opening is switched from a small one to a large one, the pressure Php of the high-pressure refrigerant decreases. On the other hand, the opening is changed from a large one to a small one, the pressure Php of the high-pressure refrigerant increases.

(Step S74)

In step S74, the CPU calculates target evaporating temperature Tet of the refrigerant in the heat exchanger 14 based on the target air-blowing temperature TAO.

(Step S75)

In step S75, the CPU controls the number of rotations of the electric motor 21a of the compressor 21 such that the evaporating temperature Te of the refrigerant in the heat exchanger 14 is the target evaporating temperature Tet, based on the temperature of Te detected by the heat exchanger temperature sensor 48, and ends the cooling and dehumidifying performance control process.

During the first heating and dehumidifying operation, the controller 40 performs an evaporating temperature control process according to the operation state. Now, the operation of the controller 40 for this process will be explained with reference to the flowchart shown in FIG. 44.

(Step S81)

In step S81, the CPU determines whether or not the operation is the first heating and dehumidifying operation. When determining that the operation is the first heating and dehumidifying operation, the CPU moves the step to step S82. On the other hand, when determining that the operation is not the first heating and dehumidifying operation, the CPU ends the evaporating temperature control process.

(Step S82)

In step S82, the CPU calculates the target evaporating temperature Tet of the refrigerant in the heat exchanger 14 based on the target air-blowing temperature TAO.

(Step S83)

In step S83, the CPU controls the opening of the second control valve 25 based on the target evaporating temperature Tet and the temperature Te detected by the heat exchanger temperature sensor 48. To be more specific, when the temperature Te detected by the heat exchanger temperature sensor 48 is lower than the target evaporating temperature Tet, the opening of the second control valve 25 is decreased. On the other hand, when the temperature Te is higher than the target evaporating temperature Tet, the opening is increased.

During the heating operation and the first heating and dehumidifying operation, the controller 40 performs an refrigerant amount determination process to determine whether or not the amount of refrigerant enclosed in the refrigerant circuit 20 is appropriate. Now, the operation of the controller 40 for this process will be explained with reference to the flowchart shown in FIG. 45.

(Step S91)

In step S91, the CPU determines whether or not heat load conditions are met to determine the amount of refrigerant in the refrigerant circuit 20 based on the outdoor temperature Tam, the amount of air Qa supplied from the indoor fan 12, the number of rotations Nc of the electric motor 21*a* of the compressor 21 and so forth. When determining that it is possible to determine the amount of refrigerant, the CPU moves the step to step S92. On the other hand, when determining that it is not possible to determine the amount of refrigerant, the CPU ends the refrigerant amount determination process.

(Step S92)

In step S92, the CPU calculates the superheat SH of the refrigerant based on the temperature Tlp detected by the low-pressure refrigerant temperature sensor 46 and the pressure Plp detected by the low-pressure refrigerant pressure sensor 47.

(Step 93)

In step S93, the CPU calculates the degree of supercooling SC of the refrigerant based on the temperature Thp detected by the high-pressure refrigerant temperature sensor 44 and the pressure Php detected by the high-pressure refrigerant pressure sensor 45.

(Step S94)

In step S94, the CPU determines whether or not the amount of the refrigerant in the refrigerant circuit 20 is appropriate, based on the superheat SH of the refrigerant calculated in the step S92, the degree of supercooling SC of the refrigerant calculated in the step S93, and the opening of the expansion part of the first control valve 24. When determining that the amount of the refrigerant is appropriate, the CPU ends the refrigerant amount determination process. On the other hand, when determining that the amount of the refrigerant is not appropriate, the CPU moves the step to step S95. Whether or not the amount of the refrigerant in the refrigerant circuit 20 is appropriate is determined based on the result of the determination of whether or not the superheat SH of the refrigerant calculated in the step S92, the degree of supercooling SC of the refrigerant calculated in the step 93, and the opening of the expansion part of the first control valve 24 are within appropriate ranges, respectively.

(Step S95)

When determining that the amount of the refrigerant is not appropriate in the step S94, the CPU displays that the amount of the refrigerant in the refrigerant circuit 20 is insufficient or excessive on the display part 50 in the step S95, and ends the refrigerant amount determination process.

In this way, with the vehicle air conditioning apparatus according to the present embodiment, during the heating operation, the refrigerant flow channel to the condensing pressure regulating part of the first control valve 24 is closed to control the opening of the expansion part. Meanwhile, during the cooling and dehumidifying operation, the refrigerant flow channel to the expansion part is closed to control the opening of the condensing pressure regulating part. By this means, during the cooling and dehumidifying operation, it is possible to regulate the condensing pressure of the refrigerant in the radiator 15 to control the quantity of heat release in the radiator 15, and therefore to secure the amount of heating required to heat the air blowing to the vehicle interior.

In addition, during the cooling and dehumidifying operation, the opening of the condensing pressure regulating part of the first control valve 24 is controlled based on the target pressure Phpt and the pressure Php detected by the high-pressure refrigerant pressure sensor 45, and the number of rotations of the electric motor 21*a* of the compressor 21 is controlled such that the evaporating temperature Te of the refrigerant in the heat exchanger 14 is the target evaporating temperature Tet, based on the temperature Te detected by the heat exchanger temperature sensor 48. By this means, it is possible to ensure that the quantity of heat sucked in the heat exchanger 14 and the quantity of heat released in the radiator 15 are the target values, respectively, and therefore to maintain the temperature and the humidity of the vehicle interior in good conditions.

Moreover, the first control valve is constituted by the expansion part and the condensing pressure regulating part which are integrally formed. By this means, it is possible to reduce the number of parts, and therefore to reduce the production cost.

Moreover, the opening of the condensing pressure regulating part of the first control valve 24 is controlled by switching the opening between two different openings. By this means, the opening can be controlled by such a simple way in which the opening is switched between two different openings, and therefore it is possible to reduce the production cost.

Figure 46:
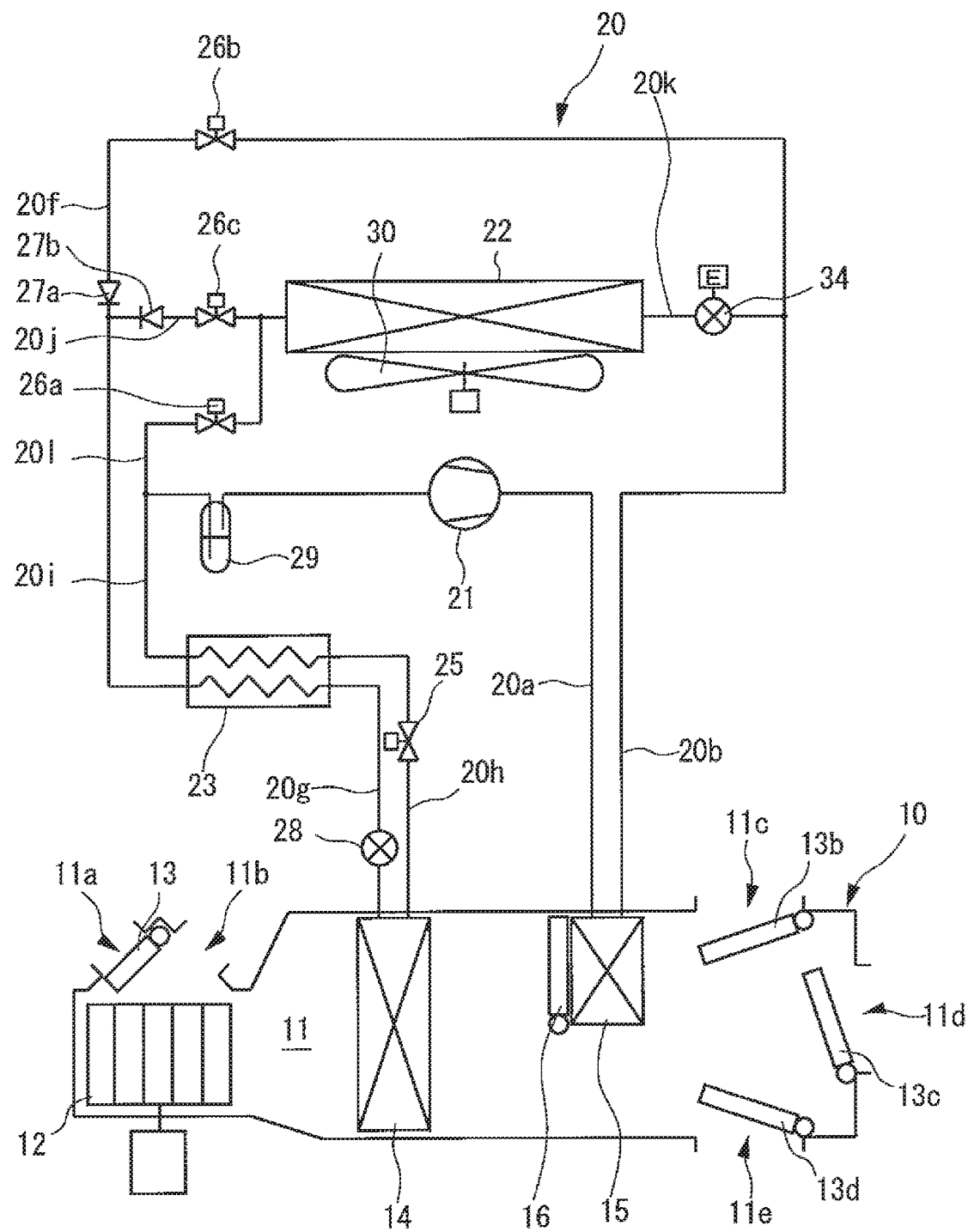
FIG. 46 is a schematic view showing the vehicle air conditioning apparatus according to Embodiment 8 of the present invention.
Figure 47:
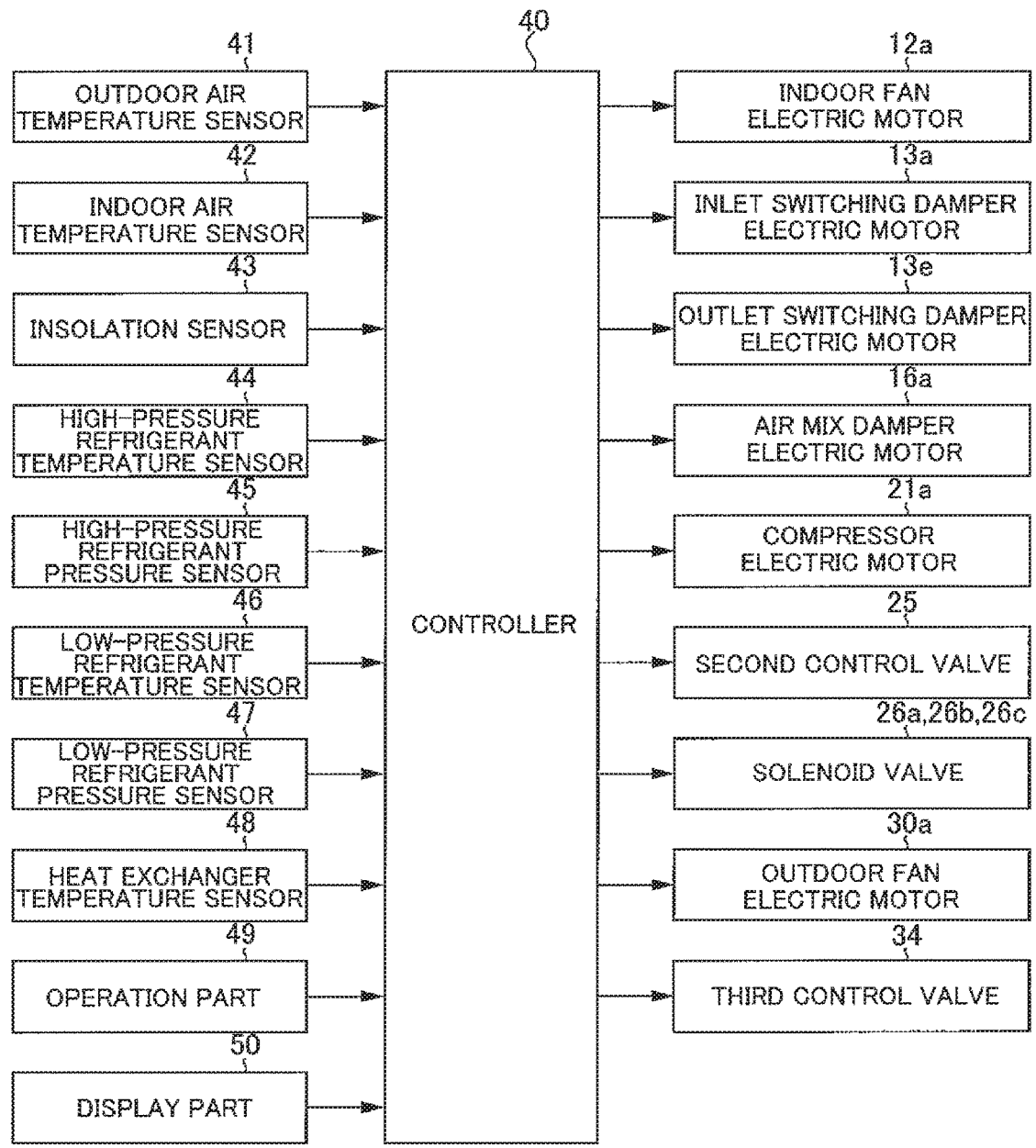
FIG. 47 is a block diagram showing a control system.
Figure 48:
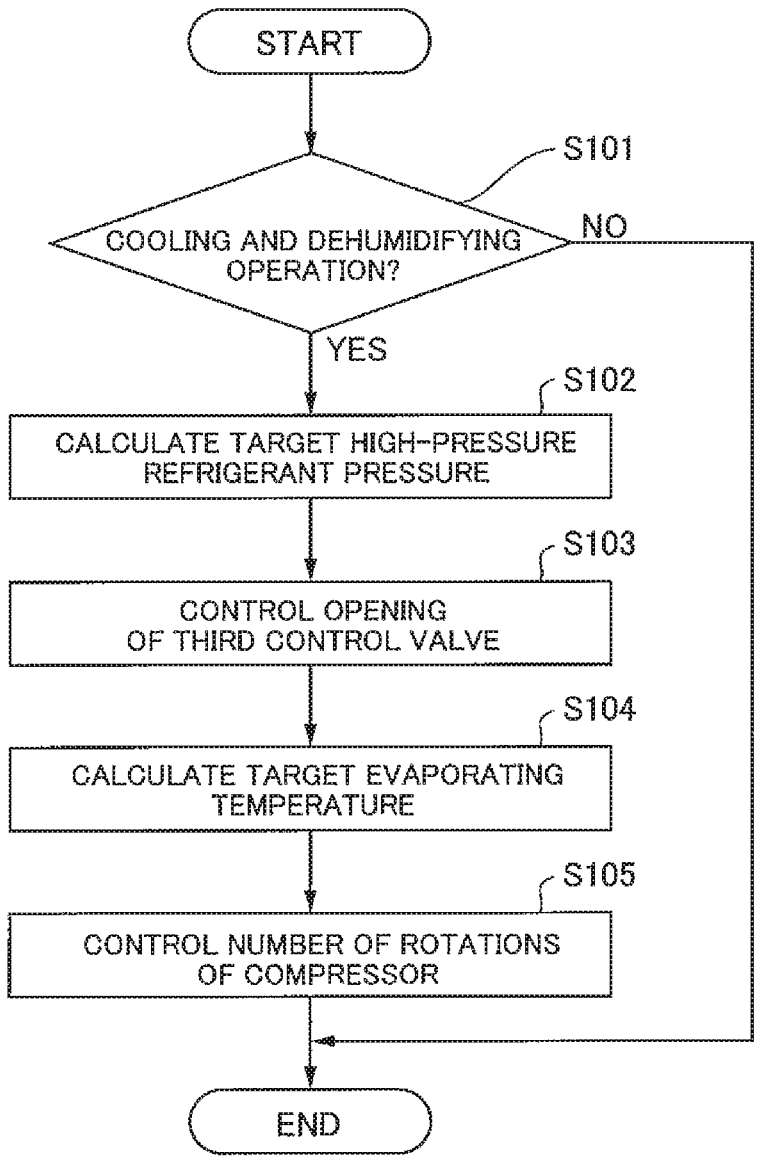
FIG. 48 is a flowchart showing a cooling and dehumidifying performance control process.

FIGS. 46 to 48 show Embodiment 8 of the present invention. Here, the same components are assigned the same reference numerals as in the above-described embodiments.

As shown in FIG. 46, the vehicle air conditioning apparatus according to the present embodiment includes a third control valve 34 as a flow regulating valve, instead of the first control valve 24 shown in Embodiment 7. The third control valve 34 is configured to be able to regulate the opening within a decompression range and a condensing pressure regulating range. The refrigerant flow passage 20*b* is connected to the input side of the third control valve 34 into which the refrigerant flows. The second end side of the outdoor heat exchanger 22 is connected to the output side of the third control valve 34 from which the refrigerant is discharged, and thereby to form the refrigerant flow passage 20*k*. Instead of the refrigerant flow passage 20*e* shown in Embodiment 6, the first end side of the outdoor heat exchanger 22 is the suction side of the compressor 21 into which the refrigerant is sucked, thereby to form the refrigerant flow passage 20*l*.

The opening of the third control valve 34 includes the decompression range and the condensing pressure regulating range. The decompression range allows the refrigerant to be decompressed during the heating operation. The condensing pressure regulating range allows the condensing pressure of the refrigerant in the radiator to be controlled during the cooling and dehumidifying operation. The opening area of the third control valve 34 in the condensing pressure regulating range is approximately the same as the opening area of the upstream refrigerant flow channel or the downstream refrigerant flow channel when the opening of the third control valve 34 is maximized. The opening of the third control valve 34 is set to one of two different openings, a large and a small, in the condensing pressure regulating range.

As shown in FIG. 47, the third control valve 34 is connected to the output side of the controller 40, instead of the first control valve 24 shown in Embodiment 7.

In the vehicle air conditioning apparatus having the above-described configuration, the opening of the third control valve 34 is set to the decompression range during the heating operation and the first heating and dehumidifying operation. Meanwhile, the opening is set to the condensing pressure regulating range during the cooling operation and the cooling and dehumidifying operation. Unlike Embodiment 1, the refrigerant flowing out of the radiator 15 flows through the outdoor heat exchanger 22 from the second end side to the first end side, and is sucked into the compressor 21 via the refrigerant flow passage 20*l* during the heating operation and the first heating and dehumidifying operation. Meanwhile, during the cooling and dehumidifying operation, the refrigerant flows from the second end side to the first end side of the outdoor heat exchanger 22 and is sucked into the compressor 21 via the heat exchanger 14 in the same way as in Embodiment 7.

During the cooling and dehumidifying operation, the controller 40 performs a cooling and dehumidifying performance control process to control the heat absorbing performance of the heat exchanger 14 and the heat radiating performance of the radiator 15. Now, the operation of the controller 48 for this process will be explained with reference to the flowchart shown in FIG. 8.

(Step S101)

In step S101, the CPU determines whether or not the operation is the cooling and dehumidifying operation. When determining that the operation is the cooling and dehumidifying operation, the CPU moves the step to step S102. On the other hand, when determining that the operation is not the cooling and dehumidifying operation, the CPU ends the cooling and dehumidifying performance control process.

(Step S102)

In step S102, the CPU calculates target pressure Phpt of the high-pressure refrigerant based on the target air-blowing temperature TAO.

(Step S103)

In step S103, the CPU controls the opening of third control valve 34 in the condensing pressure regulating range based on the target pressure Phot of the high-pressure refrigerant and the pressure Php detected by the high-pressure refrigerant pressure sensor 45. To be more specific, the opening of the third control valve 34 in the condensing pressure regulating range is switched between two values, a large one and a small one. In this case, when the opening is switched from a small one to a large one, the pressure Php of the high-pressure refrigerant decreases. On the other hand, the opening is switched from a large one to a small one, the pressure Php of the high-pressure refrigerant increases.

(Step S104)

In step S104, the CPU calculates target evaporating temperature Tet of the refrigerant in the heat exchanger 14 based on the target air-blowing temperature TAO.

(Step S105)

In step S105, the CPU controls the number of rotations of the electric motor 21*a* of the compressor 21 such that the evaporating temperature Te of the refrigerant in the heat exchanger 14 is the target evaporating temperature Tet, based on the temperature of Te detected by the heat exchanger temperature sensor 48, and ends the cooling and dehumidifying performance control process.

In this way, according to the vehicle air conditioning apparatus according to the present embodiment, the opening of the third control valve 34 is controlled in the decompression range during the heating operation, and controlled in the condensing pressure regulating range during the cooling and dehumidifying operation. By this means, during the cooling and dehumidifying operation, it is possible to regulate the condensing pressure of the refrigerant in the radiator 15 to control the quantity of heat release in the radiator 15, and therefore to secure the amount of heating required to heat the air blowing to the vehicle interior.

In addition, during the cooling and dehumidifying operation, the opening of the third control valve 34 in the condensing pressure regulating range is controlled based on the target pressure Phpt of the high-pressure refrigerant and the pressure Php detected by the high-pressure refrigerant pressure sensor 45, and the number of rotations of the electric motor 21*a* of the compressor 21 is controlled such that the evaporating temperature Te of the refrigerant in the heat exchanger 14 is the target evaporating temperature Tet, based on the temperature Te detected by the heat exchanger temperature sensor 48. By this means, it is possible to ensure that the quantity of heat sucked in the heat exchanger 14 and the quantity of heat released in the radiator 15 are the target values, respectively, and therefore to maintain the temperature and the humidity of the vehicle interior in good conditions.

Moreover, the opening of the third control valve 34 in the condensing pressure regulating range is controlled by switching the opening between two different openings. By this means, the opening can be controlled by such a simple way in which the opening is switched between two openings, and therefore it is possible to reduce the production cost.

Figure 49:
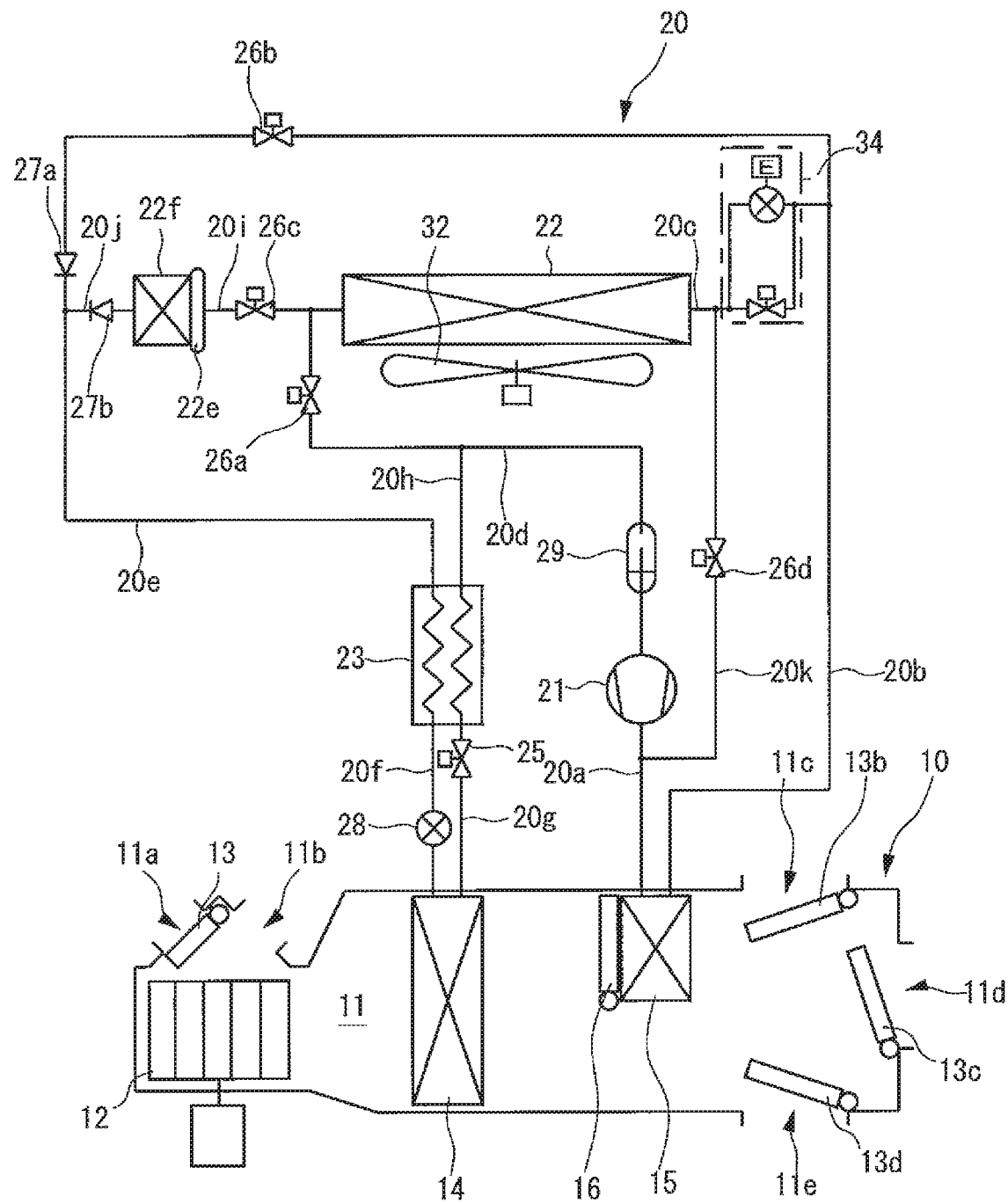
FIG. 49 is a schematic view showing the vehicle air conditioning apparatus according to Embodiment 9 of the present invention.

FIGS. 49 and 50 show Embodiment 9 of the present invention. Here, the same components are assigned the same reference numerals as in Embodiment 7.

As shown in FIG. 49, in the refrigerant circuit 20 of the vehicle air conditioning apparatus, the third control valve 34 is provided instead of the first control valve 24*b* in Embodiment 7. The third control valve 34 includes a refrigerant inlet and a refrigerant outlet and can regulate its opening within each of a decompression range and a condensing pressure regulating range.

To be more specific, input side of the radiator 15 into which the refrigerant flows is connected to the delivery side of the compressor 21 from which the refrigerant is discharged to form the refrigerant flow passage 20*a*. In addition, the input side of the third control valve 24 into which the refrigerant flows is connected to the output side of the radiator 15 from which the refrigerant is discharged, thereby to form the refrigerant flow passage 20*b*. The input side of the outdoor heat exchanger 22 is connected to the output side of the third control valve 34 from which the refrigerant is discharged, thereby to form the refrigerant flow passage 20*c*. The suction side of the compressor 21 into which the refrigerant is sucked is connected to the output side of the outdoor heat exchanger 22 from which the refrigerant is discharged, thereby to form the refrigerant flow passage 20*d*. In the refrigerant flow passage 20*d*, the first solenoid valve 26*a* and the accumulator 29 are provided in the order from the upstream of the refrigerant flow direction. The input side of the indoor heat exchanger 23 into which the high-pressure refrigerant flows is connected to the refrigerant flow passage 20*b*, thereby to form the refrigerant flow passage 20*e*. In the refrigerant flow passage 20e, the second solenoid valve 26b and the first check valve 27a are provided in the order from the upstream of the refrigerant flow direction. The input side of the heat exchanger 14 into which the refrigerant flows is connected to the output side of the indoor heat exchanger 23 from which the high-pressure refrigerant is discharged, thereby to form the refrigerant flow passage 20f. The expansion valve 28 is provided in the refrigerant flow passage 20f. The input side of the indoor heat exchanger 23 into which the low-pressure refrigerant flows is connected to the output side of the heat exchanger 14 from which the refrigerant is discharged, thereby to form the refrigerant flow passage 20g. The second control valve 25 is provided in the refrigerant flow passage 20g. The part of the refrigerant flow passage 20d between the first solenoid valve 26a and the accumulator 29 is connected to the output side of the indoor heat exchanger 23 from which the low-pressure refrigerant is discharged, thereby to form the refrigerant flow passage 20h. The input side of the gas-liquid separator 22e into which the refrigerant flows is connected to the output side of the outdoor heat exchanger 22 from which the refrigerant is discharged, in parallel with the refrigerant flow passage 20d, thereby to form the refrigerant flow passage 20i. The third solenoid valve 26c is provided in the refrigerant flow passage 20i. Part of the refrigerant flow passage 20e located downstream from the first check valve 27a in the refrigerant flow direction is connected to the output side of the gas-liquid separator 22e from which the refrigerant is discharged via the superheat portion 22f, thereby to form the refrigerant flow passage 20j. The second check valve 27b is provided in the refrigerant flow passage 20j. Moreover, the refrigerant flow passage 20a is connected to the refrigerant flow passage 20c, thereby to form the refrigerant flow passage 20k, as a defrost refrigerant flow passage. The fourth solenoid valve 26d is provided in the refrigerant flow passage 20k.

As shown in FIG. 50, the third control valve 34 includes: a valve body 34a configured to allow the refrigerant having passed through the refrigerant flow passage 20b to flow through; and an opening regulating mechanism 34b configured to switch the refrigerant flow passage of the valve body 34 between the refrigerant flow channel to the expansion part and the refrigerant flow channel to the condensing pressure regulating part, and to regulate the openings of the refrigerant flow passages to the expansion part and to the condensing pressure regulating part, respectively.

In the valve body 34a, there are formed a refrigerant inlet chamber 34d configured to communicate with a refrigerant inlet 34c connecting to the refrigerant flow passage 20b, and a refrigerant outlet chamber 34f configured to communicate with a refrigerant outlet 34e connecting to the refrigerant flow passage 20c. The refrigerant inlet chamber 34d may be a room having a circular cross-section and extending in the horizontal direction. The refrigerant inlet 34c is provided on the outer periphery of the refrigerant inlet chamber 34d in the refrigerant outlet chamber 34f side. Meanwhile, the refrigerant outlet chamber 34f may be a room having a circular cross-section and extending along the same axis as the refrigerant inlet chamber 34f. The refrigerant outlet chamber 34f communicates with the refrigerant inlet chamber 34d via a first communicating hole 34g that is opened and closed by the opening regulating mechanism 34b.

In addition, in the valve body 34a, an expansion part refrigerant flow channel 34h configured to allow communication between the refrigerant outlet chamber 34f side of the refrigerant inlet chamber 34d and the refrigerant outlet chamber 34f. A second communicating hole 34i that is opened and closed by the opening regulating mechanism 34b is provided in the expansion part refrigerant flow channel 34h in the refrigerant outlet chamber 34f side.

Moreover, a pilot refrigerant flow channel 34j is provided in the valve body 34a to allow communication between the refrigerant inlet chamber 34d in the side opposite to the refrigerant outlet chamber 34f and the second communicating hole 34i of the expansion part refrigerant flow channel 34h in the refrigerant inlet chamber 34d side. A third communicating hole 34k that is opened and closed by the opening regulating mechanism 34b is provided in the pilot refrigerant flow channel 34j in the refrigerant outlet chamber 34f side.

The opening regulating mechanism 34b includes: a solenoid 34l to linearly reciprocate a plunger with respect to a coil; a first valve element 34m to open and close the first communicating hole 34g; a second valve element 34n to open and close the second communicating hole 34i; and a third valve element 34o to open and close the third communicating hole 34k.

The solenoid 34l is a proportional solenoid configured to be able to adjust the position of the plunger with respect to the coil by regulating the magnitude of the current flowing though the coil.

The first valve element 34m includes: a valve element portion 34p to open and close the first communicating hole 34g; a piston portion 23q configured to be able to move in the refrigerant inlet chamber 34d; and a coupling portion 34r configured to couple the valve element portion 34q with the piston portion 34q. A communicating hole 34s is provided in the piston portion 34q that allows communication between the part of the refrigerant inlet chamber 34d in the refrigerant outlet chamber 34f side and the part of the refrigerant inlet chamber 34d located on the opposite side of the refrigerant outlet chamber 34f. The first valve element 34m is biased in the direction in which the valve element portion 34p closes the first communicating hole 34g by a coil spring 34t in the piston portion 34q, which is provided in the opposite side of the refrigerant flow passage 34f.

The second valve element 34n is a needle-like member, which has a circular cross-section and tapers to one end, and is fixed to the front end of the plunger. The second valve element 34n increases the opening of the second communicating hole 34i as the plunger moves upward.

The third valve element 34o is a needle-like member, which has a circular cross-section and tapers to one end, and is provided to engage with an engagement portion 34u that is provided in the middle of the plunger in the axis direction of the plunger. The third valve element 34o is biased to close the third communicating hole 34k by a coil spring 34v provided on the third valve element 34o. When the amount of the upward movement of the plunger is a predetermined value or greater, the third valve 34o engages with the engagement portion 34u, and, when the amount of the upward movement of the plunger exceeds the predetermined value, the opening of the third communicating hole 34 increases.

In FIG. 50A, the first valve element 34m, the second valve element 34n, and the third valve element 34o close the first communicating hole 34g, the second communicating hole 34i and the third communicating hole 34k, respectively.

When the plunger of the solenoid 34l moves upward from the state shown in FIG. 50A, the second valve element 34n opens the second communicating hole 34i while the first valve element 34m and the third valve element 34o close the first communicating hole 34g and the third communicating hole 34k, respectively, as shown in FIG. 50B. In this case, the refrigerant flowing from the refrigerant inlet 34c into the refrigerant inlet chamber 34d is decompressed via the expansion part refrigerant flow channel 34h and flows into the refrigerant outlet chamber 34f, and then flows out of the refrigerant outlet 34e. The first valve element 34m keeps the first communicating hole 34g closed by the biasing force of the coil spring 34t. The plunger of the solenoid 34l is moved as long as the first communicating hole 34g and the third communicating hole 34k are closed, the opening is regulated within the range of the expansion part.

The plunger of the solenoid 34l moves more upward from the state shown in FIG. 50B, the second valve element 34n and the third valve element 34o open the second communicating hole 34i and the third communicating hole 34k, respectively, because of the upward movement of the plunger as shown in FIG. 50C. When the second communicating hole 34i and the third communicating hole 34j are opened, the part of the refrigerant inlet chamber 34d located on the opposite side of the first communicating hole 34g communicates with the refrigerant outlet chamber 34f via the pilot refrigerant flow channel 34j, so that the pressure drops. By this means, as shown in FIG. 50C, the first valve element 34m moves to the opposite side of first communicating hole 34g of the refrigerant inlet chamber 34d, against the biasing force of the coil spring 34t. The plunger of the solenoid 34l is moved as long as the first communicating hole 34g is open, the opening is regulated within the condensing pressure regulating part.

In this way, with the vehicle air conditioning apparatus according to the present embodiment, the first communicating hole 34g of the third control valve 34 is closed to regulate the opening of the second communicating hole 34i of the expansion part refrigerant flow channel 34h during the heating operation. Meanwhile, during the cooling and dehumidifying operation, the opening of the first communicating hole 34g is regulated. By this means, it is possible to regulate the condensing pressure of the refrigerant in the radiator 15 during the cooling and dehumidifying operation, and therefore to regulate the quantity of heat release in the radiator 15. As a result, it is possible to secure the amount of heating required to heat the air blowing to the vehicle interior, and therefore to ensure that the temperature of the air supplied to the vehicle interior is a preset temperature.

Here, with the above-described embodiment, a configuration has been explained where the first control valve 24 includes the expansion part to decompress the refrigerant flowing into the outdoor heat exchanger 22 during the heating operation and the condensing pressure regulating part to control the condensing pressure of the refrigerant in the radiator 15 during the cooling and dehumidifying operation, which are integrally formed. However, it is by no means limiting. Another configuration is possible, for example, where an electronic expansion valve as the expansion part and a condensing pressure regulating valve as the condensing pressure regulating part are connected in parallel to the upstream side of the outdoor heat exchanger 22 in the refrigerant flow direction. This provides the same effect as in the above-described embodiment.

In addition, a configuration has been described where the switching of the refrigerant flow channels in the valve body 24a of the first control valve 24 and the regulation of the opening is performed by using the solenoid 24h. However, it is by no means limiting. For example, a stepping motor may be used as long as it is possible to switch the refrigerant flow channels in the valve body 24a and to regulate the opening.

In addition, with the present embodiment, a configuration has been described where the degree of supercooling SC of the refrigerant flowing out of the radiator 15 is controlled by regulating the opening of the expansion part of the first control valve 24 provided upstream of the outdoor heat exchanger 22. However, it is by no means limiting but another configuration is possible where an electronic expansion valve is provided instead of the expansion valve 28 located upstream of the heat exchanger 14 and the opening of this electronic expansion valve is regulated to control the degree of supercooling SC of the refrigerant flowing out of the radiator 15.

Moreover, with the above-described embodiments, a configuration has been explained where, in the cooling and dehumidifying operation, the opening of the condensing pressure regulating part of the first control valve 24 and the opening of the third control valve 34 in the condensing pressure regulating range are regulated based on the target pressure Phpt of the high-pressure refrigerant and the pressure Php detected by the high-pressure refrigerant pressure sensor 45. However, it is by no means limiting. Another configuration is possible where, for example, the first control valve 24 and the third control valve 34 are controlled based on the target temperature Thpt of the high-pressure refrigerant and the pressure Thp detected by the high-pressure refrigerant temperature sensor 44. This provides the same effect as in the above-described embodiments.

Moreover, with the above-described embodiments, a configuration has been described where, in the cooling and dehumidifying operation, the number of rotations of the electric motor 21a of the compressor 21 is controlled such that the evaporating temperature Te of the refrigerant in the heat exchanger 14 is the target evaporating temperature Tet. However, it is by no means limiting. Another configuration is possible where the number of rotations of the electric motor 21a of the compressor 21 is controlled such that the temperature of the air having heated in the heat exchanger 14 is a target temperature. This provides the same effect as in the above-described embodiments.

Furthermore, with Embodiment 7, a configuration has been described where the opening of the condensing pressure regulating part of the first control valve 24 is switched between two values, a large and a small, excluding the completely closed state. Meanwhile, with Embodiment 8, a configuration has been described where the opening of the third control valve 34 in the condensing pressure regulating range is switched between two values, a large one and a small one. However, another configuration is possible where the opening of the condensing pressure regulating part of the first control valve 24 and the opening of the third control valve 34 in the condensing pressure regulating range are switched between two states: a state to regulate the difference in pressure of the refrigerant between the input side of the radiator into which the refrigerant flows and the output side of the radiator from which the refrigerant is discharged; a fully open state. In this case, it is possible to optimize the condensing pressure of the refrigerant in the radiator based on the target pressure Phpt of the high-pressure refrigerant and the pressure Php detected by the high-pressure refrigerant pressure sensor 45. Therefore, it is possible to more secure the amount of heating to heat the air blowing to the vehicle interior.

FIG. 51 through FIG. 61 show Embodiment 10 of the present invention.

Figure 51:
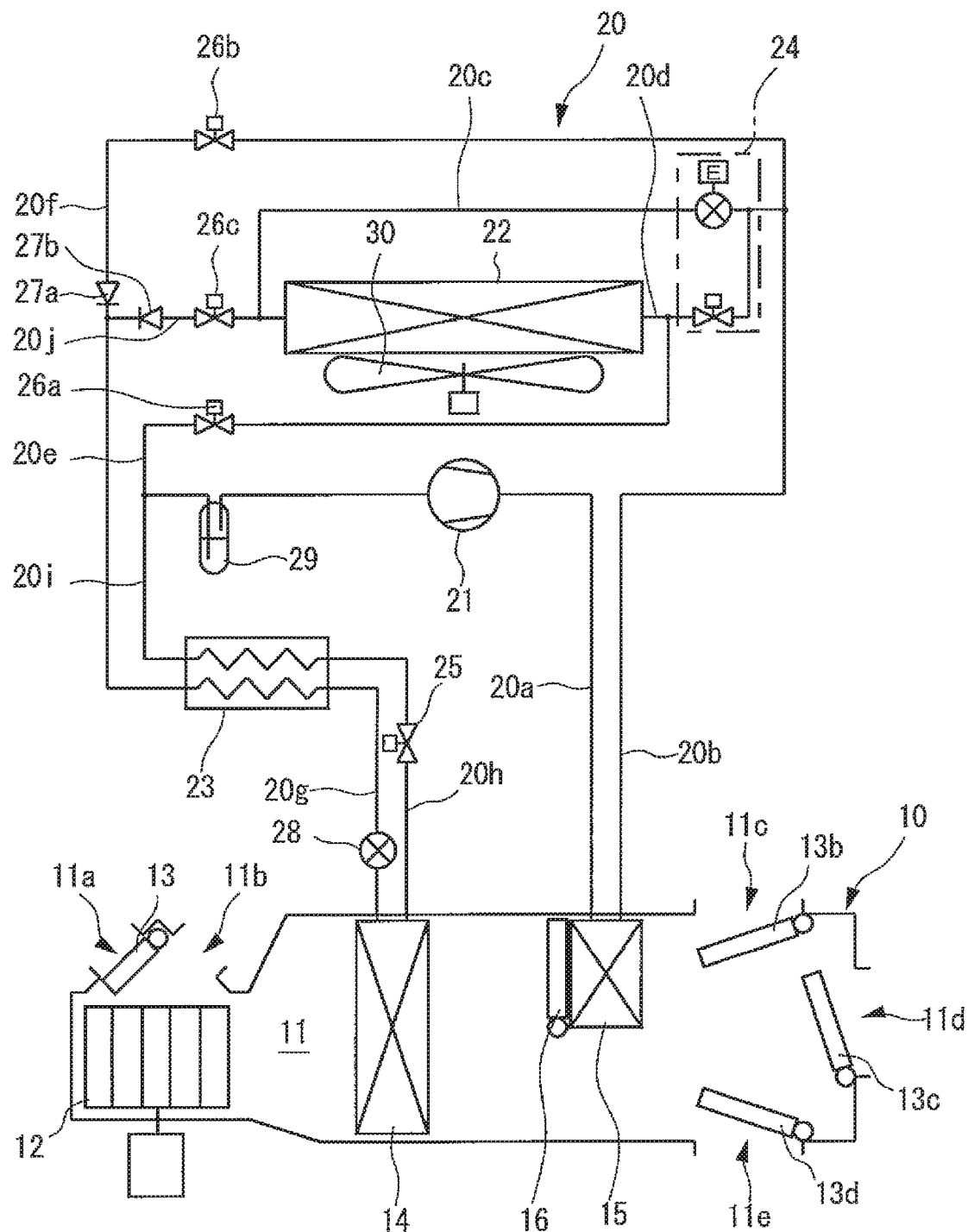
FIG. 51 is a schematic view showing the vehicle air conditioning apparatus according to Embodiment 10 of the present invention.

As shown in FIG. 51, the vehicle air conditioning apparatus according to the present invention includes the air conditioning unit 10 provided in the vehicle interior, and the refrigerant circuit 20 formed across the vehicle interior and the outdoor.

The air conditioning unit 10 includes the air flow passage 11 that allows the air to be supplied to the vehicle interior to pass through. The outdoor air inlet 11a and the indoor air inlet 11b are provided in the first end side of the air flow passage 11. The outdoor air inlet 11a is configured to allow the outdoor air to flow into the air flow passage 11, and the indoor air inlet 11b is configured to allow the indoor air to flow into the air flow passage 11. Meanwhile, the foot outlet 11c, the vent outlet 11d and the defroster outlet 11e are provided in the second end side of the air flow passage 11. The foot outlet 11c is configured to allow the air flowing through the air flow passage 11 to blow to the feet of the passengers in the vehicle. The vent outlet 11d is configured to allow the air flowing through the air flow passage 11 to blow to the upper bodies of the passengers in the vehicle. The defroster outlet 11e is configured to allow the air flowing through the air flow passage 11 to blow to the interior surface of the front window.

The indoor fan 12 such as a sirocco fan configured to allow the air to flow through the air flow passage 11 from end to end is provided in the first end side of the air flow passage 11. This indoor fan 12 is driven by the electric motor 12a.

Also, in the first end side of the air flow passage 11, an inlet switching damper 13 configured to open one of the outdoor air inlet 11a and the indoor air inlet 11b and to close the other. This inlet switching damper 13 is driven by the electric motor 13a. When the inlet switching damper 13 closes the indoor air inlet 11b and opens the outdoor air inlet 11a, the mode is switched to an outdoor air supply mode in which the air flows from the outdoor air inlet 11a into the air flow passage 11. Meanwhile, when the inlet switching damper 13 closes the outdoor air inlet 11a and opens the indoor air inlet 11b, the mode is switched to an indoor air circulation mode in which the air flows from the indoor air inlet 11b into the air flow passage 11. Moreover, when the inlet switching damper 13 is placed between the outdoor air inlet 11a and the indoor air inlet 11b and the outdoor air inlet 11a and the indoor air inlet 11b open, the mode is switched to a two-way mode in which the air flows from both the outdoor air inlet 11a and the indoor air inlet 11b into the air flow passage 11 according to the opening ratio of the outdoor air inlet 11a and the indoor air inlet 11b.

Outlet switching dampers 13b, 13c and 13d configured to open and close the foot outlet 11c, the vent outlet 11d and the defroster outlet 11e are provided in the foot outlet 11c, the vent outlet 11d and the defroster outlet 11e, respectively, in the second side of the air flow passage 11. These outlet switching dampers 13b, 13c and 13d are configured to move together by a linkage (not shown) and are opened and closed by the electric motor 13e. Here, when the outlet switching dampers 13b, 13c and 13d open the foot outlet 1c, close the vent outlet 11d and slightly open the defroster outlet 11e, most of the air flowing through the air flow passage 11 blows out of the foot outlet 11c and the remaining air blows out of the defroster outlet 11e. This mode is referred to as "foot mode." Meanwhile, when the outlet switching dampers 13b, 13c and 13d close the foot outlet 11c and the defroster outlet 11e, and open the vent outlet 11d, all the air flowing through the air flow passage 11 blows out of the vent outlet 11d. This mode is referred to as "vent mode." In addition, when the outlet switching dampers 13b, 13c and 13d open the foot outlet 11c and the vent outlet 11d, and close the defroster outlet 11e, the air flowing through the air flow passage 11 blows out of the foot outlet 11c and the vent outlet 11d. This mode is referred to as "bi-level mode." Moreover, when the outlet switching dampers 13b, 13c and 13d close the foot outlet 11c and the vent outlet 11d, and open the defroster outlet 11e, the air flowing through the air flow passage 11 blows out of the defroster outlet 11e. This mode is referred to as "defroster mode." Furthermore, when the outlet switching dampers 13b, 13c and 13d close the vent outlet 11d and open the foot outlet 11c and the defroster outlet 11e, the air flowing through the air flow passage 11 blows out of the foot outlet 11c and the defroster outlet 11e. This mode is referred to as "defroster-foot mode." Here, in the bi-level mode, the air flow passage 11, the foot outlet 11c, the vent outlet 11d, and a heat exchanger and a radiator which will be described later, are arranged and configured such that the temperature of the air blowing out of the foot outlet 11c is higher than the temperature of the air blowing out of the vent outlet 11d.

A heat exchanger 14 is provided in the air flow passage 11 in the downstream of the air flow from the indoor fan 12. The heat exchanger 14 is configured to cool and dehumidify the air flowing through the air flow passage 11. In addition, a radiator 15 is provided in the air flow passage 11 in the downstream of the air flow from the heat exchanger 14. The radiator 15 is configured to heat the air flowing through the air flow passage 11. The heat exchanger 14 and the radiator 15 are heat exchangers, each of which is constituted by fins and tubes and which is configured to perform a heat exchange between the refrigerant flowing through the refrigerant circuit 20 and the air flowing through the air flow passage 11.

An air mix damper 16 is provided between the heat exchanger 14 and the radiator 15 in the air flow passage 11 and is configured to control the percentage of the air to be heated, which is flowing through the air flow passage 11. The air mix damper 16 is driven by the electric motor 16a. When the air mix damper 16 is disposed in the air flow passage 11 in the upstream of the radiator 15, the percentage of the air subjected to a heat exchange in the radiator 15 is reduced. Meanwhile, when the air mix damper 16 is moved to a position other than the radiator 15 in the air flow passage 11, the percentage of the air subjected to a heat exchange is increased. In the air flow passage 11, when the air mix damper 16 closes the upstream side of the radiator 15 and opens the portion other than the radiator 15, the opening is 0%, and, on the other hand, when the air mix damper 16 opens the upstream side of the radiator 15 and closes the portion other than the radiator 15, the opening is 100%.

The refrigerant circuit 20 includes: the heat exchanger 14; the radiator 15; a compressor 21 configured to compress a refrigerant; an outdoor heat exchanger 22 configured to perform a heat exchange between the refrigerant and the outdoor air; an indoor heat exchanger 23 configured to perform a heat exchange between the refrigerant flowing out of the heat exchanger 14 and the refrigerant flowing out of the radiator 15 and the outdoor heat exchanger 22, or at least of the radiator 15; a first control valve 24 including an expansion part configured to decompress the refrigerant flowing into the outdoor heat exchanger 22 during the heating operation, and a condensing pressure regulating part configured to regulate the condensing pressure of the refrigerant in the radiator during the cooling and dehumidifying operation; a second control valve 25 having a function as an evaporating pressure regulating part to regulate the evaporating pressure of the refrigerant in the heat exchanger 14; first to third solenoid valves 26a, 26b and 26c; first and second check valves 27a and 27b, an expansion valve 28; and an accumulator 29 configured to separate refrigerant liquid from refrigerant vapor to prevent the refrigerant liquid from being sucked into the compressor 21. These components are connected to each other by a copper pipe or an aluminum pipe.

To be more specific, input side of the radiator 15 into which the refrigerant flows is connected to the delivery side of the compressor 21 from which the refrigerant is discharged to form the refrigerant flow passage 20a. In addition, the input side of the first control valve 24 into which the refrigerant flows is connected to the output side of the radiator 15 from which the refrigerant is discharged, thereby to form the refrigerant flow passage 20b. The first end side of the outdoor heat exchanger 22 is connected to the output side of the expansion part of first control valve 24 from which the refrigerant is discharged, thereby to form the refrigerant flow passage 20c. Meanwhile, the second end side of the outdoor heat exchanger 22 is connected to the output side of the condensing pressure regulating part of the first control valve 24 from which the refrigerant discharged, thereby to form the refrigerant flow passage 20d. The suction side of the compressor 21 into which the refrigerant is sucked is connected to the second end side of the outdoor heat exchanger 22, in parallel with the refrigerant flow passage 20d, thereby to form the refrigerant flow passage 20e. The first solenoid valve 26a and the accumulator 29 are provided in the refrigerant flow passage 20e in the order from the upstream of the flow of the refrigerant. The input side of the indoor heat exchanger 23 into which a high-pressure refrigerant flows is connected to the refrigerant flow passage 20b, thereby to form the refrigerant flow passage 20f. In the refrigerant flow passage 20f, the second solenoid valve 26b and the first check valve 27a are provided in the order from the upstream of the refrigerant flow direction. The input side of the heat exchanger 14 into which the refrigerant flows is connected to the output side of the indoor heat exchanger 23 from which the high-pressure refrigerant is discharged, thereby to form the refrigerant flow passage 20g. The expansion valve 28 is provided in the refrigerant flow passage 20g. The input side of the indoor heat exchanger 23 into which a low-pressure refrigerant flows is connected to the output side of the heat exchanger 14 from which the refrigerant is discharged, thereby to form the refrigerant flow passage 20h. The second control valve 25 is provided in the refrigerant flow passage 20h. The part of the refrigerant flow passage 20e between the first solenoid valve 26a and the accumulator 29 is connected to the output side of the indoor heat exchanger 23 from which the low-pressure refrigerant is discharged, thereby to form the refrigerant flow passage 20i. Part of the refrigerant flow passage 20f located downstream from the first check valve 27a in the refrigerant flow direction is connected to the first end side of the outdoor heat exchanger 22, in parallel with the refrigerant flow passage 20c, thereby to form the refrigerant flow passage 20j. The third solenoid valve 26c and the second check valve 27b are provided in the refrigerant flow passage 20j in the order from the upstream of the refrigerant flow direction.

The compressor 21 and the outdoor heat exchanger 22 are disposed outside the vehicle interior. The compressor 21 is driven by the electric motor 21a. The outdoor heat exchanger 22 includes an outdoor fan 30 configured to perform a heat exchange between the outdoor air and the refrigerant while the vehicle stops. The outdoor fan 30 is driven by the electric motor 30a.

In the first control valve 24, a refrigerant flow channel to the expansion part and a refrigerant flow channel to the condensing pressure regulating part are formed. The refrigerant flow channels to the expansion part and to the condensing pressure regulating part can be completely closed by valves that regulate the openings of the refrigerant flow channels, respectively.

As shown in FIG. 52, the second control valve 25 includes: a valve body 25a configured to allow the refrigerant having passed through the refrigerant flow passage 20h to flow through; and an opening regulating mechanism 34b configured to regulate the openings of the refrigerant flow channels provided in the valve body 25a.

The valve body 25a includes a refrigerant inlet 25c into which the refrigerant flows and a refrigerant outlet 25d from which the refrigerant is discharged. A circular communicating hole 25e is provided between the refrigerant inlet 25a and the refrigerant outlet 25d to allow communication between the refrigerant inlet 25c and the refrigerant outlet 25d.

The opening regulating mechanism 25b includes a solenoid 25h to linearly reciprocate a plunger 25g with respect to a coil; and a valve element 25i connected to the plunger 25g and configured to open and close the communicating hole 25e of the valve body 25a.

The outer diameter of the valve element 25i is approximately the same as the inner diameter of the communicating hole 25e. The valve element 25i moves upward and downward along with the reciprocation of the plunger 25g. When the valve element 25i moves downward and is inserted into the communicating hole 25e, the communicating hole 25e is closed by the valve element 25i. The valve element 25i is biased upward by the coil spring 25j to open the communicating hole 25e. In the valve element 25i, a refrigerant flow hole 25k is provided to allow communication between the refrigerant inlet 25c and the refrigerant outlet 25d with an opening area that is smaller than the opening area of the communicating hole 25e while the valve element 25i closes the communicating hole 25e.

The second control valve opens the communicating hole 25e as shown in FIG. 52A. The second control valve 25 closes the communicating hole 25e and only a refrigerant flow hole 25k to allow communication between the refrigerant inlet 25c and the refrigerant outlet 25d as shown in FIG. 52B. The valve element 25i opens and closes the communicating hole 25e, so that the second control valve 25 can regulate the amount of the refrigerant flowing through the refrigerant flow passage 20h between different two amounts.

Moreover, the vehicle air conditioning apparatus also includes a controller 40 that controls the temperature and the humidity of the vehicle interior to be the preset temperature and humidity.

The controller 40 includes a CPU, a ROM and a RAM. In the controller, upon receiving an input signal from a device connected to the input side, the CPU reads the program stored in the ROM according to the input signal, stores the state detected by the input signal on the RAM and transmits an output signal to a device connected to the output side.

Figure 53:
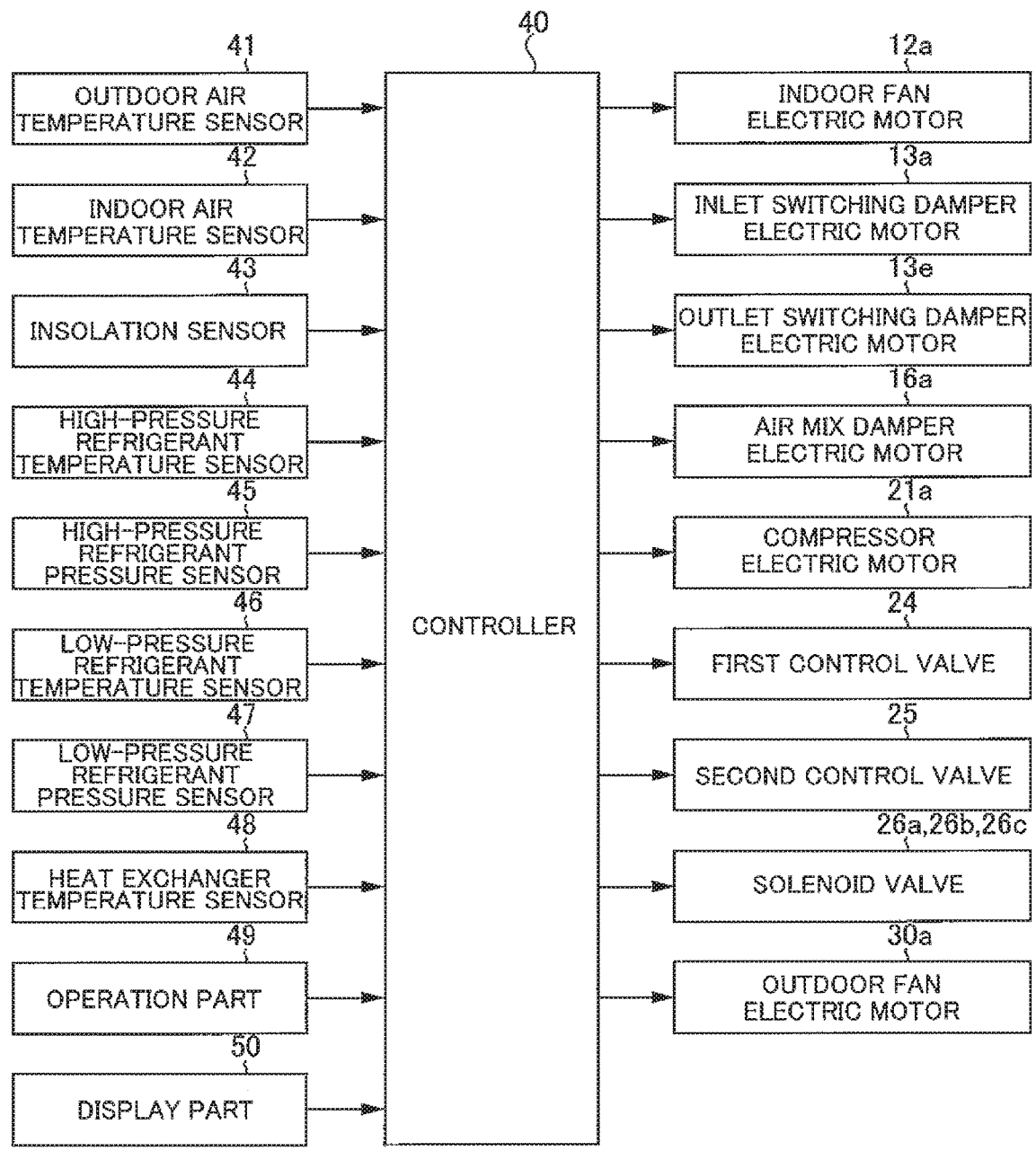
FIG. 53 is a block diagram showing a control system.

As shown in FIG. 53, an electric motor 12a for driving the indoor fan 12; an electric motor 13a for driving the inlet switching damper 13; an electric motor 13e for driving the outlet switching dampers 13b, 13c and 13d; an electric motor 16a for driving the air mix damper 16; an electric motor 21a for driving the compressor 21; the first control valve 24; the second control valve 25; the first to third solenoid valves 26a, 26b and 26c and an electric motor 30a for driving the outdoor fan 30 are connected to the output side of the controller 40.

As shown in FIG. 53, an outdoor air temperature sensor 41 configured to detect temperature Tam outside the vehicle interior; an indoor air temperature sensor 42 configured to detect indoor air temperature Tr; an insolation sensor 43 such as a photo sensor configured to detect amount of insolation Ts;

a high-pressure refrigerant temperature sensor 44 configured to detect temperature Thp of a high-pressure refrigerant flowing through the refrigerant flow passage 20b; a high-pressure refrigerant pressure sensor 45 configured to detect pressure Php of the high-pressure refrigerant flowing through the refrigerant flow passage 20b; a low-pressure refrigerant temperature sensor 46 configured to detect temperature Tlp of the low-pressure refrigerant that flows through the refrigerant flow passage 20e and is sucked into the compressor 21; a low-pressure refrigerant pressure sensor 47 configured to detect pressure Plp of the refrigerant that flows through the refrigerant flow passage 20e and is sucked into the compressor 21; a heat exchanger temperature sensor 48 configured to detect evaporating temperature Te of the refrigerant in the heat exchanger 14; an operation part 49 configured to set modes regarding to target preset temperature Tset and the switching of the operation; and a display part 50 configured to display the indoor air temperature Tr and operation states, are connected to the output side of the controller 40.

The vehicle air conditioning apparatus having the above-described configuration performs cooling operation, cooling and dehumidifying operation, heating operation, first heating and dehumidifying operation, and second heating and dehumidifying operation. Now, each operation will be explained.

Figure 54:
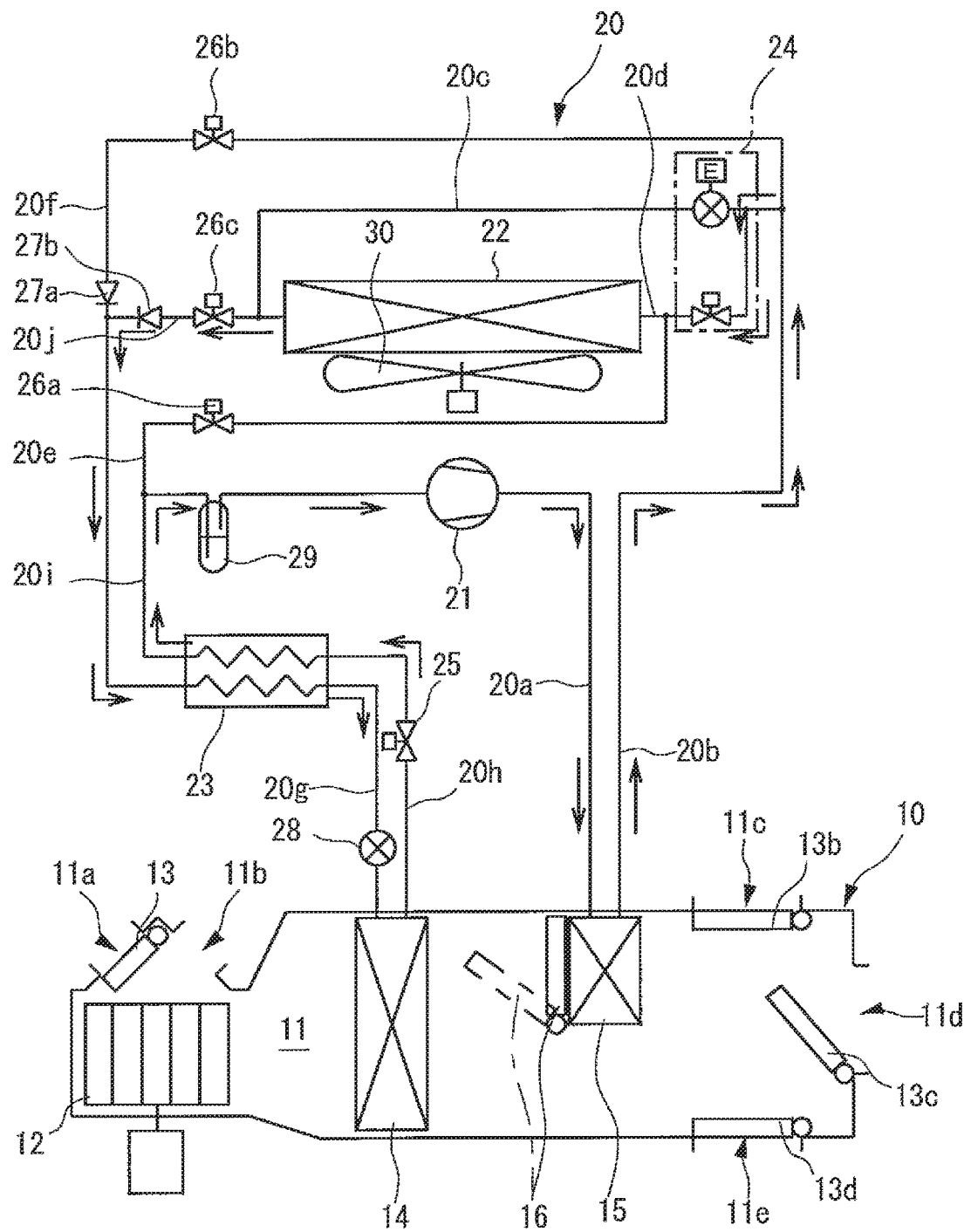
FIG. 54 is a schematic view showing the vehicle air conditioning apparatus performing a cooling operation and a cooling and dehumidifying operation.

During the cooling and dehumidifying operation, in the refrigerant circuit 20, the refrigerant flow channel to the expansion part is closed while the refrigerant flow channel to the condensing pressure regulating part is open in the first control valve 24; the third solenoid valve 26c is open; the first and second solenoid valves 26a and 26b are closed; and compressor 21 is operated. By this means, as shown in FIG. 54, the refrigerant discharged from the compressor 21 flows through in this order: the refrigerant flow passage 20a; the radiator 15; the refrigerant flow passages 20b and 20d; the outdoor heat exchanger 22, the refrigerant flow passages 20j and 20f; the high-pressure side of the indoor heat exchanger 23; the refrigerant flow passage 20g; the heat exchanger 14; the refrigerant flow passage 20h; the low-pressure side of the indoor heat exchanger 23; and the refrigerant flow passages 20i and 20e, and is sucked into the compressor 21. During the cooling operation, the refrigerant flowing through the refrigerant circuit 20 releases the heat in the outdoor heat exchanger 22 and absorbs the heat in the heat exchanger 14. During the cooling and dehumidifying operation, when the air mix damper 16 is opened as shown by the dashed-dotted line of FIG. 54, the refrigerant flowing through the refrigerant circuit 20 releases the heat also in the radiator 15.

In this case, in the air conditioning unit 10 during the cooling operation, the indoor fan 12 is operated to flow the air through the air flow passage 11, and the air is subjected to a heat exchange with the refrigerant in the heat exchanger 14 and cooled. The temperature of the cooled air becomes target air-blowing temperature TAO of the air to blow out of the outlets 11c, 11d and 11e to the vehicle interior in order to set the temperature of the vehicle interior to the target preset temperature Tset. The target air-blowing temperature TAO is calculated based on the preset temperature Tset, and environmental conditions including the outdoor air temperature Tam, the indoor air temperature Tr, and an amount of insolation Ts, which are detected by the outdoor air temperature sensor 41, the indoor air temperature sensor 42, and the insolation sensor 48, respectively.

Meanwhile, in the air conditioning unit 10 during the cooling and dehumidifying operation, the indoor fan 12 is operated to flow the air through the air flow passage 11, and the air is subjected to a heat exchange with the refrigerant which absorbs the heat in the heat exchanger 14, and therefore is cooled and dehumidified. The air having been dehumidified in the heat exchanger 14 is subjected to a heat exchange with the refrigerant which releases the heat in the radiator 15, and therefore heated. As a result, the air at the target air-blowing temperature TAO blows to the vehicle interior.

Figure 55:
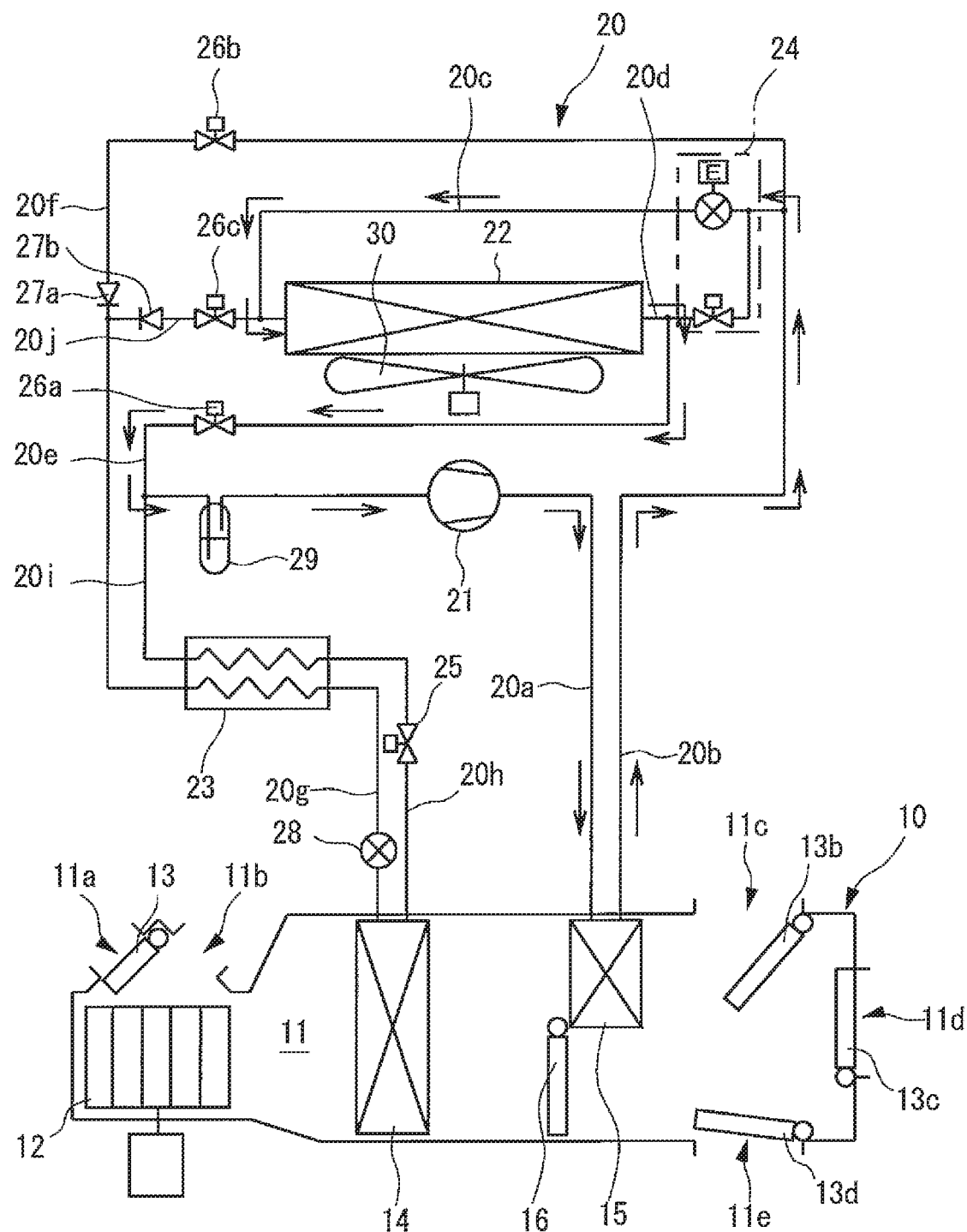
FIG. 55 is a schematic view showing the vehicle air conditioning apparatus performing a heating operation.

During the heating operation, in the refrigerant circuit 20, the refrigerant flow channel to the expansion part is open while the refrigerant flow channel to the condensing pressure regulating part is closed in the first control valve 24; the first solenoid valve 26a is open; the second and third solenoid valves 26b and 26c are closed; and the compressor 21 is operated. By this means, as shown in FIG. 55, the refrigerant discharged from the compressor 21 flows through in this order: the refrigerant flow passage 20a; the radiator 15; the refrigerant flow passages 20b and 20c; the outdoor heat exchanger 22; and the refrigerant flow passage 22e, and is sucked into the compressor 21. The refrigerant flowing through the refrigerant circuit 20 releases the heat in the radiator 15 and absorbs the heat in the outdoor heat exchanger 22.

In this case, in the air conditioning unit 10, the indoor fan 12 is operated to flow the air through the air flow passage 11, and the flowing air is not subjected to a heat exchange with the refrigerant in the heat exchanger 14, but is subjected to a heat exchange with the refrigerant in the radiator 15 and therefore is heated. As a result, the air at the target air-blowing temperature TAO blows to the vehicle interior.

Figure 56:
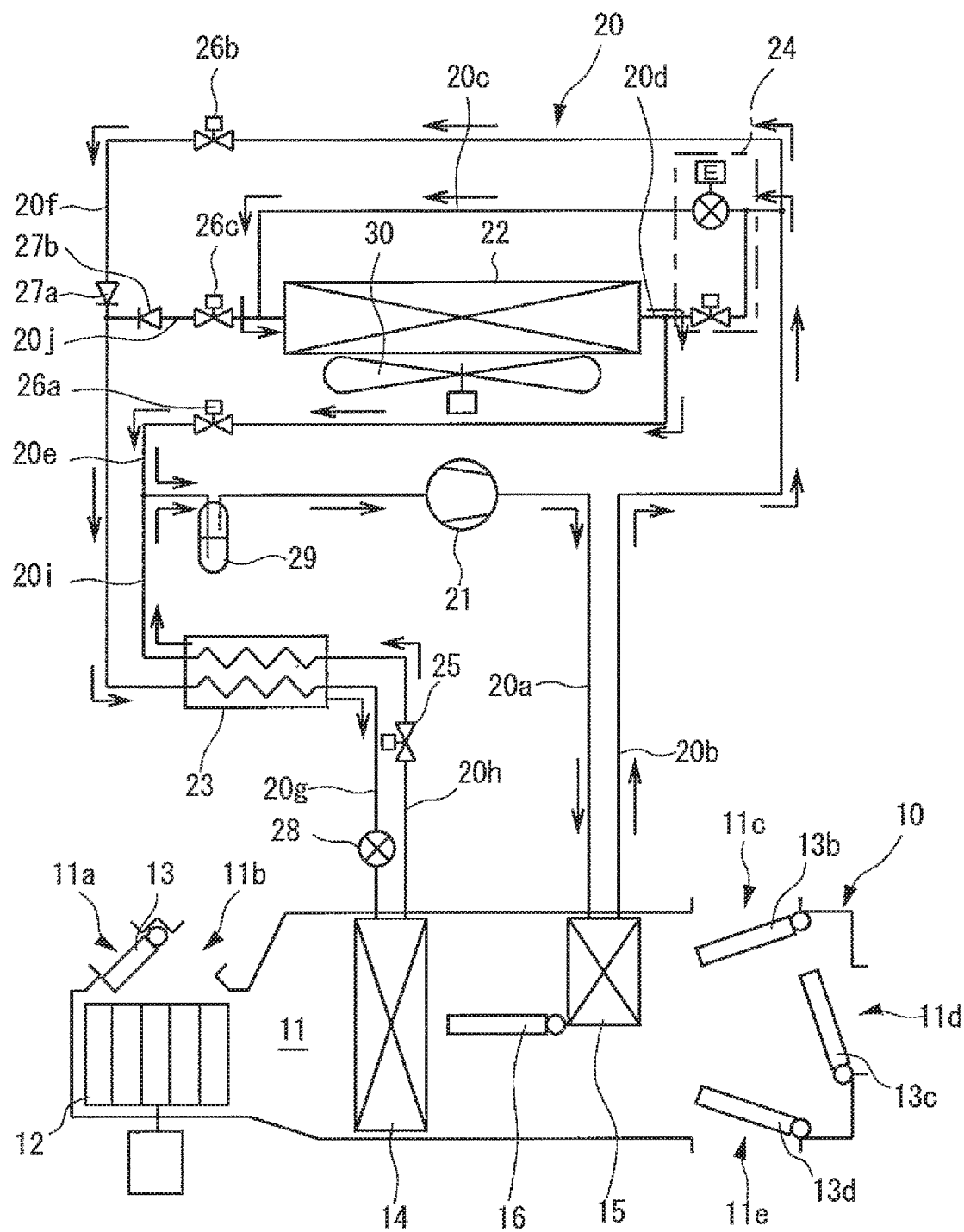
FIG. 56 is a schematic view showing the vehicle air conditioning apparatus performing a first heating and dehumidifying operation.

During the first heating and dehumidifying operation, in the refrigerant circuit 20, the refrigerant flow channel to the expansion part is open while the refrigerant flow channel to the condensing pressure regulating part is closed in the first control valve 24; the first and second solenoid valves 26a and 26b are open; the third solenoid valve 26c is closed; and the compressor 21 is operated. By this means, as shown in FIG. 56, the refrigerant discharged from the compressor 21 flows through in this order: the refrigerant flow passage 20a; the radiator 15; and the refrigerant flow passage 20b. Part of the refrigerant having passed through the refrigerant flow passage 20b flows through in this order: the first control valve 24; the refrigerant flow passage 20c; the outdoor heat exchanger 22; and the refrigerant flow passage 20e, and is sucked into the compressor 21. Meanwhile, the remaining refrigerant having passed through the refrigerant flow passage 20b flows through in this order: the refrigerant flow passage 20f; the high-pressure side of the indoor heat exchanger 23; the refrigerant flow passage 20g; the heat exchanger 14; the refrigerant flow passage 20h; the low-pressure side of the indoor heat exchanger 23; and the refrigerant flow passage 20i, and is sucked into the compressor 21. The refrigerant flowing through the refrigerant circuit 20 releases the heat in the radiator 15 and absorbs the heat in the heat exchanger 14 and the outdoor heat exchanger 22.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified. Part of the air having been dehumidified in the heat exchanger 14 is subjected to a heat exchange with the refrigerant in the radiator 15 and heated. As a result, the air at the target air-blowing temperature TAO blows into the vehicle interior.

Figure 57:
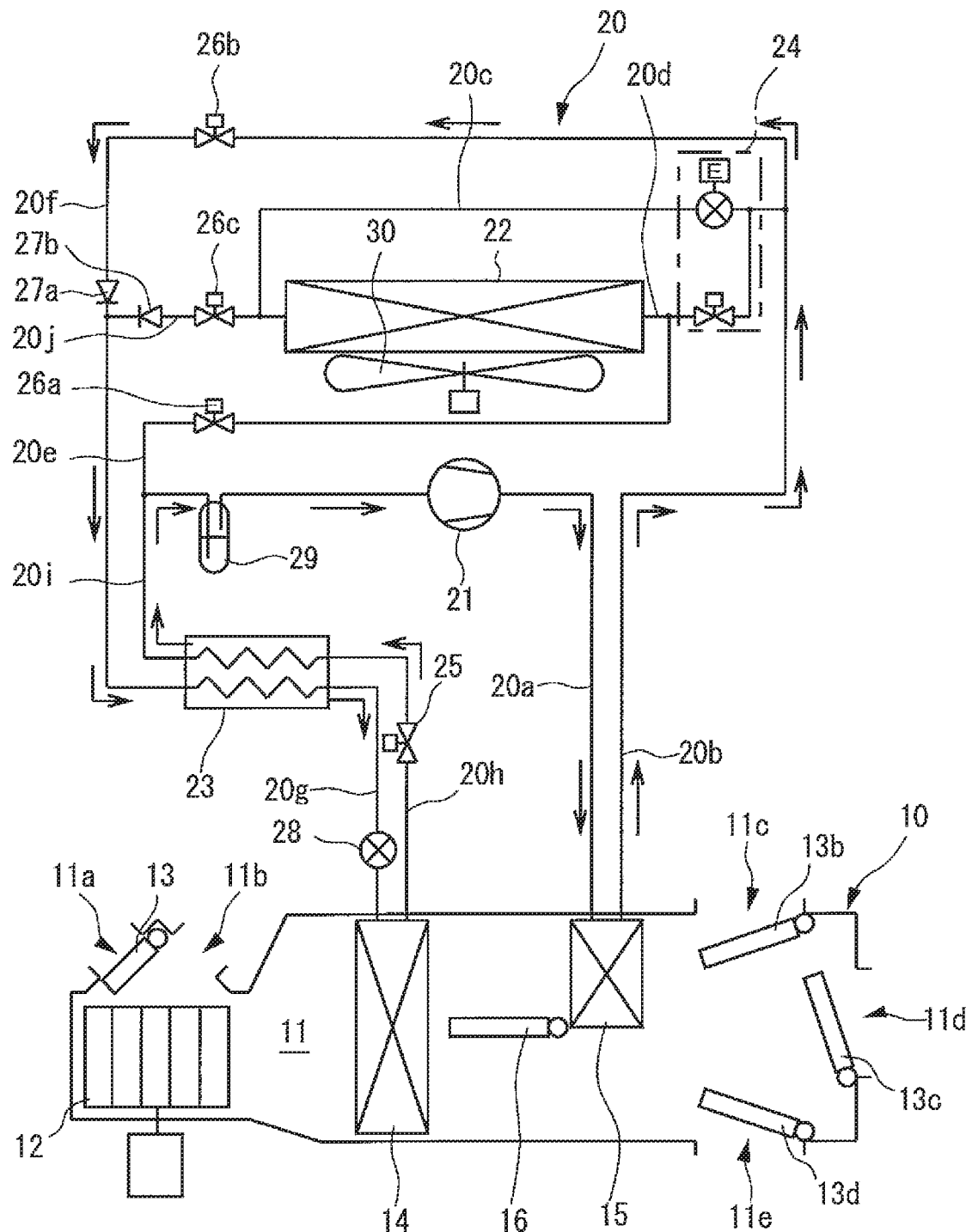
FIG. 57 is a schematic view showing the vehicle air conditioning apparatus performing a second heating and dehumidifying operation.
Figure 58:
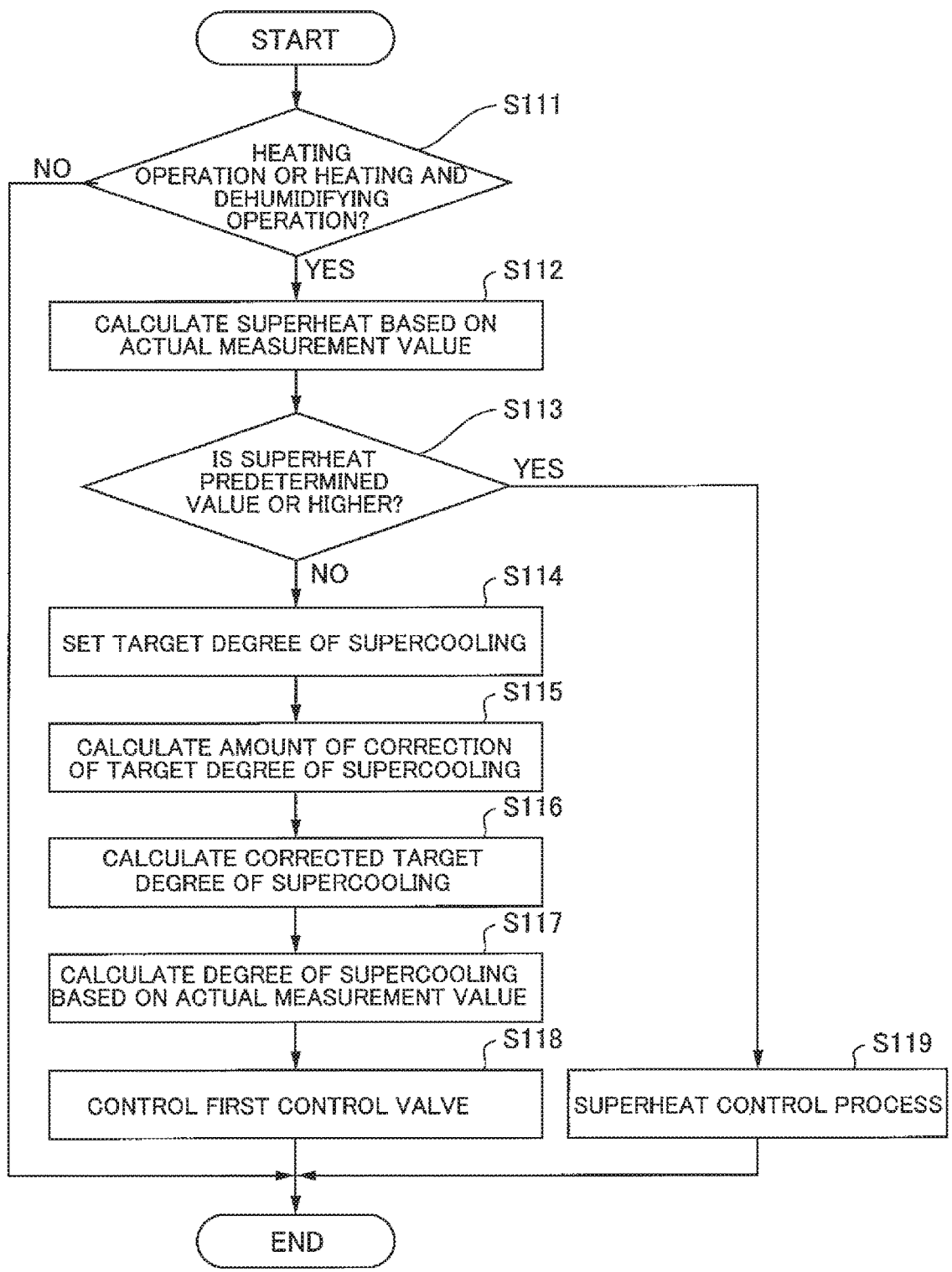
FIG. 58 is a flowchart showing an expansion part control process.
Figure 59:
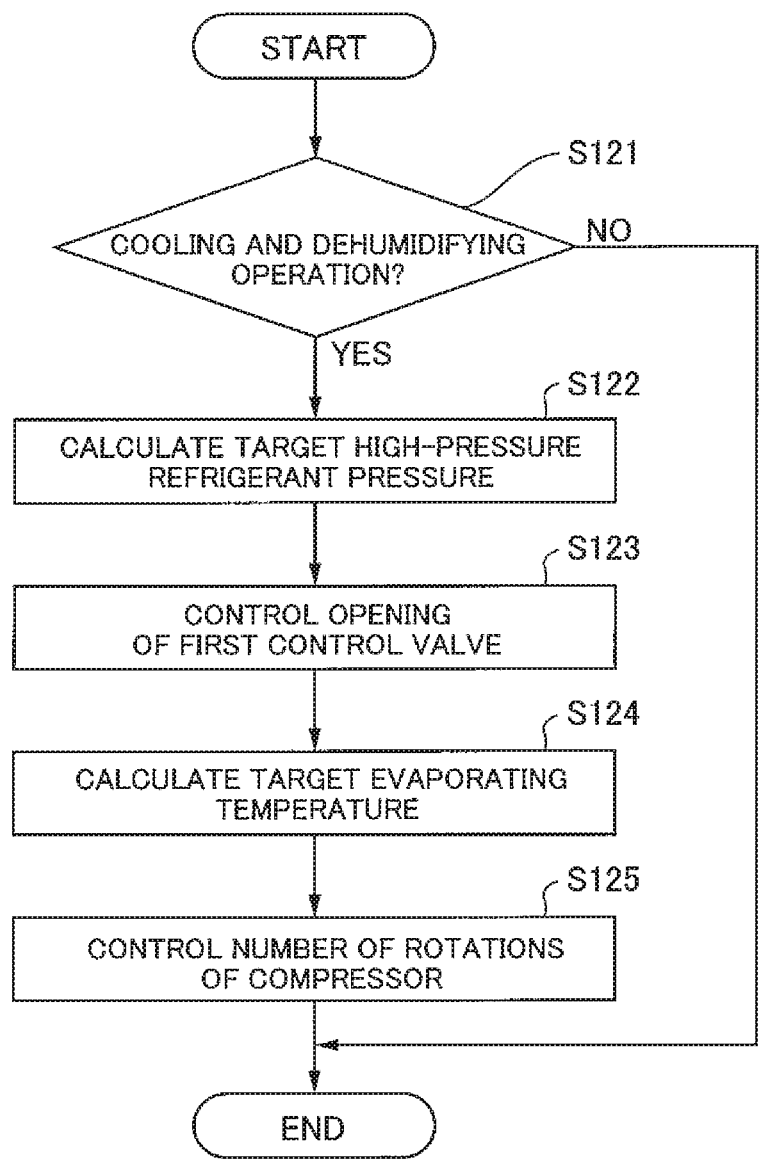
FIG. 59 is a flowchart showing a cooling and dehumidifying operation control process.
Figure 60:
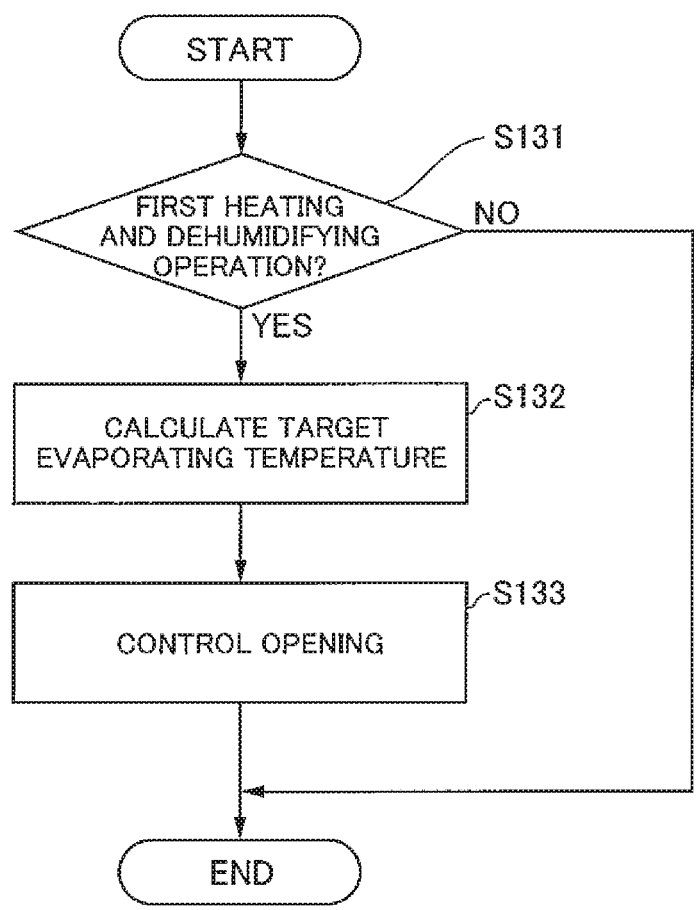
FIG. 60 is a flowchart showing an evaporating temperature control process.
Figure 61:
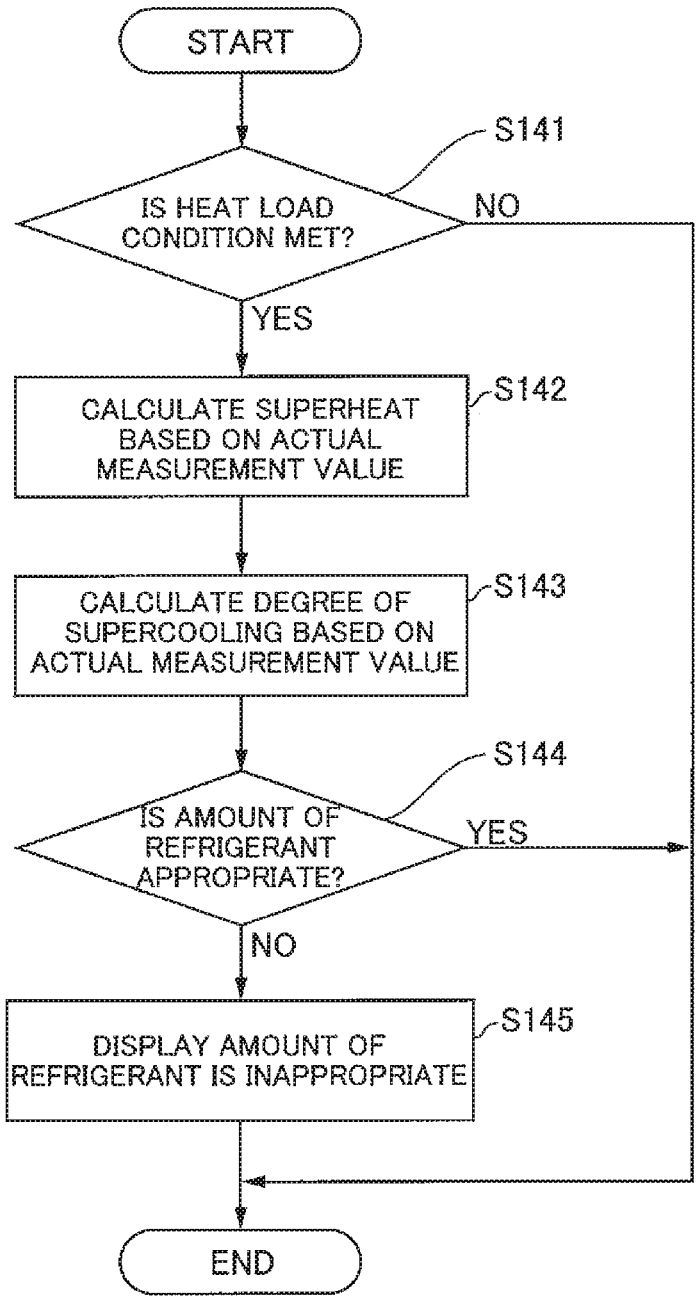
FIG. 61 is a flowchart showing a refrigerant amount determination process.

During the second heating and dehumidifying operation, in the refrigerant circuit 20, both the refrigerant flow channel to the expansion part and the refrigerant flow channel to the condensing pressure regulating part are closed in the first control valve 24; the second solenoid valve 26$b$ is open; and the first and third solenoid valves 26$a$ and 26$c$ are closed, and the compressor 21 is operated. By this means, as shown in FIG. 57, the refrigerant discharged from the compressor 21 flows through in this order: the refrigerant flow passage 20$a$; the radiator 15; the refrigerant flow passages 20$b$ and 20$f$; the high-pressure side of the indoor heat exchanger 23; the refrigerant flow passage 20$g$; the heat exchanger 14; the refrigerant flow passage 20$h$; the low-pressure side of the indoor heat exchanger 23; and the refrigerant flow passages 20$i$ and 20$e$, and is sucked into the compressor 21. The refrigerant flowing through the refrigerant circuit 20 releases the heat in the radiator 15 and absorbs the heat in the heat exchanger 14.

In this case, in the air conditioning unit 10, the indoor fan 12 is operated to flow the air through the air flow passage 11, and the flowing air is subjected to a heat exchange with the refrigerant in the heat exchanger 14, and therefore is cooled and dehumidified in the same way as in the first heating and dehumidifying operation. Part of the air dehumidified in the heat exchanger 14 is subjected to a heat exchange with the refrigerant in the radiator 15, and therefore heated. As a result, the air at the target air-blowing temperature TAO blows to the vehicle interior.

While an automatic switch is turned on, the controller 40 performs an operation switching control process to switch the operation among the cooling operation, the cooling and dehumidifying operation, the heating operation, the first heating and dehumidifying operation, and the second heating and dehumidifying operation, based on environmental conditions including the outdoor air temperature Tam, the indoor air temperature Tr, the outdoor air humidity, the indoor air humidity Th, the amount of insolation Ts and so forth.

The controller 40 switches the mode of the outlets 11$c$, 11$d$ and 11$e$ by using the outlet switching dampers 13$b$, 13$c$ and 13$d$, and controls the opening of the air mix damper 16 in order to set the temperature of the air blowing out of the outlets 11$c$, 11$d$, and 11$e$ to the target air-blowing temperature TAO.

The controller 40 switches the mode among the foot mode, the vent mode and the bi-level mode depending on the target air-blowing temperature TAO during each operation switched by the operation switching control process. To be more specific, when the target air-blowing temperature TAO is high, for example, 40 degrees Celsius, the controller 40 sets the foot mode. Meanwhile, when the target air-blowing temperature TAO is low, for example, lower than 25 degrees Celsius, the controller sets the vent mode. Moreover, when the target air-blowing temperature TAO is the temperature between the temperature for the foot mode and the temperature for the vent mode, the controller 40 sets the bi-level mode.

Moreover, during the heating operation and the first heating and dehumidifying operation, the controller 40 performs an expansion part control process to control the opening of the expansion part of the first control valve 24 based on the operation state. Now, the operation of the controller 40 in this process will be explained with reference to the flowchart shown in FIG. 58.

(Step S111)

In step S111, the CPU determines whether the operation is the heating operation or the heating and dehumidifying operation. When determining that the operation is one of the heating operation and the heating and dehumidifying operation, the CPU moves the step to step S112. On the other hand, when determining that the operation is neither the heating operation nor the heating and dehumidifying operation, the CPU ends the expansion part control process.

(Step S112)

In the step S112, the CPU calculates superheat SH of the refrigerant based on the temperature Tlp detected by the low-pressure refrigerant temperature sensor 46 and the pressure Plp detected by the low-pressure refrigerant pressure sensor 47.

(Step S113)

In step S113, the CPU determines whether or not the superheat SH calculated in the step S112 is a predetermined value or higher. When determining that the superheat SH is the predetermined value or higher, the CPU moves the step to step S119. On the other hand, when determining that the superheat SH is not the predetermined value or higher, the CPU moves the step to step S114.

(Step S114)

In step S114, the CPU sets target degree of supercooling SCt based on the target air-blowing temperature TAO. For example, when the target air-blowing temperature TAO is a predetermined value (e.g. 60 degrees Celsius) or higher, the CPU sets first target degree of supercooling SCt1 (e.g. 15 degrees Celsius). On the other hand, when the target air-blowing temperature TAO is lower than the predetermined value, the CPU sets second target degree of supercooling SCt2 (e.g. 12 degrees Celsius).

(Step S115)

In step S115, for the target degree of supercooling SCt set in the step S4, the CPU calculates amount of correction H1 based on amount of air Ga supplied from the indoor fan 12 and amount of correction H2 based on amount of refrigerant Gr flowing through the refrigerant circuit 20. To be more specific, when the amount of air Qa supplied from the indoor fan 12 is a predetermined value or higher, the amount of correction H1 is zero. On the other hand, when the amount of air Qa is lower than the predetermined value, the amount of correction H1 (e.g. $-10 \leq H1 \leq 0$) is set to decrease the degree of supercooling SC according to the amount of air Qa. When the amount of refrigerant Qr flowing through the high-pressure side of the refrigerant circuit 20 is a predetermined value or higher, the amount of correction H2 (e.g. $0 \leq H2 \leq 5$) is set to increase the degree of supercooling according to the amount of refrigerant Qr. On the other hand, when the amount of refrigerant Qr is lower than the predetermined value, the amount of correction H2 (e.g. $-5 \leq H2 \leq 0$) is set to decrease the degree of supercooling SC according to a decrease in the amount of refrigerant Qr. The amount of refrigerant Qr flowing through the high-pressure side of the refrigerant circuit 20 increases as the pressure of the refrigerant in the high-pressure side of the refrigerant circuit 20 increases, and decreases as the pressure of the refrigerant decreases. Therefore, the amount of refrigerant Qr flowing through the high-pressure side of the refrigerant circuit 20 is calculated based on the pressure Php detected by the high-pressure refrigerant pressure sensor 45.

(Step S116)

In step S116, the CPU calculates corrected target degree of supercooling SCtc by adding the amount of correction H1 and the amount of correction H2 to the target degree of supercooling SCt (SCtc=SCt−(H1+H2)).

(Step S117)

In step S117, the CPU calculates the degree of supercooling SC of the refrigerant based on the temperature Thp detected by the high-pressure refrigerant temperature sensor 44 and the pressure Php detected by the high-pressure refrigerant pressure sensor 45.

(Step S118)

In step S118, the CPU controls the opening of the first control valve 24 such that the degree of supercooling SC is the corrected target degree of supercooling SCtc, and ends the expansion part control process.

(Step S119)

When determining that the superheat SH is the predetermined value or higher in the step S113, the CPU performs a superheat control process to control the opening of the expansion part of the first control valve 24 to set the superheat SH of the low-pressure refrigerant to target superheat SHt in step S119, and ends the expansion part control process.

During the cooling and dehumidifying operation, the controller 40 performs a cooling and dehumidifying performance control process to control the heat absorbing performance of the heat exchanger 14 and the heat radiating performance of the radiator 15. Now, the operation of the controller 40 for this process will be explained with reference to the flowchart shown in FIG. 59.

(Step S121)

In step S121, the CPU determines whether or not the operation is the cooling and dehumidifying operation. When determining that the operation is the cooling and dehumidifying operation, the CPU moves the step to step S122. On the other hand, when determining that the operation is not the cooling and dehumidifying operation, the CPU ends the cooling and dehumidifying performance control process.

(Step S122)

In step S122, the CPU calculates target pressure Phpt of the high-pressure refrigerant based on the target air-blowing temperature TAO.

(Step S123)

In step S123, the CPU controls the opening of the condensing pressure regulating part of the first control valve 24 based on the target pressure Phpt of the high-pressure refrigerant and the pressure Php detected by the high-pressure refrigerant pressure sensor 45. To be more specific, the opening of the condensing pressure regulating part of the first control valve 24 is switched between two values, a large one and a small one, excluding the completely closed state. In this case, when the opening is switched from a small one to a large one, the pressure Php of the high-pressure refrigerant decreases. On the other hand, the opening is changed from a large one to a small one, the pressure Php of the high-pressure refrigerant increases.

(Step S124)

In step S124, the CPU calculates target evaporating temperature Tet of the refrigerant in the heat exchanger 14 based on the target air-blowing temperature TAO.

(Step S125)

In step S125, the CPU controls the number of rotations of the electric motor 21*a* of the compressor 21 such that the evaporating temperature Te of the refrigerant in the heat exchanger 14 is the target evaporating temperature Tet, based on the temperature of Te detected by the heat exchanger temperature sensor 48, and ends the cooling and dehumidifying performance control process.

Moreover, the controller 40 performs an evaporating temperature control process to prevent the evaporating temperature of the refrigerant in the heat exchanger 14 from decreasing by controlling the opening of the second control valve 25 such that the opening of the second control valve 25 during the first heating and dehumidifying operation is equal to or smaller than the opening for the other operations. Now, the operation of the controller 40 for this process will be explained with reference to the flowchart shown in FIG. 60.

(Step S131)

In step S131, the CPU determines whether or not the operation is the first heating and dehumidifying operation. When determining that the operation is the first heating and dehumidifying operation, the CPU moves the step to step S132. On the other hand, when determining that the operation is not the first heating and dehumidifying operation, the CPU ends the evaporating temperature control process.

(Step S132)

In step S132, the CPU calculates target evaporating temperature Tet of the refrigerant in the heat exchanger 14 based on the target air-blowing temperature TAO.

(Step S133)

In step S133, the CPU controls the opening of second control valve 25 based on the target evaporating temperature Tet and the temperature Te detected by the heat exchanger temperature sensor 48, and ends the evaporating temperature control process. To be more specific, when the temperature Te detected by the heat exchanger temperature sensor 48 is lower than the target evaporating temperature Tet, the opening of the second control valve 25 is set to the small one of the two openings. On the other hand, when the temperature Te detected by the heat exchanger temperature sensor 48 is higher than the target evaporating temperature Tet, the opening is set to the large one.

During the heating operation and the first heating and dehumidifying operation, the controller 40 performs a refrigerant amount determination process to determine whether or not the amount of the refrigerant enclosed in the refrigerant circuit 20 is appropriate. Now, the operation of the controller 40 for this process will be explained with reference to the flowchart shown in FIG. 61.

(Step S141)

In step S141, the CPU determines whether or not heat load conditions are met to determine the amount of refrigerant in the refrigerant circuit 20 based on the outdoor temperature Tam, the amount of air Qa supplied from the indoor fan 12, the number of rotations Nc of the electric motor 21*a* of the compressor 21 and so forth. When determining that it is possible to determine the amount of refrigerant, the CPU moves the step to step S142. On the other hand, when determining that it is not possible to determine the amount of refrigerant, the CPU ends the refrigerant amount determination process.

(Step S142)

In step S142, the CPU calculates the superheat SH of the refrigerant based on the temperature Tlp detected by the low-pressure refrigerant temperature sensor 46 and the pressure Plp detected by the low-pressure refrigerant pressure sensor 47.

(Step 143)

In step S143, the CPU calculates the degree of supercooling SC of the refrigerant based on the temperature Thp detected by the high-pressure refrigerant temperature sensor 44 and the pressure Php detected by the high-pressure refrigerant pressure sensor 45.

(Step S144)

In step S144, the CPU determines whether or not the amount of the refrigerant in the refrigerant circuit 20 is appropriate, based on the superheat SH of the refrigerant calculated in the step S142, the degree of supercooling SC of the refrigerant calculated in the step S143, and the opening of the expansion part of the first control valve 24. When determining that the amount of the refrigerant is appropriate, the CPU ends the refrigerant amount determination process. On the other hand, when determining that the amount of the refrigerant is not appropriate, the CPU moves the step to step S145. Whether or not the amount of the refrigerant in the refrigerant circuit 20 is appropriate is determined based on the result of the determination of whether or not the superheat SH of the refrigerant calculated in the step S142, the degree of supercooling SC of the refrigerant calculated in the step 143, and the opening of the expansion part of the first control valve 24 are within appropriate ranges, respectively.

(Step S145)

When determining that the amount of the refrigerant is not appropriate in the step S144, the CPU displays that the amount of the refrigerant in the refrigerant circuit 20 is insufficient or excessive on the display part 50 in the step S145, and ends the refrigerant amount determination process.

In this way, the vehicle air conditioning apparatus according to the present embodiment, the opening of the second control valve 25 is controlled during the first heating and dehumidifying operation. By this means, it is possible to increase the evaporating temperature of the refrigerant in the heat exchanger 14 during the first heating and dehumidifying operation, and therefore to prevent a frost being formed on the heat exchanger 14 even if the outdoor temperature is low. As a result, it is possible to secure the required quantity of heat absorbed into the refrigerant in the heat exchanger 14.

The opening of the second control valve 25 can be switched between different two openings and is set to one of the two openings. By this means, it is possible to set the opening of the second control valve 25 to one of the large opening and the small opening. As a result, it is possible to simplify the control, and therefore reduce the production cost.

Moreover, the opening of the second control valve 25 is controlled based on the target evaporating temperature Tet and the temperature Te detected by the heat exchanger temperature sensor 28. By this means, it is possible to ensure that the evaporating pressure of the refrigerant in the heat exchanger 14 is a predetermined pressure, and therefore to prevent the quantity of heat absorbed into the refrigerant in the heat exchanger 14 from being insufficient.

Figure 62:
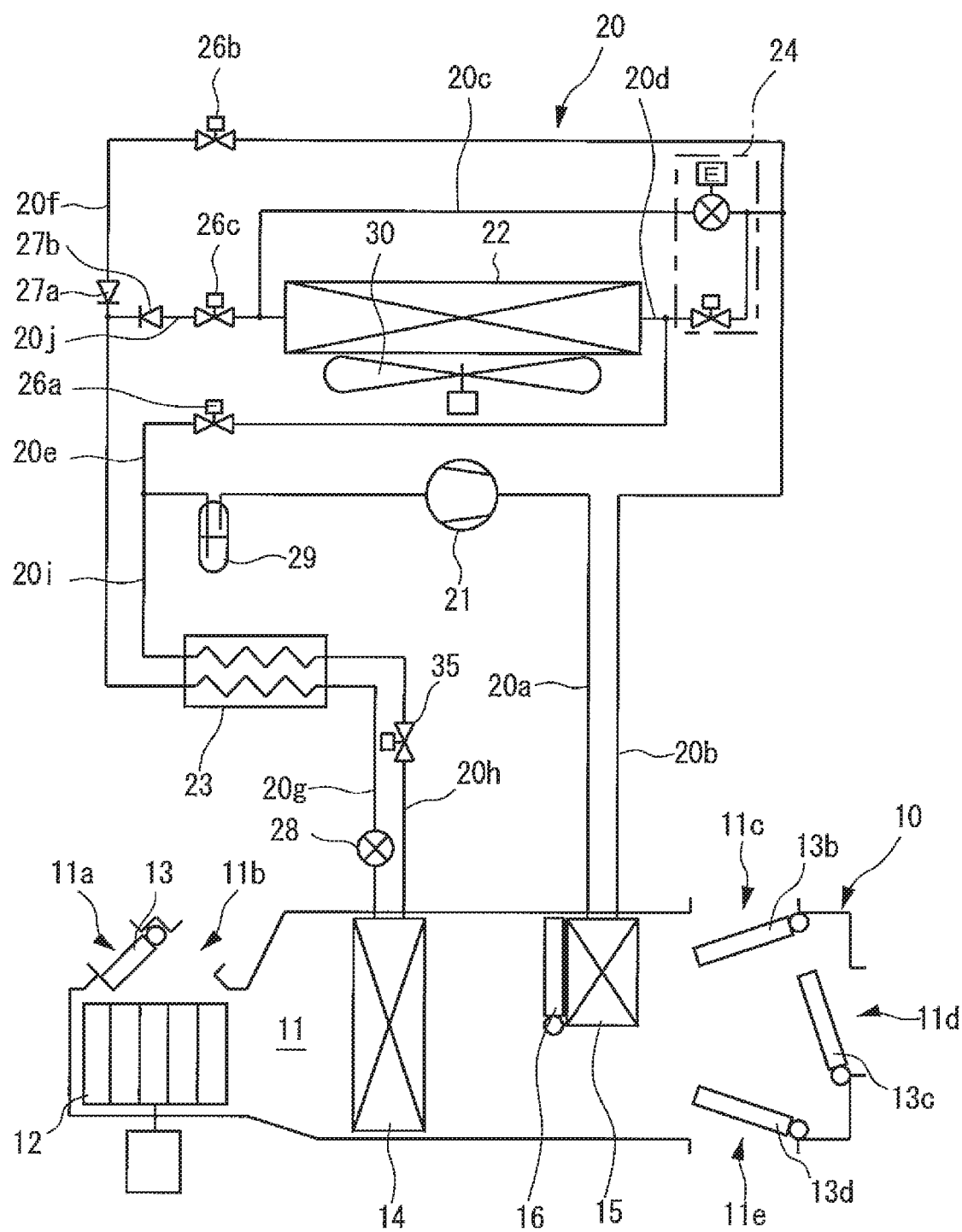
FIG. 62 is a schematic view showing the vehicle air conditioning apparatus according to Embodiment 11 of the present invention.

FIG. 62 shows Embodiment 11 of the present invention.

This vehicle air conditioning apparatus has a second control valve 35 whose opening can be optionally set. The opening is regulated to control the evaporating temperature of the refrigerant in the heat exchanger 14.

In the vehicle air conditioning apparatus having the above-described configuration, the controller 40 performs the evaporating temperature control process so that the opening of the second control valve 35 during the first heating and dehumidifying operation is equal to or smaller than the opening during the other operations, in order to prevent the evaporating temperature of the refrigerant from dropping in the heat exchanger 14. To be more specific, when the temperature Te detected by the heat exchanger temperature sensor 48 is lower than the target evaporating temperature Tet, the opening of the second control valve 35 is decreased. On the other hand, the temperature Te is higher than the target evaporating temperature Tet, the opening is increased. In this case, the opening of the second control valve 35 may be optionally set based on the temperature Te detected by the heat exchanger temperature sensor 48.

In this way, with the vehicle air conditioning apparatus according to the present embodiment, the opening of the second control valve 35 is regulated during the first heating and dehumidifying operation, in the same way as in Embodiment 10. By this means, it is possible to increase the evaporating temperature of the refrigerant in the heat exchanger 14 during the first heating and dehumidifying operation, and therefore it is possible to prevent a frost from being formed on the heat exchanger 14 even if the outdoor temperature is low, and to secure the required quantity of heat absorbed into the refrigerant in the heat exchanger 14.

In addition, the opening of the second control valve 35 may be optionally set. By this means, it is possible to optionally set the quantity of heat absorbed into the refrigerant in the heat exchanger 14, and therefore to improve the accuracy of the control of the quantity of heat absorbed into the refrigerant in the heat exchanger 14.

Here, with the present embodiment, a configuration has been described where, during the heating operation and the first heating and dehumidifying operation, the refrigerant flowing out of the compressor 21 flows through the outdoor heat exchanger 22 from the first end side to the second end side. However, it is by no means limiting. Another configuration is possible where, for example, as shown in FIG. 63, the refrigerant flowing out of the compressor 21 flows through the outdoor heat exchanger 22 from the second end side to the first end side during the heating operation and the first heating and dehumidifying operation.

Figure 63:
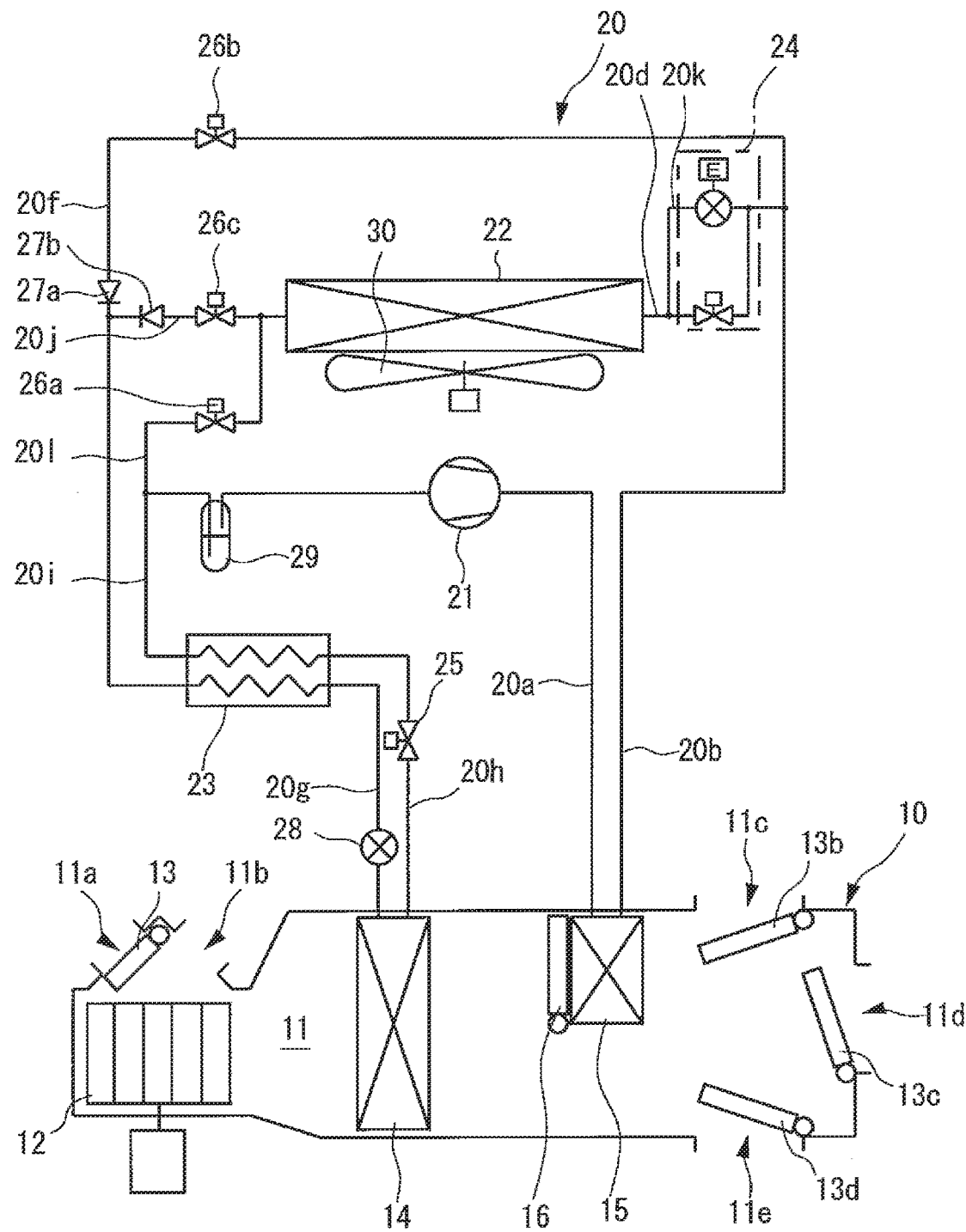
FIG. 63 is a schematic view showing another vehicle air conditioning apparatus according to the present invention.

The vehicle air conditioning apparatus shown in FIG. 63 has the refrigerant flow passage 20k configured to connect the output side of the expansion part of the first control valve 24 from which the refrigerant is discharged to the second end side of the outdoor heat exchanger 22, instead of the refrigerant flow passage 20c in Embodiment 10. In addition, the vehicle air conditioning apparatus has the refrigerant flow passage 20l configured to connect the first end side of the outdoor heat exchanger 22 to the suction side of the compressor 21 into which the refrigerant is sucked, instead of the refrigerant flow passage 20e in Embodiment 10.

In the vehicle air conditioning apparatus having the above-described configuration, during the heating operation and the first heating and dehumidifying operation, the refrigerant flowing out of the radiator 15 flows through the outdoor heat exchanger 22 from the second end side to the first end side, unlike Embodiment 10. During the other operations, the refrigerant flows through, in the same way as in Embodiment 10.

Moreover, with the present embodiment, a configuration has been described where the first control valve 24 includes the expansion part to decompress the refrigerant flowing into the outdoor heat exchanger 22 during the heating operation and the condensing pressure regulating part to regulate the condensing pressure of the refrigerant in the radiator 15 during the cooling and dehumidifying operation, which are integrally formed. However, it is by no means limiting. Another configuration is possible, for example, where an electronic expansion valve as the expansion part and a condensing pressure regulating valve as the condensing pressure regulating part are connected in parallel to the upstream side of the outdoor heat exchanger 22 in the refrigerant flow direction. This provides the same effect as in the above-described embodiment.

Moreover, with the present embodiment, a configuration has been described where the degree of supercooling SC of the refrigerant flowing out of the radiator 15 is controlled by regulating the opening of the expansion part of the first control valve 24, which is located upstream of the outdoor heat exchanger 22. However, another configuration is possible where an electronic expansion valve is provided instead of the expansion valve 28 disposed upstream of the heat exchanger 14, and, by regulating the opening of the electronic expansion valve, the degree of supercooling SC of the refrigerant flowing out of the radiator 15 is controlled.

Moreover, with the present embodiment, a configuration has been described where the opening of the second control valve 25 or 35 is regulated based on the target evaporating temperature Tet and the temperature Te detected by the heat exchanger temperature sensor 48. However, it is by no means limiting. Another configuration is possible where, for example, the temperature of the air after a heat exchange in the heat exchanger 14, or the pressure of the refrigerant in the heat exchanger 14 are detected, and the opening of the second control valve 25 or 35 is regulated based on the result of the detection. This provides the same effect as in the above-described embodiment.

REFERENCE SIGNS LIST

10 air conditioning unit, 14 heat exchanger, 15 radiator, 20 refrigerant circuit, 21 compressor, 22 outdoor heat exchanger, 24 first control valve, 25 second control valve, 26a to 26c first to third solenoid valve, 27a and 27b first and second check valve, 28 expansion valve, 29 accumulator, 40 controller, 41 outdoor air temperature sensor, 42 indoor air temperature sensor, 43 insolation sensor, 44 high-pressure refrigerant temperature sensor, 45 high-pressure refrigerant pressure sensor, 46 low-pressure refrigerant temperature sensor, 47 low-pressure refrigerant pressure sensor, 48 heat exchanger temperature sensor, and 49 operation part

The invention claimed is:

1. A vehicle air conditioning apparatus comprising:
   a compressor configured to compress and discharge a refrigerant;
   a radiator provided in a vehicle interior and configured to release heat from the refrigerant;
   a heat exchanger provided in the vehicle interior and configured to absorb the heat into the refrigerant; and
   an outdoor heat exchanger provided outside the vehicle interior and configured to release the heat from or absorb the heat into the refrigerant,
   the vehicle air conditioning apparatus performing:
   a heating operation to release the heat from the refrigerant discharged from the compressor in the radiator, and to absorb the heat into the refrigerant in the outdoor heat exchanger; and
   a cooling and dehumidifying operation to release the heat from the refrigerant discharged from the compressor in the radiator, and additionally to release the heat from the refrigerant in the outdoor heat exchanger, and then to absorb the heat into the refrigerant in the heat exchanger,
   the vehicle air conditioning apparatus further comprising:
   a flow regulating valve provided in a refrigerant flow passage that allows the refrigerant flowing out of the radiator to flow into the outdoor heat exchanger, an opening of the flow regulating valve being regulated within following two ranges: a decompression range that allows the refrigerant flowing through the refrigerant flow passage to be decompressed during the heating operation; and a condensing pressure regulating range that allows an opening area of the flow regulating valve to be a same as an opening area of an upstream or downstream refrigerant flow channel when the opening of the flow regulating valve is maximized, and that can regulate the condensing pressure of the refrigerant in the radiator by regulating an amount of the refrigerant flowing through the refrigerant flow channel during the cooling and dehumidifying operation; and
   a valve opening control part configured to control the opening of the flow regulating valve within the decompression range during the heating operation, and to control the opening of the flow regulating valve within the condensing pressure regulating range during the cooling and dehumidifying operation.

2. The vehicle air conditioning apparatus according to claim 1, further comprising:
   a target condensing pressure calculation part configured to calculate a target value of the condensing pressure of the refrigerant in the radiator;
   a condensing pressure detection part configured to detect the condensing pressure of the refrigerant in the radiator;
   an evaporating temperature detection part configured to detect an evaporating temperature of the refrigerant in the heat exchanger; and
   a cooling and dehumidifying performance control part configured to control the opening of the flow regulating valve within the condensing pressure regulating range based on the target condensing pressure calculated by the target condensing pressure calculation part and the pressure detected by the condensing pressure detection part, and to control a number of rotations of the compressor based on the evaporating temperature detected by the evaporating temperature detection part.

3. The vehicle air conditioning apparatus according to claim 1, wherein the valve opening control part sets the opening of the flow regulating valve in the condensing pressure regulating range to one of two different openings.

4. The vehicle air conditioning apparatus according to claim 1, wherein the valve opening control part switches the opening of the flow regulating valve in the condensing pressure regulating range between a fully open state and a state to regulate a pressure difference between the refrigerant flowing into the radiator and the refrigerant flowing out of the radiator.

* * * * *